US011407595B2

(12) United States Patent
Green et al.

(10) Patent No.: US 11,407,595 B2
(45) Date of Patent: Aug. 9, 2022

(54) METHODS AND APPARATUSES FOR PERFORMING ARTICLE SINGULATION

(71) Applicant: INTELLIGRATED HEADQUARTERS, LLC, Mason, OH (US)

(72) Inventors: Todd Eliot Green, Baltimore, MD (US); Darius Scott, Baltimore, MD (US); Christopher Quaglia, Randallstown, MD (US); Rui Cai, Owings Mills, MD (US); Robert Anderson, Eldersburg, MD (US); Carl Gunter, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/113,260

(22) Filed: Dec. 7, 2020

(65) Prior Publication Data
US 2021/0171291 A1 Jun. 10, 2021

Related U.S. Application Data

(60) Provisional application No. 62/946,252, filed on Dec. 10, 2019.

(51) Int. Cl.
*B65G 47/31* (2006.01)
*B65G 47/68* (2006.01)
(Continued)

(52) U.S. Cl.
CPC ........... *B65G 47/31* (2013.01); *B65G 37/005* (2013.01); *B65G 47/64* (2013.01); *B65G 11/023* (2013.01);
(Continued)

(58) Field of Classification Search
CPC ...... B65G 37/005; B65G 47/31; B65G 47/34; B65G 47/38; B65G 47/268; B65G 47/295
(Continued)

(56) References Cited

U.S. PATENT DOCUMENTS 5,314,055 A * 5/1994 Gordon ............... G05B 19/4182
198/395
5,950,800 A * 9/1999 Terrell ................. B65G 47/684
198/448
(Continued)

FOREIGN PATENT DOCUMENTS

CN 209613604 U 11/2019

*Primary Examiner* — Douglas A Hess
(74) *Attorney, Agent, or Firm* — Alston & Bird LLP

(57) ABSTRACT

Methods and apparatuses for performing article singulation are provided. An article singulator can include an intake conveyor, an out-take conveyor, and multiple intermediate conveyors. The intake conveyor can receive multiple articles and convey the articles to the multiple intermediate conveyors. Further, the out-take conveyor may convey singulated articles from amongst the multiple articles (e.g. to an out-feed). Further, the multiple intermediate conveyors may include successive conveyors to convey the articles and provide the singulated articles to the out-take conveyor. In some examples, each successive conveyor of the multiple intermediate conveyors may be positioned at a lower level than a preceding conveyor. Further, each successive conveyor can convey the articles in a different direction and at a different speed than a preceding conveyor such that the articles are singulated upon conveyance by the article singulator.

18 Claims, 33 Drawing Sheets

(51) Int. Cl.
*B65G 47/64* (2006.01)
*B65G 37/00* (2006.01)
B65G 47/90 (2006.01)
B65G 11/02 (2006.01)

(52) U.S. Cl.
CPC ........ *B65G 47/90* (2013.01); *B65G 2203/025* (2013.01); *B65G 2203/0208* (2013.01); *B65G 2203/041* (2013.01)

(58) Field of Classification Search
USPC ................ 198/456, 457.01, 457.03, 607
See application file for complete search history.

(56) References Cited

U.S. PATENT DOCUMENTS

| | | | | |
|---|---|---|---|---|
| 6,478,138 | B1 * | 11/2002 | Edwards | B65G 17/345 |
| | | | | 198/370.06 |
| 6,491,154 | B2 * | 12/2002 | Ydoate | B65G 47/31 |
| | | | | 198/444 |
| 6,609,607 | B2 * | 8/2003 | Woltjer | B65G 37/02 |
| | | | | 198/457.03 |
| 8,714,339 | B2 * | 5/2014 | Brun | B65H 29/16 |
| | | | | 198/370.07 |
| 8,910,457 | B2 * | 12/2014 | Lagares Corominas | |
| | | | | B26D 7/32 |
| | | | | 53/513 |
| 9,038,810 | B2 * | 5/2015 | Schroader | B65G 47/22 |
| | | | | 198/413 |
| 9,511,953 | B1 * | 12/2016 | Mueller | B65G 47/46 |
| 10,053,299 | B1 * | 8/2018 | Vadakkanmaruveedu | |
| | | | | B65G 59/12 |
| 10,150,625 | B2 * | 12/2018 | Grant | B07C 1/00 |
| 10,315,859 | B1 * | 6/2019 | Zhao | B65G 47/8815 |
| 10,464,756 | B2 * | 11/2019 | Itoh | B65G 47/54 |
| 10,501,269 | B2 * | 12/2019 | Walter | B65G 47/682 |
| 10,647,520 | B2 * | 5/2020 | Hartmann | B65G 43/08 |
| 10,773,898 | B2 * | 9/2020 | Perrot | B65G 47/31 |
| 10,961,060 | B1 * | 3/2021 | Zhao | B65G 47/68 |
| 10,988,327 | B1 * | 4/2021 | Layne | B65G 47/24 |
| 11,192,726 | B2 * | 12/2021 | Zhao | B65G 47/268 |
| 2016/0176653 | A1 | 6/2016 | Grant et al. | |

* cited by examiner

METHODS AND APPARATUSES FOR PERFORMING ARTICLE SINGULATION

CROSS REFERENCE TO RELATED APPLICATIONS

The present application is a non-provisional conversion of, and claims priority to U.S. Provisional Patent Application No. 62/946,252, entitled "Methods and Apparatuses for performing article singulation," filed on Dec. 10, 2019, the disclosure of which is hereby incorporated by reference in its entirety.

BACKGROUND

Generally, in material handling environments like, but not limited to, distribution centers, warehouses, inventories, or shipping centers, a material handling system, can convey, handle, sort, and organize various type of items (e.g. cartons, cases, containers, shipment boxes, totes, packages, and/or the like) at high speeds. Depending on a configuration of a material handling system, the items may travel through the material handling environment in an unregulated manner (e.g., clustered, partially overlapping, substantially overlapping, and/or non-single file flow) at an initial time or may be repositioned, reoriented, and/or consolidated into a single stream of items, as the items move on conveyors. A singulator (or singulator conveyor) is an example of a conveyor that accepts an unregulated flow of items and discharges the items as a single file stream. Singulators are often wide bulk conveyors accepting inputs at various points (for example from one or more collector conveyors) and aligns the input items such that the items are discharged as a single file stream. Singulators may also include recirculation lines that can convey items that have not been successfully placed into the single file stream (i.e., not singulated) back to the start of the singulator. Singulation of items on the conveyor has associated challenges.

Many systems and methods do not overcome technical challenges and difficulties associated with article singulation. For example, many systems and methods do not provide the capability to perform article singulation in a confined and/or non-linear space.

BRIEF SUMMARY

In accordance with some example embodiments, an article singulator may comprise an intake conveyor, an out-take conveyor, and a plurality of conveyors. The intake conveyor may receive a plurality of articles. The out-take conveyor may convey a plurality of singulated articles from amongst the plurality of articles. Further, the plurality of conveyors may receive the plurality of articles from the intake conveyor and convey the plurality of articles via successive conveyors of the plurality of conveyors. Furthermore, the plurality of conveyors may provide the plurality of singulated articles to the out-take conveyor. In this regard, each successive conveyor of the plurality of conveyors may be at a lower level than a preceding conveyor of the plurality of conveyors. Further, each successive conveyor can convey the plurality of articles in a different direction and at a different speed than a preceding conveyor such that the plurality of articles is singulated by the plurality of conveyors.

In some example embodiments, the plurality of conveyors may include a switch conveyor. The switch conveyor may comprise a first conveyor path and a second conveyor path. The first conveyor path may interface with a portion of at least one of any preceding conveyors of the plurality of conveyors, thereby, defining a closed loop passage for conveying non-singulated articles from amongst the plurality of articles, back to any of the preceding conveyors. Further, the second conveyor path may interface with the out-take conveyor to receive the plurality of singulated articles onto the out-take conveyor.

According to some example embodiments, the intake conveyor may be configured to receive the plurality of articles from a decline chute.

In some example embodiments, the article singulator may include at least one processor that may be configured to manipulate at least one of: speed and direction of conveyance of, one or more of, the plurality of articles on the plurality of conveyors to singulate the plurality of articles.

In some example embodiments, at least one conveyor of the plurality of conveyor may comprises a first zone, a second zone that may be downstream of the first zone, and a third zone that may be downstream of the second zone. The article singulator may comprise an imaging device that may be positioned to capture at least one image of an article from amongst the plurality of articles when the article is on the second zone. Further, the article singulator may comprise a robotic device that may be positioned to move the article based on the at least one image when the article is on the third zone.

In an example embodiment, the plurality of conveyors may include a first conveyor, a second conveyor, a third conveyor, a fourth conveyor, a fifth conveyor, and a sixth conveyor. The first conveyor may be configured to convey the plurality of articles at a first speed to a first direction. Further, the second conveyor may be configured to receive the plurality of articles from the first conveyor and convey the plurality of articles at a second speed to a second direction. Furthermore, the third conveyor may be configured to receive the plurality of articles from the second conveyor and convey the plurality of articles at a third speed to a third direction. Furthermore, the fourth conveyor may be configured to receive the plurality of articles from the third conveyor and convey the plurality of articles at a fourth speed to a fourth direction. Furthermore, the fifth conveyor may be configured to receive the plurality of articles from the fourth conveyor and convey the plurality of articles at a fifth speed to a fifth direction. Furthermore, the sixth conveyor configured to receive the plurality of articles from the fifth conveyor and convey non-singulated articles from amongst the plurality of articles back to the third conveyor and the plurality of singulated articles to the out-take conveyor in a sixth direction.

In an example embodiment, the first conveyor may be positioned on a first horizontal plane. Further, the second conveyor may be positioned on a second horizontal plane that may be lower than the first horizontal plane. Furthermore, the third conveyor may be positioned on a third horizontal plane that may be lower than the second horizontal plane. Furthermore, the fourth conveyor may be positioned on a fourth horizontal plane that may be either lower than the third horizontal plane or coplanar with the third horizontal plane. Furthermore, fifth conveyor may be positioned next to the fourth conveyor and the sixth conveyor may be positioned next to the fifth conveyor. In accordance with said example embodiment, the sixth conveyor can comprise a first portion that can interface with the third conveyor, thereby, defining a closed loop pathway for conveying the non-singulated articles back onto the third conveyor and a second portion that can interface with the out-take conveyor to convey the plurality of singulated articles onto the out-take conveyor.

In an example embodiment, the second direction can be in a straight-angle arrangement from the first direction. Further, the third direction can be in a straight-angle arrangement from the second direction. Furthermore, the fourth direction can be in a straight-angle arrangement from the third direction. Furthermore, the fourth direction can be in a right-angle arrangement from the third direction. Furthermore, the fifth direction can be in a right-angle arrangement from the fourth direction and the sixth direction can be in a right-angle arrangement from the fifth direction.

Some example embodiments described herein relates to a method of singulation of articles. The method can include receiving by an intake conveyor a plurality of articles. Further, the method can include conveying the plurality of articles received from the intake conveyor via successive conveyors of the plurality of conveyors. In this regard, each successive conveyor of the plurality of conveyors can be at a lower level than a preceding conveyor of the plurality of conveyors. Further, each successive conveyor can convey the plurality of articles in a different direction and at a different speed than the preceding conveyor such that the plurality of articles is singulated by the plurality of conveyors. The method can further include receiving by an out-take conveyor a plurality of singulated articles from amongst the plurality of articles.

In some example embodiments, the method can include manipulating at least one of: a first speed and a direction of conveyance of, one or more of, the plurality of articles on the plurality of conveyors.

In some example embodiments, the method can include receiving the plurality of articles by a first-level article conveying device comprising a first conveyor that may be configured to convey the plurality of articles at a first speed to a first direction. Further, the method can include receiving the plurality of articles from the first-level article conveying device by a second-level article conveying device comprising a second conveyor that may be configured to convey the plurality of articles at a second speed to a second direction. Furthermore, the method can include receiving the plurality of articles from the second-level article conveying device by a third-level article conveying device comprising a third conveyor that may be configured to convey the plurality of articles at a third speed to a third direction. Furthermore, the method may include receiving the plurality of articles from the third-level article conveying device by a fourth-level article conveying device comprising a fourth conveyor that may be configured to convey the plurality of articles at a fourth speed to a fourth direction. Furthermore, the method may include receiving the plurality of articles from the fourth-level article conveying device by a fifth-level article conveying device comprising a fifth conveyor that may be configured to convey the plurality of articles at a fifth speed to a fifth direction. Furthermore, the method may include receiving, from the fifth-level article conveying device, the plurality of articles by a sixth-level article conveying device comprising a sixth conveyor that may be configured to convey the plurality of singulated articles onto the out-take conveyor in a sixth direction and non-singulated articles of the plurality of articles back to any one of the first conveyor, the second conveyor, the third conveyor, the fourth conveyor, and the fifth conveyor.

In some example embodiments, the sixth-level article conveying device may be positioned next to the fifth-level article conveying device. In some examples, a first portion of the sixth conveyor can interface with the third conveyor, thereby, defining a closed loop for conveying the non-singulated articles back onto the third conveyor and a second portion of the sixth conveyor can interface with a downstream conveyor to receive the plurality of singulated articles.

Some example embodiments described herein relates to a non-transitory computer readable medium that stores thereon computer-executable instructions. The computer-executable instructions in response to execution by a processor can perform operations that can include receiving by an intake conveyor a plurality of articles. Further, the operations can include conveying the plurality of articles received from the intake conveyor via successive conveyors of the plurality of conveyors. In this regard, each successive conveyor of the plurality of conveyors can be at a lower level than a preceding conveyor of the plurality of conveyors. Furthermore, each successive conveyor can convey the plurality of articles in a different direction and at a different speed than the preceding conveyor such that the plurality of articles is singulated by the plurality of conveyors. The operations can further include receiving by an out-take conveyor a plurality of singulated articles from amongst the plurality of articles.

In accordance with various examples, a material handling system for performing article singulation is provided. In some examples, the material handling system may comprise a first-level article conveying device and a second-level article conveying device.

In some examples, the first-level article conveying device may comprise a first conveyor positioned on a first horizontal plane. In some examples, the first conveyor may be configured to convey at least one article at a first speed to a first direction.

In some examples, the second-level article conveying device may comprise a second conveyor positioned on a second horizontal plane that is lower than the first horizontal plane. In some examples, the second conveyor may be configured to receive the at least one article from the first-level article conveying device and convey the at least one article at a second speed to a second direction.

In some examples, the first conveyor may be configured to receive the at least one article from a decline chute.

In some examples, the first-level article conveying device may comprise a first incline conveyor positioned next to the first conveyor. In some examples, the first incline conveyor may be configured to receive the at least one article from the first conveyor and convey the at least one article at a third speed.

In some examples, the third speed may be higher than the first speed.

In some examples, the first incline conveyor may be configured to release the at least one article to at least one location on the second-level article conveying device.

In some examples, the second direction may be in a straight-angle arrangement from the first direction.

In some examples, the second conveyor may comprise a first conveyor belt and a second conveyor belt. In some examples, the second conveyor belt may be downstream of the first conveyor belt in the second direction. In some examples, a second belt speed of the second conveyor belt may be higher than a first belt speed of the first conveyor belt.

In some examples, the second-level article conveying device may comprise a second incline conveyor positioned next to the second conveyor. In some examples, the second incline conveyor may be configured to receive the at least one article from the second conveyor and convey the at least one article at a third speed.

In some examples, the third speed may be higher than the second speed.

In some examples, the second incline conveyor may be configured to release the at least one article to at least one location on a third-level article conveying device.

In some examples, the material handling system may further comprise a third-level article conveying device having a third conveyor positioned on a third horizontal plane that is lower than the second horizontal plane. In some examples, the third conveyor may be configured to receive the at least one article from the second-level article conveying device and convey the at least one article at a third speed to a third direction.

In some examples, the third direction may be in a right-angle arrangement from the second direction.

In some examples, the third-level article conveying device may comprise a third incline conveyor positioned next to the third conveyor. In some examples, the third incline conveyor may be configured to receive the at least one article from the third conveyor and convey the at least one article at a fourth speed. In some examples, the third incline conveyor may be configured to release the at least one article to at least one location on a fourth-level article conveying device.

In some examples, the material handling system may further comprise a fourth-level article conveying device having a fourth conveyor positioned on a fourth horizontal plane that is lower than the third horizontal plane. In some examples, the fourth conveyor may be configured to receive the at least one article from the third-level article conveying device and convey the at least one article at a fourth speed to a fourth direction.

In some examples, the fourth conveyor may comprise a first zone, a second zone that is downstream of the first zone in the fourth direction, and a third zone that is downstream of the second zone in the fourth direction.

In some examples, the material handling system may further comprise an imaging device positioned to capture at least one image of the at least one article when the at least one article is on the second zone.

In some examples, the material handling system may further comprise a robotic device positioned to move the at least one article when the at least one article is on the third zone.

In some examples, the material handling system may further comprise a computing device in electronic communication with the imaging device and the robotic device. In some examples, the computing device may comprise at least one processor and at least one non-transitory memory comprising a computer program code. In some examples, the at least one non-transitory memory and the computer program code may be configured to, with the at least one processor, cause the robotic device to move the at least one article based on the at least one image.

In some examples, the fourth conveyor may comprise a sliding surface configured to release the at least one article to a fifth-level article conveying device.

In accordance with various examples, a material handling system for performing article singulation is provided. In some examples, the material handling system may comprise a first-level article conveying device, a second-level article conveying device, and a third-level article conveying device.

In some examples, the first-level article conveying device may comprise a first chute that is configured to receive at least one article. In some examples, the second-level article conveying device may be positioned next to the first-level article conveying device and may comprise a second incline conveyor that is configured to convey the at least one article at a second speed to a second direction. In some examples, the third-level article conveying device may comprise a third decline conveyor positioned under the second-level article conveying device. In some examples, the third decline conveyor may be configured to receive the at least one article from the second-level article conveying device and convey the at least one article at a third speed to a third direction.

In some examples, the third direction may be in a straight-angle arrangement from the second direction.

In some examples, the material handling system may further comprise a fourth-level article conveying device having a fourth conveyor positioned under the third decline conveyor. In some examples, the fourth conveyor may be configured to receive the at least one article from the third-level article conveying device and convey the at least one article at a fourth speed to a fourth direction.

In some examples, the fourth direction may be in a straight-angle arrangement from the third direction.

In some examples, the material handling system may further comprise a fifth-level article conveying device having a fifth conveyor positioned next to the fourth-level article conveying device. In some examples, the fifth conveyor may be configured to receive the at least one article from the fourth-level article conveying device and convey the at least one article at a fifth speed to a fifth direction.

In some examples, the fifth direction may be in an acute-angle arrangement from the fourth direction.

In some examples, the fifth direction may be in a right-angle arrangement from the fourth direction.

In some examples, the fifth conveyor may comprise a first zone, a second zone that is downstream of the first zone in the fifth direction, and a third zone that is downstream of the second zone in the fifth direction.

In some examples, the material handling system may further comprise an imaging device positioned to capture at least one image of the at least one article when the at least one article is on the second zone.

In some examples, the material handling system may further comprise a robotic device positioned to move the at least one article when the at least one article is on the third zone.

In some examples, the material handling system may further comprise a computing device in electronic communication with the imaging device and the robotic device. In some examples, the computing device may comprise at least one processor and at least one non-transitory memory comprising a computer program code. In some examples, the at least one non-transitory memory and the computer program code may be configured to, with the at least one processor, cause the robotic device to move the at least one article based on the at least one image.

In some examples, the material handling system may further comprise a sixth-level article conveying device positioned next to the fifth-level article conveying device and the second-level article conveying device.

In some examples, the sixth-level article conveying device may comprise a sixth conveyor positioned next to the fifth-level article conveying device, a seventh incline conveyor positioned next to the sixth conveyor, and an eighth conveyor positioned next to the second-level article conveying device.

In some examples, the fourth direction may be in a right-angle arrangement from the third direction.

In some examples, the material handling system may further comprise a fifth-level article conveying device having a fifth conveyor positioned next to the fourth-level article conveying device. In some examples, the fifth conveyor may be configured to receive the at least one article from the fourth-level article conveying device and convey the at least one article at a fifth speed to a fifth direction. In some examples, the fifth direction may be in a right-angle arrangement from the fourth direction.

In some examples, the material handling system may further comprise a sixth-level article conveying device having a sixth conveyor positioned next to the fifth-level article conveying device. In some examples, the sixth conveyor may be configured to receive the at least one article from the fifth-level article conveying device and convey the at least one article at a sixth speed to a sixth direction. In some examples, the sixth direction may be in a right-angle arrangement from the fifth direction.

In some examples, the material handling system may further comprise a seventh-level article conveying device having a seventh conveyor positioned next to the sixth-level article conveying device and the fourth-level article conveying device. In some examples, the seventh conveyor may be configured to receive the at least one article from the sixth-level article conveying device and convey the at least one article at a seventh speed to the fourth-level article conveying device in a seventh direction.

In some examples, the seventh direction may be in a right-angle arrangement from the sixth direction.

In some examples, the sixth conveyor may comprise a first zone, a second zone that is downstream of the first zone in the sixth direction, and a third zone that is downstream of the second zone in the sixth direction.

In some examples, the material handling system may further comprise an imaging device positioned to capture at least one image of the at least one article when the at least one article is on the second zone.

In some examples, the material handling system may further comprise a robotic device positioned to move the at least one article when the at least one article is on the third zone.

In some examples, the material handling system may further comprise a computing device in electronic communication with the imaging device and the robotic device, wherein the computing device may comprise at least one processor and at least one non-transitory memory comprising a computer program code. In some examples, the at least one non-transitory memory and the computer program code may be configured to, with the at least one processor, cause the robotic device to move the at least one article based on the at least one image.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
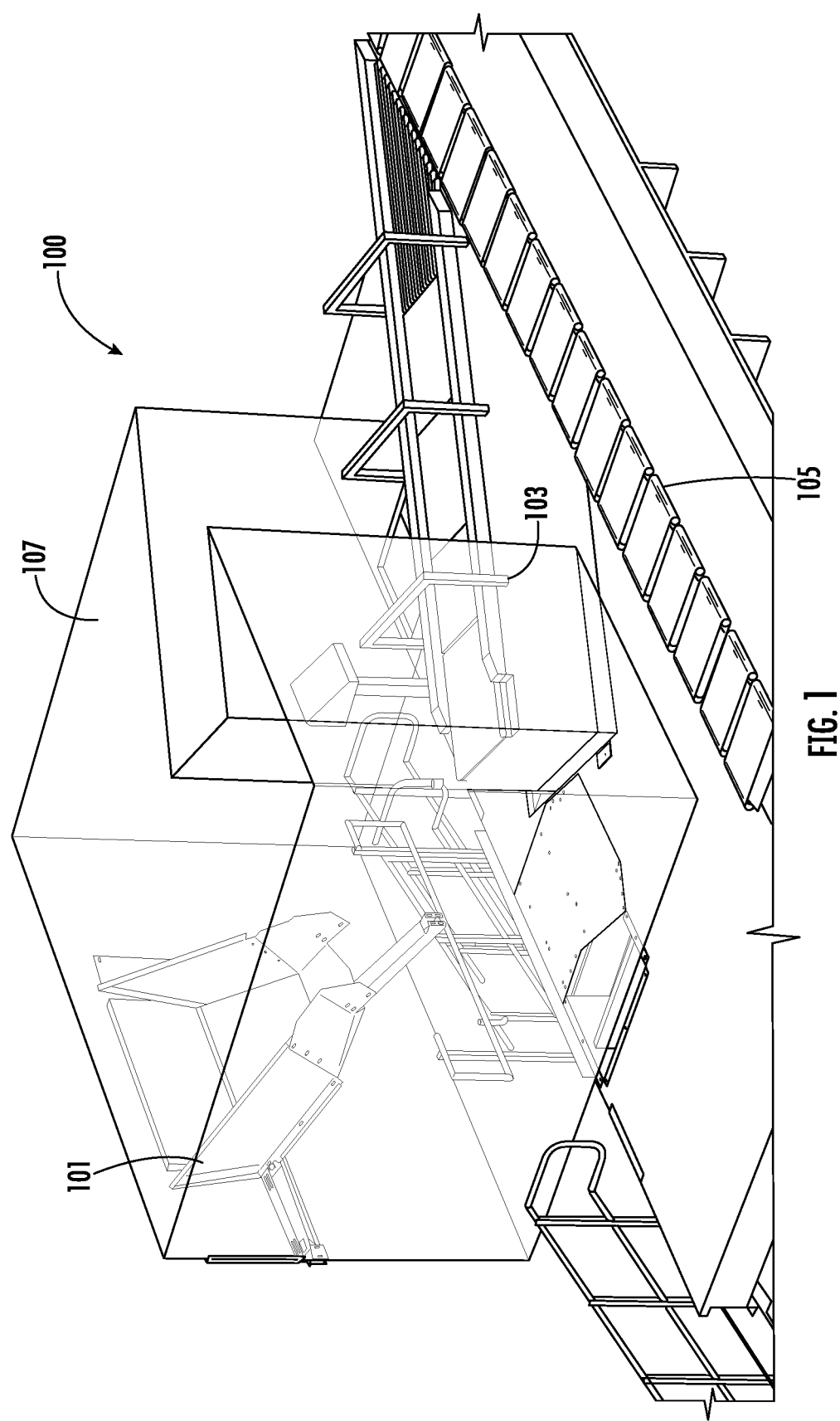
FIG. 1 illustrates an example view of an example system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," "for example," "in some examples," "as an example," and the like generally mean that the particular feature, structure, or characteristic following the phrase may be included in at least one embodiment of the present disclosure, and may be included in more than one embodiment of the present disclosure (such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," or "connected" in the present disclosure may refer to two or more components (for example but not limited to, a computing device, an imaging device, and/or a robotic device) being connected (directly or indirectly) through wired means (for example but not limited to, wired Ethernet) and/or wireless means (for example but not limited to, Wi-Fi, Bluetooth, ZigBee), such that data and/or information may be transmitted to and/or received from these components.

In the present disclosure, the term "material handling" may refer to the control, protection, and/or storage of articles throughout their lifespan, including but not limited to, manufacturing, warehousing, transportation, distribution, consumption and disposal. A "material handling system" may comprise manual component(s), semi-automated component(s), automated component(s), and/or any combination therefore to provide control, protection, and/or storage of articles. For example, an example material handling system may comprise one or more article conveyor devices, details of which are described herein. Additionally, or alternatively, an example material handling system may comprise one or more robotic devices, details of which are described herein.

In the present disclosure, the term "article" may refer to materials and products within a material handling system. Example article may include, but not limited to, cartons, boxes, cases, totes, and/or the like. In some examples, a material handling system may control, protection, and/or store the articles. For example, an example material handling system may control the movement of articles within the material handling system. Additionally, or alternatively, an example material handling system may perform article singulation on one or more articles within the material handling system, details of which are described herein.

In the present disclosure, the term "article singulation" may refer to a process of separating one or more articles from one or more other articles within a material handling system. For example, a material handling system may singulate one or more articles based on the described destinations of these articles (for example, manufacturing, warehousing, transportation, etc.). Additionally, or alternatively, a material handling system may singulate one or more articles based on whether defects in these articles are detected (for example, whether these articles are damaged).

In the present disclosure, the term "article conveying device" may refer to a transport apparatus that may control, move, and/or cause the movement of an article from one location to another location. Example article conveying devices may include, but not limited to, conveyors, manually operated vehicles, automated guided vehicles, monorails and rail-guided vehicles, hoists and cranes, and/or the like.

In the present disclosure, the term "conveyor" may refer to a type of article conveying device that may transport one or more articles to, from, and/or between one or more locations of a material handling system. In some examples, a conveyor may transport one or more articles along one or more fixed paths towards at least one direction. In some examples, a conveyor may transport one or more articles at a fixed speed. In some examples, a conveyor may transport one or more articles at varying speeds. In some examples, one or more different types of conveyors may be used in a material handling system, including but not limited to, chute conveyors, wheel conveyors, roller conveyors (including motor driven roller conveyors (MDR)), chain conveyors, and/or the like.

In some examples, one or more conveyors may form one or more "separation modules" that may be configured to facilitate article singulation. Example separation modules may include, but not limited to, speed metering module, right angle peel-off module, width limiter and recirculation module, right angle peel-off with guided drop-off module, dog tail module, lobed MDR module, incline conveyor module, retracting tail conveyor module, sliding conveyor tray module, decline table module. Example details of these example separation modules are described herein.

In the present disclosure, the term "imaging device" may refer to an apparatus that may be configured to capture one or more imaging data associated with a field of view. Example imaging devices may include, but not limited to, imaging sensors (such as but not limited to charge-coupled device (CCD), complementary metal-oxide-semiconductor (CMOS)), depth sensing sensors (such as those using binocular principles, radar principles, and/or sonar principles), RGB color sensors, cameras, and/or the like.

In some examples, the imaging device may comprise and/or be used together with an illuminator, which may provide a consistent or adjustable amount of illumination in one or more spectrum bandwidths such as visual light and/or infrared light. The illumination can be narrowly defined in the visual spectrum enabling filtration of most of the ambient light. Alternatively, the illumination can be outside of the visual range such that the illumination is not distracting to human operators.

The term "robotic device" refers to an apparatus that may be designed to execute one or more operations based at least in part on computer instructions received from a computing device (as described herein). In some examples, a robotic device may move, flip, turn, and/other manipulate one or more articles in a material handling system to, for example, facilitate article singulation. For example, a robotic device may be configured to pick up an article from a first conveyor and put it down on a second conveyor. Additionally, or alternatively, a robotic device may be configured to flip and/or turn one or more articles on a conveyor. Additionally, or alternatively, a robotic device may be configured to move one or more articles from one location on a conveyor to a different location of the same conveyor or a different conveyor.

In the present disclosure, a robotic device may be of varying types. For example, a robotic device may be a robotic arm, which may comprise one or more segments connected by joints. One or more of these segments may be rotated (for example, through step motors) such that the robotic arm may have one or more degrees of freedom (i.e. one or more ways to pivot).

In some examples, a robotic arm may comprise an end effector, which may be attached, fastened, and/or otherwise positioned next to an end of the robotic arm. In some examples, the end effector may comprise a gripper mechanism and/or a tool mechanism that may interact with one or more components of the material handling system (including, but not limited to, one or more articles in the material handling system). Example gripper mechanisms may include, but not limited to, grippers (such as friction gripper, jaw gripper) or mechanical fingers. Example tool mechanisms may include, but not limited to, flippers (which may be configured to flip one or more articles on a conveyor).

In some examples, a robotic arm may comprise one or more sensors. For example, a force-torque sensor may be installed on the end effector to detect force and/or torque. Additionally, or alternatively, other sensor(s) may be installed, including, but not limited to, collision sensors.

In some examples, a robotic device may be securely positioned in the material handling system at a fixed location. In some examples, a robotic device may be moveable (for example, through a guided rail).

The term "computing device" refers to an apparatus that may store, retrieve, and/or process data. For example, an example computing device be instructed to carry out one or more sequences of arithmetic or logical operations. An example computing device may comprise one or more circuitries, including, but not limited to, at least one processing circuitry, at least one memory circuitry, and at least one communication circuitry that may be electronically coupled to one another.

In some examples, processing circuitries may include, but not limited to, microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure.

In some examples, memory circuitries may include, but not limited to, random access memory (which may or may not be volatile), nonvolatile data storage, and/or the like. In some examples, memory circuits may include non-transitory memory.

In some examples, communication circuitries may include a network interface (I/F) device that may enable to computing device to communicate or interface with other devices, services, and components that are located external to computing device, including, but not limited to, imaging device(s) and robotic device(s).

It is noted that examples of the present disclosure may be implemented by various means such as hardware, firmware, circuitry and/or other devices associated with execution of software including one or more computer program instructions. For example, one or more of the example procedures described herein in connection with a computing device may be embodied by computer program instructions, which may be stored by a non-transitory memory of an apparatus employing an embodiment of the present disclosure and executed by a processor in the apparatus. These computer program instructions may direct a computer or other programmable apparatus (such as a robotic device) to function in a particular manner, such that the instructions stored in the computer-readable storage memory produce an article of manufacture, the execution of which implements the function described herein.

Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

The term "shingling" or "shingled items" can be used herein to refer items (for e.g., packages, parcels, cartons, totes, envelopes, paper bags, boxes, and/or the like) that may be grouped together so that a portion of one or more items of the shingled item overlaps with another portion of remaining of the one or more items. For example, the shingled items can comprise two items where a first item can be positioned over the second item so that a portion of the first item is ahead of a front edge of the first item.

The term "de-shingling items" can be used herein to refer to separating items or creating gaps between the items that can be grouped or overlapped (partially or fully) together. Accordingly, the term "de-shingled" items can be used herein to refer to items that are separated from each other or positioned at a desired gap relative to each.

The term "roller cross-sectional profile" refers to a design of the roller that may include a shape, size, structure, appearance, texture of outer/lateral surface, and/or the like of a cross-sectional surface of the roller.

In material handling systems (such as package distribution centers), articles (such as packages) are often inducted into a material handling apparatus (such as a sorter) by means of, for example, a large bulk flow of densely packed articles of varying shapes, weights and/or sizes. In some setups, this flow may be divided into an array of manual workstations, where a person may pick up individual articles and places them into a target location in the material handling system (such as an induction mechanism for the sorter).

Typically, on a singulation conveyor, as items come out of a bulk induction on a conveyor, the items usually are grouped or overlapped (partially or fully) over each other. One such form of item grouping is shingling, i.e. when at least a first item can be overlapping (partially or fully) over a second item. In some cases, the items may be shingled in a manner so that a front edge of the first item can be positioned ahead of a front edge of the second item. To this end, often on singulation conveyors, two or more items inducted from an induction conveyor can be grouped in such a way that one or more indicia (e.g., but not limited to, barcodes) associated with the items can be obscured and may not be detected by an imaging device installed on the singulation conveyor. Thus, in cases, the indicia on the items may not be read or scanned by an imaging device (e.g. an automated barcode reader) and it may be desired to de-shingle the items. De-shingling of the items on the singulation conveyor has associated challenges.

Further, there is a need to implement robotic devices to perform these tasks. However, the density of the article and high variability between articles have made it exceptionally challenging to fulfill this need. In addition, separating packages out of a large accumulation bin may take up a lot of space, particularly linear space when using conveyors to perform separation.

In some examples of the present disclosure, an example mechanism may be implemented to facilitate separating out packages from a bulk flow in an arrangement that is easier to pick from by a robotic device. In some examples, such a mechanism may perform article singulation in a confined, rectangular (non-linear) space.

In some examples, such a mechanism may provide the ability to recirculate and further separate and manipulate the articles after the robotic device was not able to pick them up, which may reduce the rejection rate of the robotic device. In some examples, such a mechanism may supply a desirable, drop-in solution for package distribution center that may enable a robotic device to successfully meet the performance criteria needed to induct a bulk flow of packages on to a sorter. By way of implementation of various example embodiments described herein, the rollers of the singulation conveyor allows a precise movement of items on the singulation conveyor and singulation actions can be tailored to each shingle instance, i.e. shingled items with a certain degree of shingling.

Referring now to FIG. 1, an example view of an example system 100 is illustrated. In some example embodiments, the system 100 may correspond to a material handling system that may include an article singulator. The article singulator may perform singulating of one or more articles. In particular, the example system 100 may comprise a chute conveyor 101, an induction section 103, and/or a sorter section 105.

In some examples, one or more articles may be received from the chute conveyor 101. The one or more articles may need to be placed on the induction section 103, which may comprise one or more articles conveying devices that may be configured to convey the one or more articles to the sorter section 105. In some examples, the induction section 103 may be configured to merge and combine the one or more articles into a single line and/or establish proper space/gap between the one or more articles.

In some examples, the sorter section 105 may comprise one or more cross-belts. After the one or more articles reach the sorter section 105, these articles may be sorted to one or more different locations of the material handling system.

In some example embodiments, the system 100 may include a robotic device (e.g. a robotic item manipulator or a robotic arm) that may be utilized for handling one or more of the articles. In this regard, in an instance, when the robotic device can be implemented to move the one or more articles from the chute conveyor 101 to the induction section 103, the movement of the robotic device may be confined in space 107 shown in FIG. 1. In some examples, one or more additional modules may be implemented to facilitate article singulation so that, for example, the robotic device may pick up these articles from the chute conveyor 101 and place these articles on the induction section 103 with accuracy and speed while within the confinement of space 107.

Figure 2:
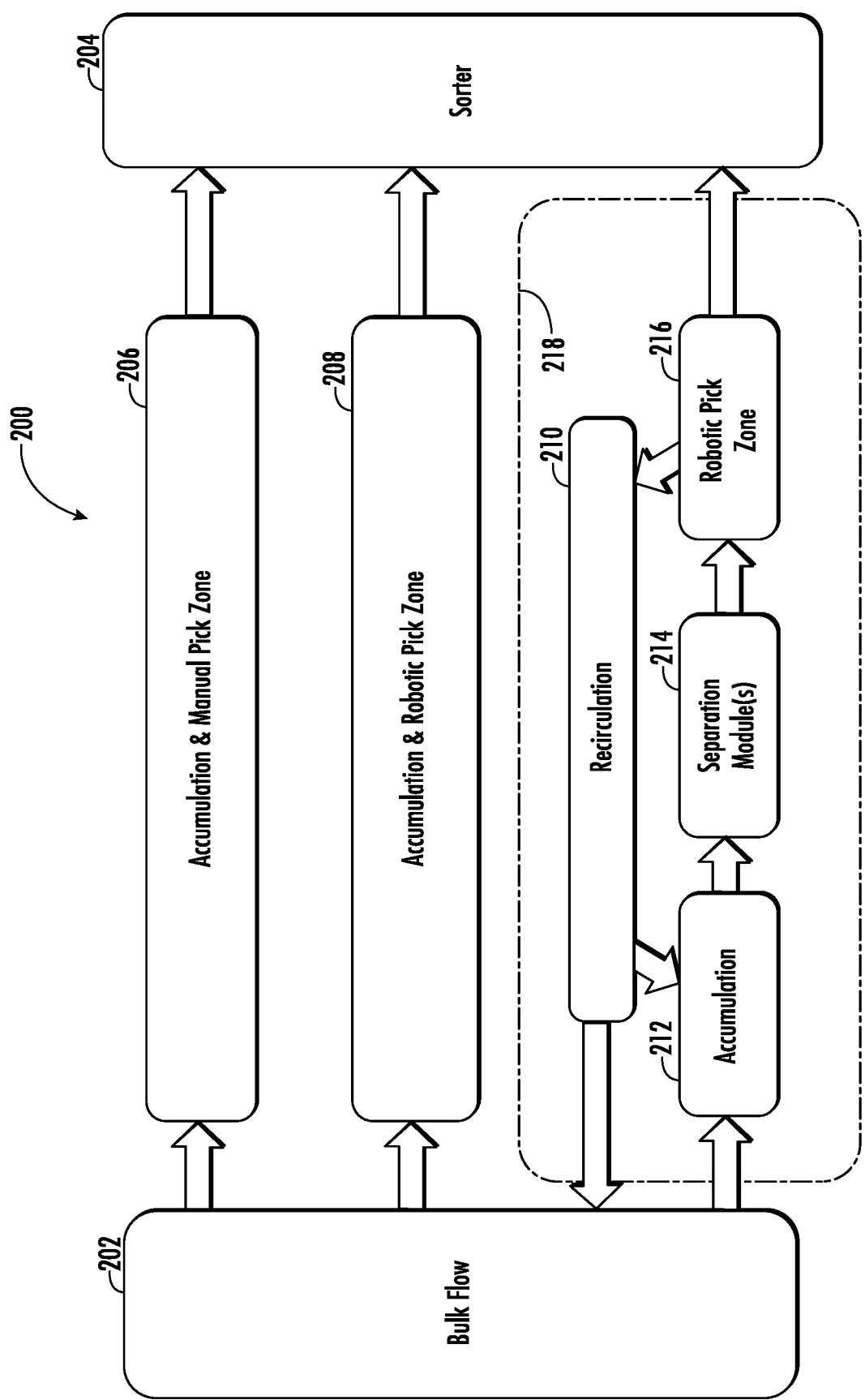
FIG. 2 illustrates an example schematic diagram of an example system in accordance with various embodiments of the present disclosure.

Referring now to FIG. 2, an example schematic diagram 200 of an example system in accordance with various embodiments of the present disclosure is illustrated.

As shown in FIG. 2, a flow of one or more articles in the material handling system may be from the bulk flow 202 (such as from the chute conveyor 101 described above in connection with FIG. 1) to the sorter 204 (such as the sorter section 105 described above in connection with FIG. 1). In some examples, before reaching the sorter 204, the one or more articles may flow through one or more zones defined for article handling. For instance, as illustrated in FIG. 2, in some examples, the one or more articles may flow through an accumulation and manual pick zone 206. The accumulation and manual pick zone 206 may correspond to an area within a material handling environment that may be designated for accumulating and manually picking one or more articles after the articles are being inducted from the bulk flow 202.

In some examples, the one or more articles may flow through an accumulation and robotic pick zone 208. For example, an accumulation zone (such as a static chute or slow-moving accumulation conveyor) may buffer up a predetermined capacity of articles. A robotic device (such as those described above) may pick up these articles from the accumulation zone and place them in the sorter 204.

In some examples, the one or more articles may flow through a zone 218 shown in FIG. 2. In some examples, the zone 218 may comprise a recirculation portion 210, an accumulation portion 212, a separation module portion 214, and/or a robotic pick portion 216. Similar to those described above, the accumulation portion 212 may buffer up a predetermined capacity of articles. From there, a metering belted conveyor may peel away articles from the bulk flow accumulation by means of belt friction. Thereafter, the articles may enter the separation module portion 214. The separation portion 214 may comprise of an array of separation modules of that may be of various types including, but not limited to, speed metering module(s), right angle peel-off module(s), width limiter and recirculation module(s), right angle peel-off with guided drop-off module(s), dog tail module(s), lobed MDR module(s), incline conveyor module(s), retracting tail conveyor module(s), sliding conveyor tray module(s), decline table module(s). One or more of these modules of the separation portion 214 may perform singulation of the articles. In some examples, the separation module portion 214 may be configured to facilitate article singulation before these articles reach a robotic device. In some examples, the zone 218 may be in an area in a distribution facility with very limit horizontal space, as these separation modules may be arranged through a series of levels and waterfalls to take advantage of vertical space, example details of which are described herein. As the articles flow through sets of separation modules in the separation module portion 214, a single layer of articles may be formed, such that an imaging device may capture imaging data of each article in the layer and a computing device may analyze the imaging data to control the robotic device to pick up at least one of these articles. In some examples, article(s) that may not be singulated or which the robotic device does not pick up may be recirculated back to the accumulation portion 212 through a recirculation portion 210.

Figure 3:
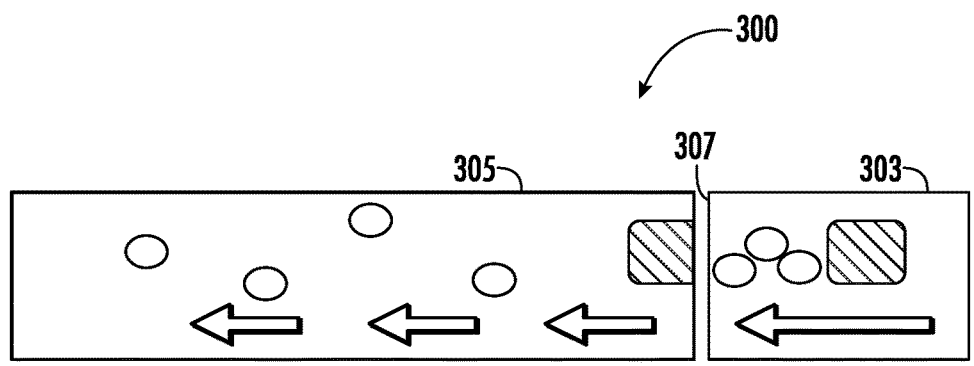
FIG. 3 illustrates an example schematic diagram of an example apparatus in accordance with various embodiments of the present disclosure.

As mentioned earlier, an article singulation section of a material handling system may include various singulation modules (e.g. the separation modules 214) that may perform separation and singulation of one or more articles that may have been inducted as a bulk. Referring now to FIG. 3, an example speed metering module 300 is illustrated. In some example embodiments, the speed metering module 300 may be utilized to perform singulation of the articles.

In the example shown in FIG. 3, the example speed metering module 300 may comprise a first conveyor 303 and a second conveyor 305 that may be downstream in a travel direction of the articles. In some examples, the second conveyor 305 may convey the one or more articles in the same direction as the first conveyor 303.

In some examples, the second conveyor 305 may have a conveyor speed that may be higher than the conveyor speed of the first conveyor 303. In these examples, one or more articles may accumulate on or near the transition 307 of the first conveyor 303, such that each of these articles may be singulated as they enter onto the second conveyor 305 e.g. due to difference in conveyor speed of the first conveyor 303 and the second conveyor 305.

In some examples, the first conveyor 303 may be in a same plane as the second conveyor 305. For example, both the first conveyor 303 and the second conveyor 305 may be incline conveyors. As used herein, the term "incline conveyor" refers to a conveyor that may be positioned with an incline angle in the direction that one or more articles travel on the conveyor.

As another example, both the first conveyor 303 and the second conveyor 305 may be decline conveyors. As used herein, the term "decline conveyor" refers to a conveyor that may be positioned with a decline angle in the direction that one or more articles travel on the conveyor.

As another example, both the first conveyor 303 and the second conveyor 305 may be horizontal conveyors. As used herein, the term "horizontal conveyor" refers to a conveyor that is positioned on a plane that is parallel to the horizon.

Figure 4:
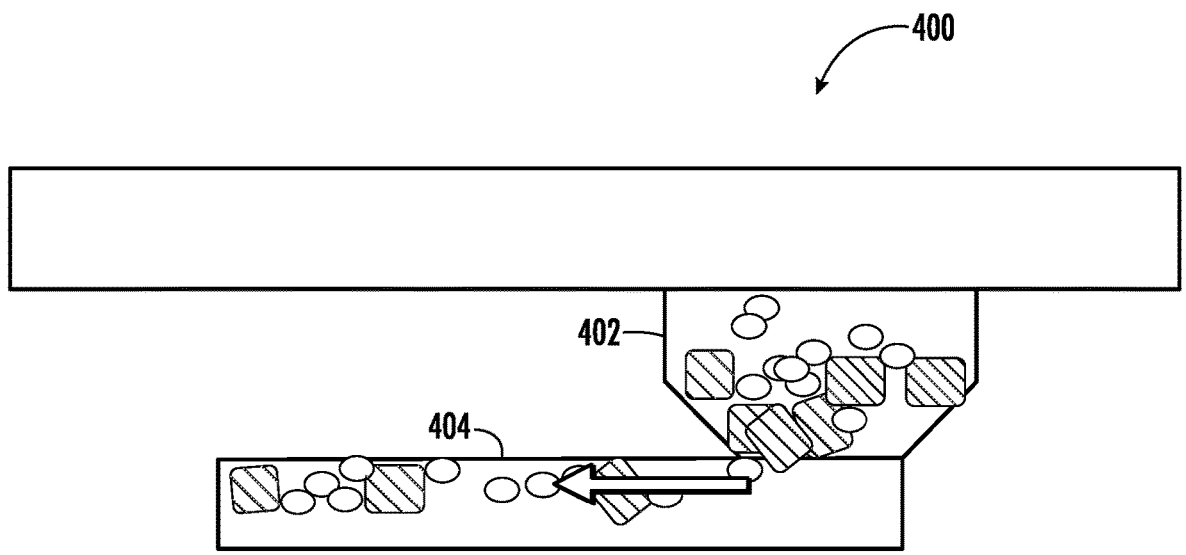
FIG. 4 illustrates an example schematic diagram of an example apparatus in accordance with various embodiments of the present disclosure.

In some example embodiments, the separation modules 214 may include a right angle peel-off module. Referring now to FIG. 4, an example right angle peel-off module 400 is illustrated. As shown in FIG. 4, the example right angle peel-off module 400 may comprise a chute conveyor 402 and a conveyor 404. In some examples, the chute conveyor 402 may be an incline conveyor. In some examples, the chute conveyor 402 may be a horizontal conveyor. In some examples, the chute conveyor 402 may be a decline conveyor.

In some examples, the conveyor 404 may be positioned next to or under the chute conveyor 402 to receive articles from the chute conveyor 402. In some examples, the conveyor 404 may convey the articles in a direction that is transverse from the direction that articles travel on the chute conveyor 402. For example, the conveyor 404 may be positioned in a right-angle arraignment with the chute conveyor 402, such that a longitudinal line of the conveyor 404 may be at a right angle (90 degrees) with a longitudinal line of the chute conveyor 402.

In some examples, the conveyor 404 may be an incline conveyor. In some examples, the conveyor 404 may be a horizontal conveyor. In some examples, the conveyor 404 may be a decline conveyor. In some examples, the conveyor 404 may have a conveyor speed higher than the chute conveyor 402, such that one or more articles may drop and peel off on the conveyor 404 close to the chute conveyor 402.

Figure 5:
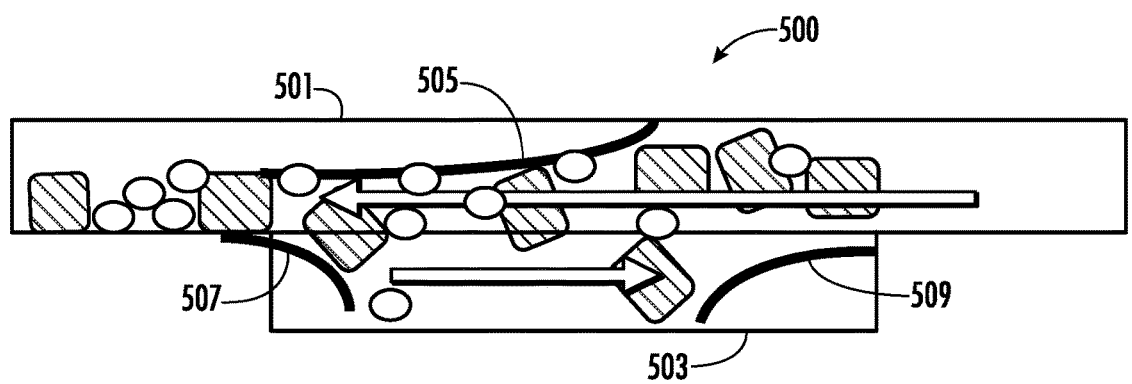
FIG. 5 illustrates an example schematic diagram of an example apparatus in accordance with various embodiments of the present disclosure.

In some example embodiments, the separation modules 214 may include a width limiter and recirculation module. Referring now to FIG. 5, an example width limiter and recirculation module 500 is illustrated. In the example shown in FIG. 5, the example width limiter and recirculation module 500 may comprise a first conveyor 501 and a second conveyor 503.

As shown in FIG. 5, the first conveyor 501 may be a primary conveyor, which may comprise a guide rail 505 that may push articles to one side of the first conveyor 501. In some examples, the second conveyor 503 may be a recirculation conveyor, which may be positioned off to one side of the first conveyor 501. In some examples, the second conveyor 503 may comprise one or more guide rails, such as a guide rail 507 and a guide rail 509 shown in FIG. 5.

In some examples, the second conveyor 503 may be configured to convey the articles in an opposite direction than the first conveyor 501 as shown in FIG. 5. In some examples, one or more articles (such as those that are too large to pass through the gap formed by the guide rail 505 and the guide rail 507) may be guided off the first conveyor 501 and gain traction on the second conveyor 503 to travel backwards, and then guided back onto the first conveyor 501 by the guide rail 509. In some examples, the second conveyor 503 may have a conveyor speed higher than the first conveyor 501.

In some examples, the first conveyor 501 may be an incline conveyor. In some examples, the first conveyor 501 may be a horizontal conveyor. In some examples, the first conveyor 501 may be a decline conveyor. In some examples, the second conveyor 503 may be an incline conveyor. In some examples, the second conveyor 503 may be a horizontal conveyor. In some examples, the second conveyor 503 may be a decline conveyor.

Figure 6:
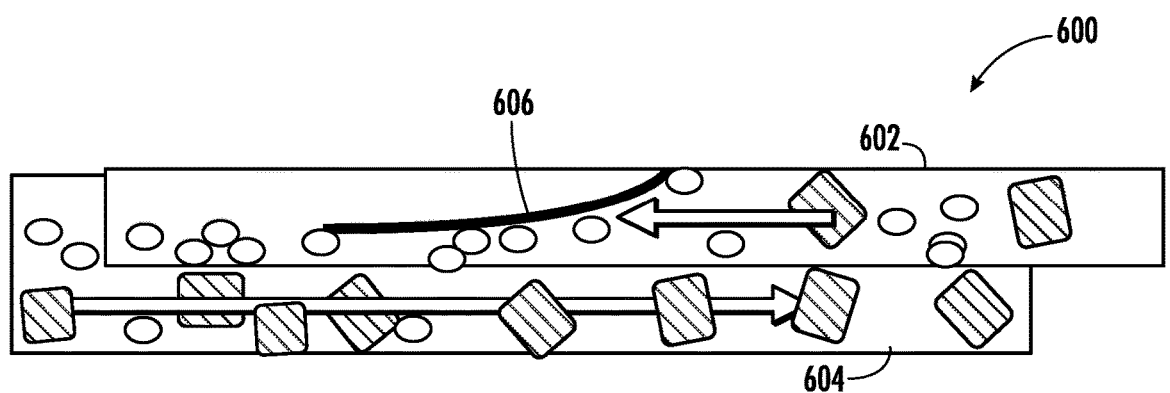
FIG. 6 illustrates an example schematic diagram of an example apparatus in accordance with various embodiments of the present disclosure.

In some example embodiments, the separation modules 214 may include a right angle peel-off with guided drop-off module. Referring now to FIG. 6, an example right angle peel-off with guided drop-off module 600 is illustrated. In the example shown in FIG. 6, the example right angle peel-off with guided drop-off module 600 may comprise a first conveyor 602 and a second conveyor 604.

In some examples, the first conveyor 602 may be a primary conveyor, which may comprise a guide rail 606 that may push one or more articles to one side e.g. towards a second conveyor 604. In some example embodiments, there may not be any guide rail to prevent articles from tumbling off the first conveyor 602 (e.g. in comparison with the width limiter and recirculation module 500 in FIG. 5). In some examples, larger article(s) may fall off the edge of the first conveyor 602 and onto the second conveyor 604. In some examples, rest of articles (i.e. excluding larger articles) on the first conveyor 602 may form a straight line and may proceed to the end of the first conveyor 602, which may land on the opposite side of the second conveyor 604 as compared to those articles that have already fallen from the first conveyor 602 due to the guide rail 606. Thus, by way of such operations, large sized articles from plurality of articles from the bulk flow may be separated from small and/or medium sized articles.

Figure 7:
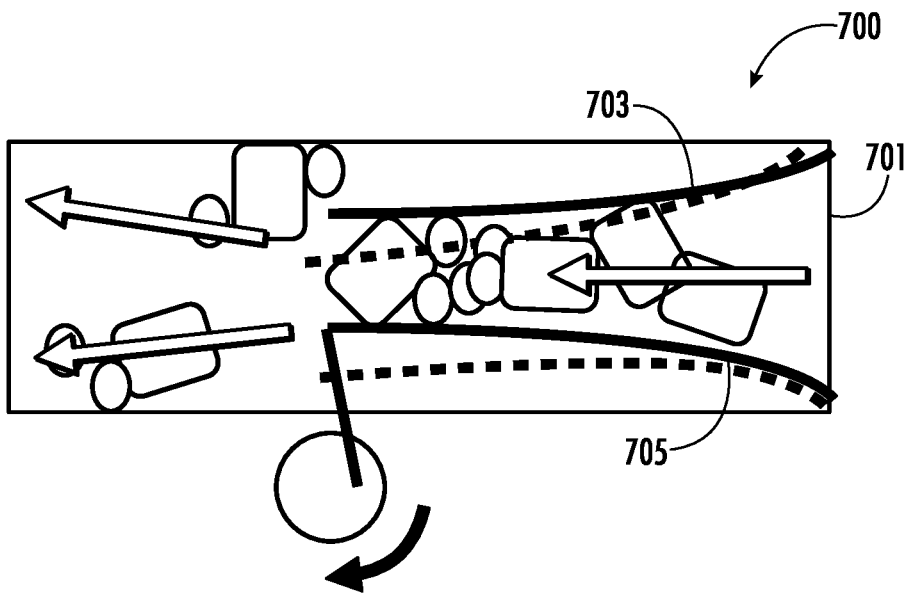
FIG. 7 illustrates an example schematic diagram of an example apparatus in accordance with various embodiments of the present disclosure.

In some example embodiments, the separation modules 214 may include a dog tail module. Referring now to FIG. 7, an example dog tail module 700 is illustrated. In the example shown in FIG. 7, the example dog tail module 700 may comprise a conveyor 701 and one or more guide rails. In some examples, the one or more guide rails may be static guide rails. In some examples, the one or more guide rails may be actuated guide rails (such as a pair of actuated guide rail 703 and actuated guide rail 705 shown in FIG. 7). In some examples, the actuated guide rail(s) may divert articles on the conveyor 701 to different transverse paths along the conveyor 701. In other words, the guide rails 703 and 705 may be movable or traverse horizontally across a width of the conveyor 701 from a reference position by actuator (e.g. an actuation arm or an actuator shaft). The guide rails 703 and/or 705 can be selectively actuated to cause separation of different types of articles from the bulk inflow.

Figure 8:
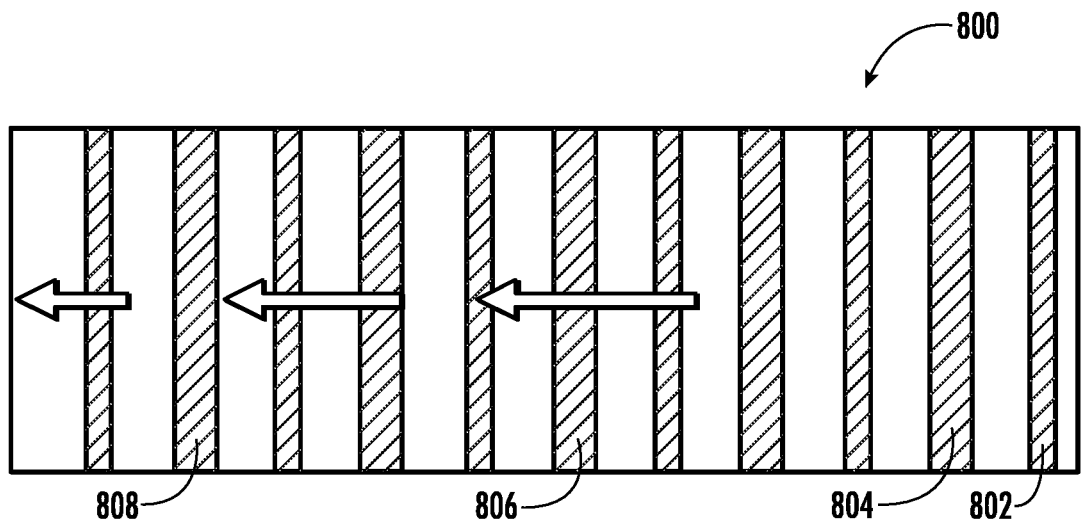
FIG. 8 illustrates an example schematic diagram of an example apparatus in accordance with various embodiments of the present disclosure.

In some example embodiments, the separation modules 214 may include a dog tail module. Referring now to FIG. 8, an example lobed MDR module 800 is illustrated.

In the example shown in FIG. 8, the example lobed MDR module 800 may comprise one or more motor driven rollers, such as a first motor driven roller 802, a second motor driven roller 804, a third motor driven roller 806, and a fourth motor driven roller 808. In some examples, the motor driven rollers 802-808 may form one or more zones. For instance, in an example, there may be three zones i.e. a first zone, a second zone, and a third zone that may be defined based on the motor driven rollers 802-806. As an example, the first zone may correspond to a portion of conveyor between the first motor driven roller 802 and the second motor driven roller 804. Further, the second zone may correspond to a portion of the conveyor between the second motor driven roller 804 and the third motor driven roller 806. Similarly, the third zone may correspond to a portion of the conveyor defined between the third motor driven roller 806 and the fourth motor driven roller 808. The portions of conveyor in respective zones can be operated at varying conveying speeds for conveying articles. For example, the motor driven roller 802 and the motor driven roller 804 may have a conveying speed that is slower than the conveying speed of the motor driven roller 806. As another example, the motor driven roller 806 may have a conveying speed that is lower than the conveying speed of the motor driven roller 808. In some examples, the conveying speeds of the motor driven rollers may increase along the travel direction of the articles. Thus, the plurality of articles may be conveyed at different speeds in each zone defined by the motor driven rollers 802-808.

Figure 9:
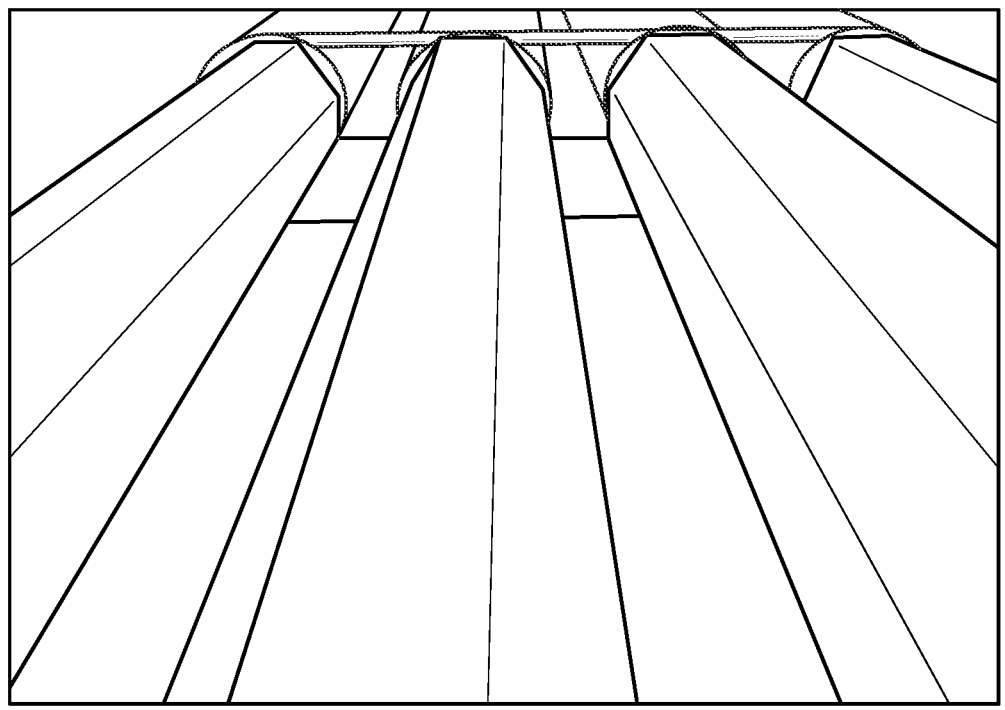
FIG. 9 illustrates an example view of an example apparatus in accordance with various embodiments of the present disclosure.
Figure 10:
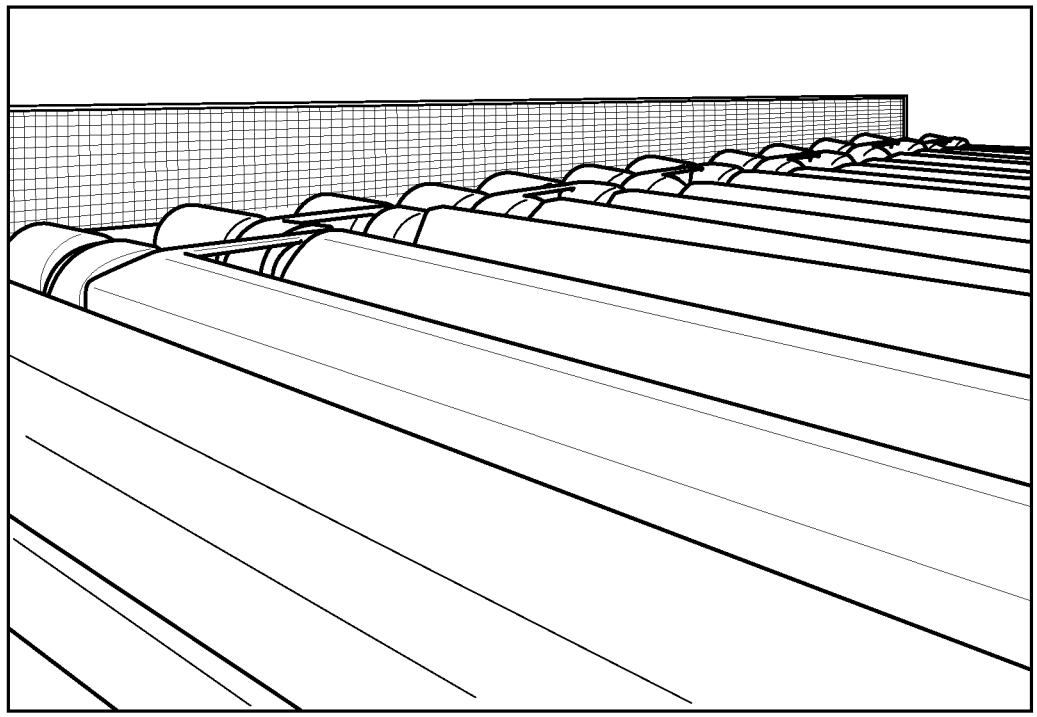
FIG. 10 illustrates an example view of an example apparatus in accordance with various embodiments of the present disclosure.

Referring now to FIG. 9 and FIG. 10, example views of motor driven rollers are illustrated. In some examples, one or more motor driven rollers may contain alternating lobes embedded into roller sleeves of the motor driven rollers, which may to provide de-shingling effect of stacked articles. In some example embodiments, each of the motor driven rollers as illustrated in FIGS. 9-10 may have a unique roller profile. In other words, each of the motor driven rollers may be of different form factor or made of different material that may assist in singulation and/or manipulation of the articles. For instance, in some example embodiments, some of the motor driven rollers may define a crown shape feature around its periphery. In some example embodiments, outer surface of some of the motor driven rollers may be made of a material with high co-efficient of friction compared to rest of the motor driven rollers. In some example embodiments, some of the motor driven rollers may define a protruded portion e.g. by positioning a dowel beneath a sleeve mounted over the roller around its outer circumference. Thus, in accordance with various example embodiments described herein, any arrangement or combinations of rollers of different cross-sectional profiles (smooth, rough/high friction, sleeve and dowel) can be possible. To this end, rollers of different cross-sectional profiles can be selectively actuated for rotation based on a degree of shingling desired for separating the plurality of items.

Figure 11:
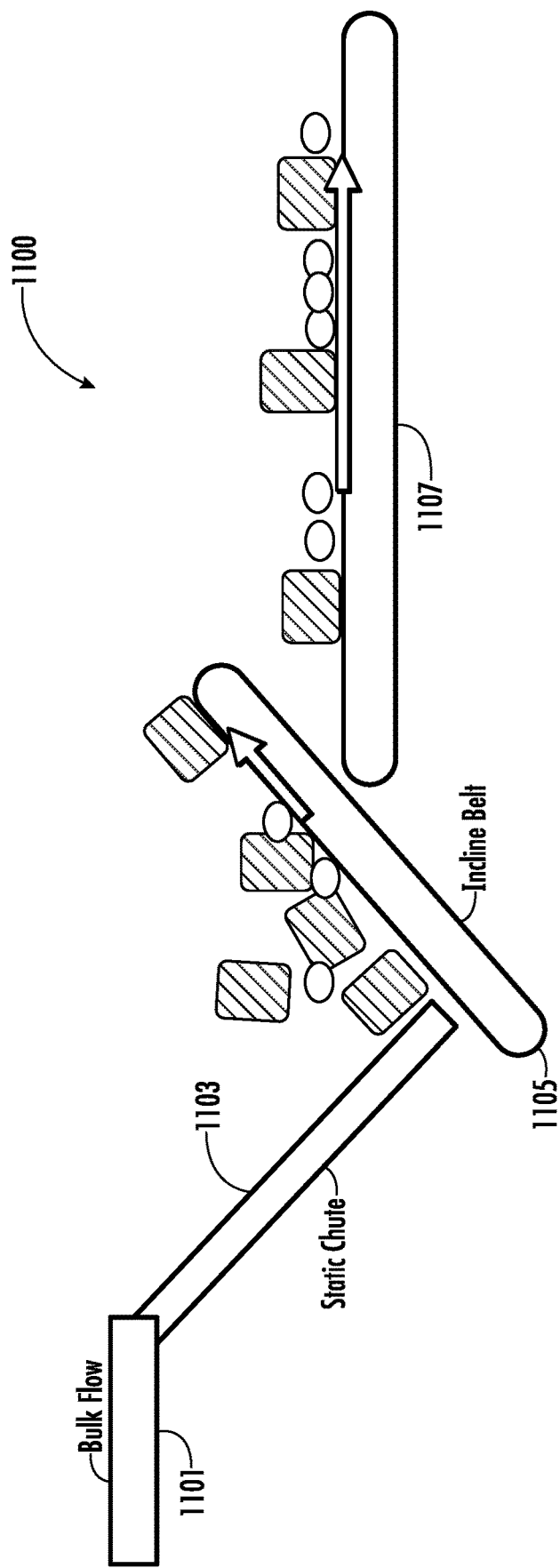
FIG. 11 illustrates an example schematic diagram of an example apparatus in accordance with various embodiments of the present disclosure.

In some example embodiments, the separation modules 214 may include an incline conveyor module. Referring now FIG. 11, an example of an incline conveyor module 1100 is illustrated. In the example shown in FIG. 11, the incline conveyor module 1100 may correspond to a conveyor assembly that can include an input conveyor 1101, a static chute conveyor 1103, an incline belt conveyor 1105, and a horizontal conveyor 1107. In an example embodiment, the input conveyor 1101 may receive an inflow of articles as a bulk inflow and convey the articles onto the static chute conveyor 1103 that may be positioned next to the input conveyor 1101. Further, the static chute conveyor 1103 can receive the articles from the input conveyor 1101. Furthermore, the articles can be transferred from the static chute conveyor 1103 to the incline conveyor 1105 positioned next to the static chute conveyor 1103. Furthermore, from the incline conveyor 1105, the articles can be transferred to the horizontal conveyor 1107 positioned next to the incline conveyor 1105. According to some example embodiments, one or more of the input conveyor 1101, the static chute conveyor 1103, the incline conveyor 1105, and the horizontal conveyor 1107 can be operated at a pre-defined conveyor speed so as to cause a desired singulation of the articles. For instance, in some example embodiments, the incline conveyor 1105 may be operated at a conveyor speed which can be lower than that of conveyor speed of the horizontal conveyor 1107, such that articles may be singulated through the incline conveyor module 1100.

Figure 12:
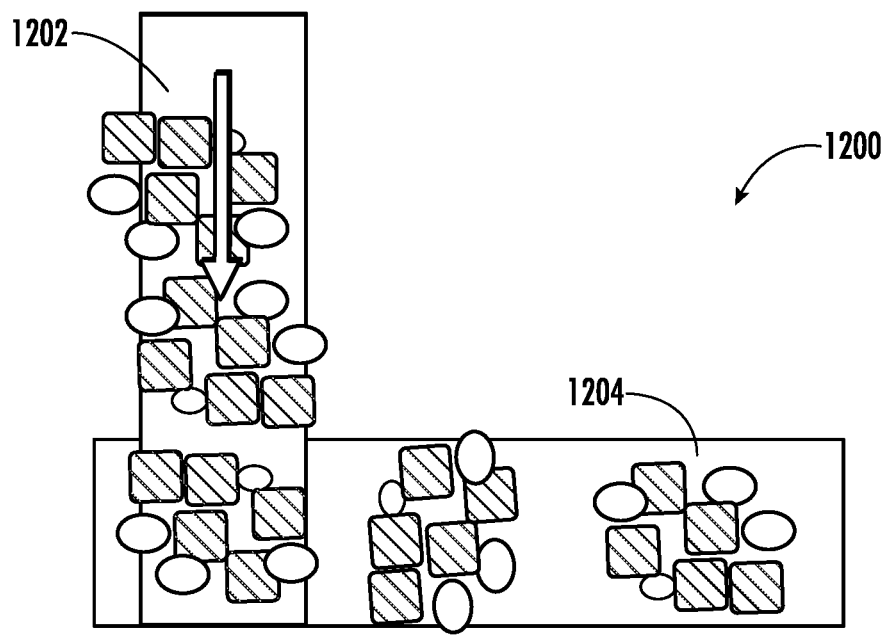
FIG. 12 illustrates an example schematic diagram of an example apparatus in accordance with various embodiments of the present disclosure.
Figure 13:
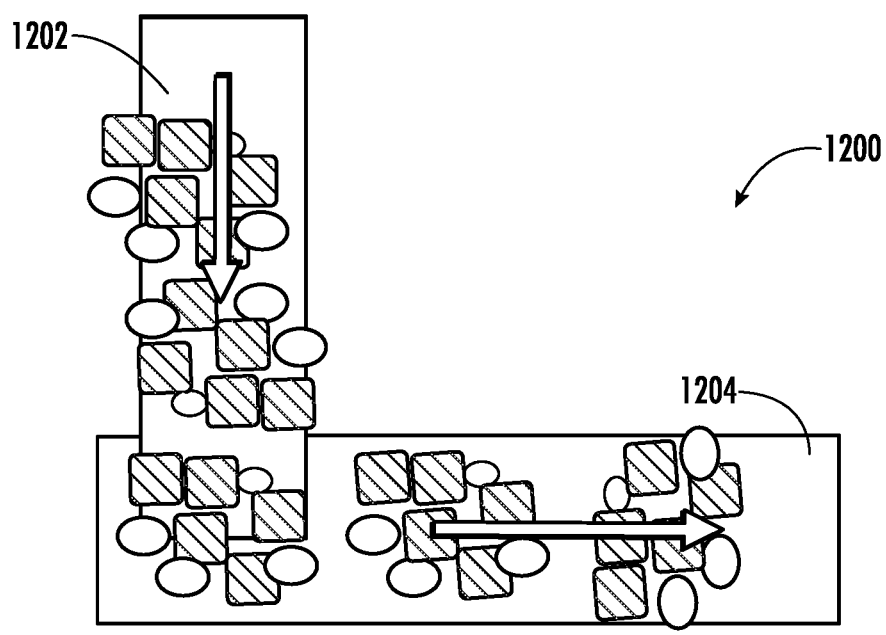
FIG. 13 illustrates an example schematic diagram of an example apparatus in accordance with various embodiments of the present disclosure.
Figure 14:
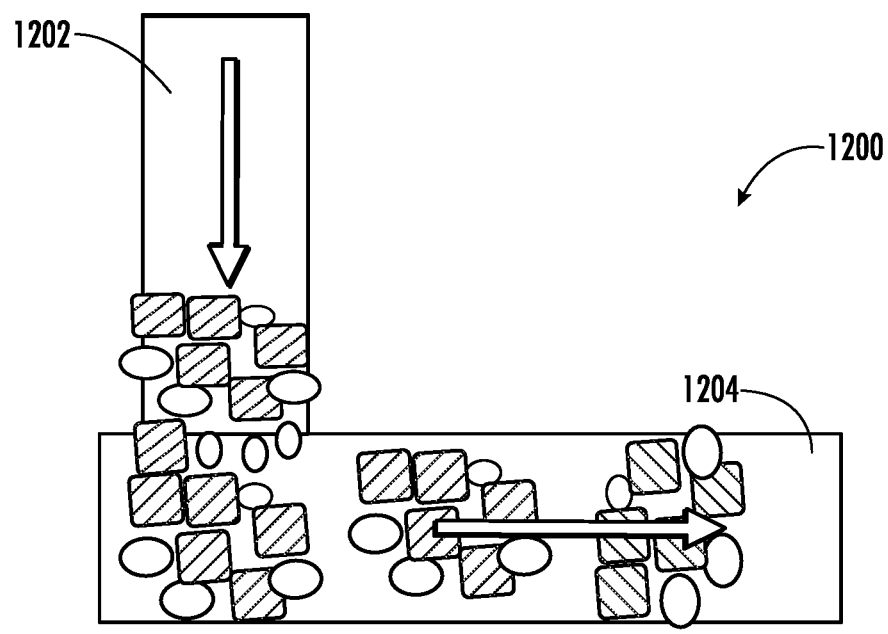
FIG. 14 illustrates an example schematic diagram of an example apparatus in accordance with various embodiments of the present disclosure.

In some example embodiments, the separation modules 214 for separating the articles may include a retracting tail conveyor module. Referring now to FIG. 12, FIG. 13, and FIG. 14, an example retracting tail conveyor module 1200 is illustrated. In the example shown in FIG. 12, the example retracting tail conveyor module 1200 may comprise a first conveyor 1202 and a second conveyor 1204. The second conveyor 1204 may be positioned next to the first conveyor 1202 and may receive one or more articles from the first conveyor 1202. In some examples, the first conveyor 1202 may be in a right-angle arrangement with the second conveyor 1204. For example, the first conveyor 1202 may convey one or more articles in a direction that is at a right angle to the direction where the second conveyor 1204 may convey the one or more articles, as illustrated in FIG. 13.

In some examples, the second conveyor 1204 may be a telescoping conveyor, which may include various conveyor modules that may retract or telescopically expand, as desired for conveyance of the articles. In some examples, the second conveyor 1204 by way of its telescopic operational mode may effectively adjust one or more drop-off points of the one or more articles from the first conveyor 1202 based on the telescopic retraction or expansion of the individual conveyor modules. In some examples, the second conveyor 1204 may react at a speed faster than the conveying speed of the first conveyor 1202, therefore creating one or more separations between articles as shown in FIG. 13 and FIG. 14.

Figure 15:
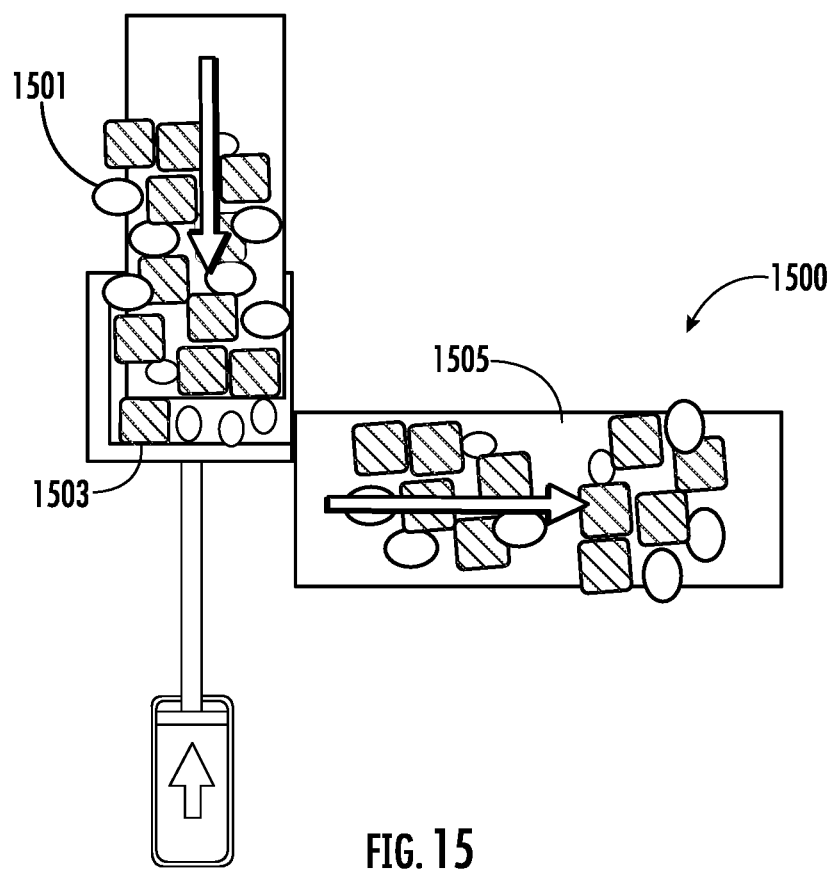
FIG. 15 illustrates an example schematic diagram of an example apparatus in accordance with various embodiments of the present disclosure.
Figure 16:
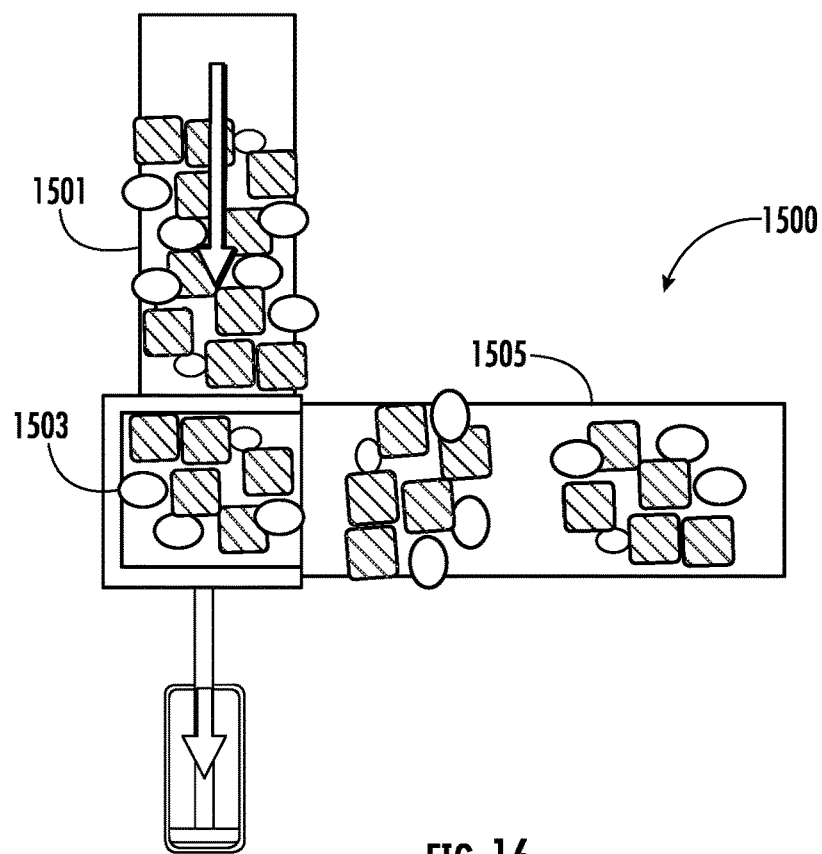
FIG. 16 illustrates an example schematic diagram of an example apparatus in accordance with various embodiments of the present disclosure.
Figure 17:
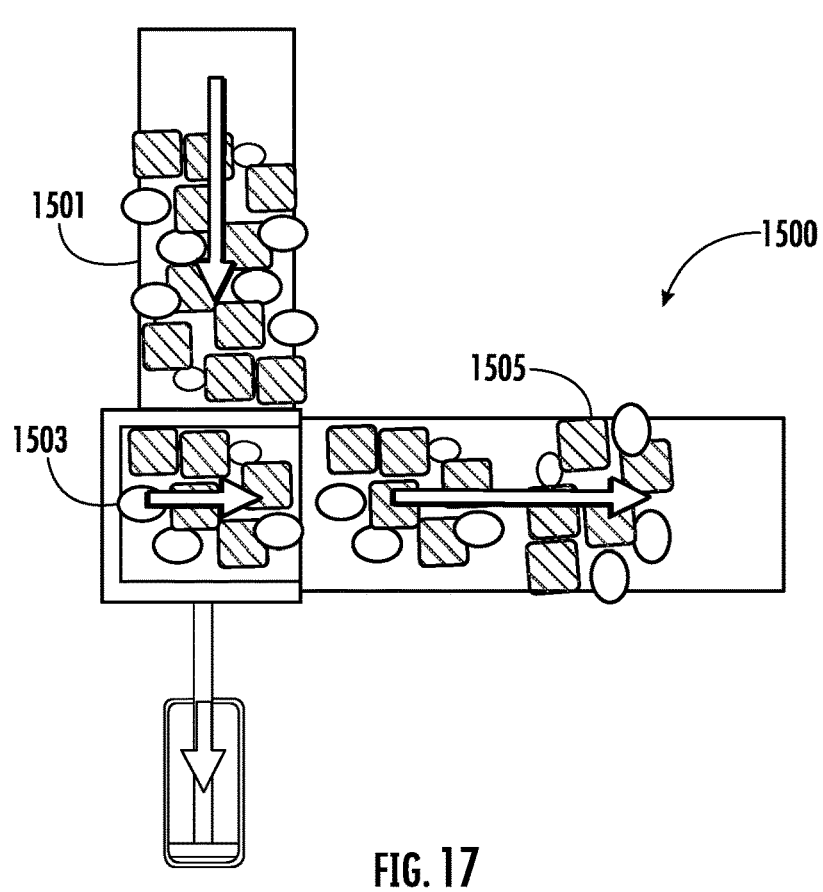
FIG. 17 illustrates an example schematic diagram of an example apparatus in accordance with various embodiments of the present disclosure.

In some example embodiments, the separation modules 214 may include a sliding tray conveyor module. FIGS. 15-17 illustrates examples of a sliding conveyor tray module 1500, in accordance with some example embodiments described herein.

In the example shown in FIG. 15, the sliding conveyor tray module 1500 may comprise a first conveyor 1501, a sliding tray 1503, and a second conveyor 1505. In some examples, the sliding tray 1503 may be configured to receive one or more articles from the first conveyor 1501 through an opening of the sliding tray 1503 shown in FIG. 15. The sliding tray 1503 may receive a defined or a fixed number of articles depending on its capacity to hold the articles.

In some examples, the sliding tray 1503 may be configured to slide towards the second conveyor 1505 upon meeting a pre-defined condition. For instance, in an example, in response to receiving a predetermined threshold number of articles, the sliding tray 1503 may start sliding towards the second conveyor 1505. In another example, in response to completion of a predetermined time period (e.g. a user defined time period) since the sliding tray 1503 started to receive articles, the sliding tray 1503 may slide towards the second conveyor 1505 and may rotate such that the opening of the sliding tray 1503 is orientated towards the second conveyor 1505 as shown in FIG. 16.

Further, in accordance with some example embodiments, as the sliding tray 1503 reaches its end point, the sliding tray 1503 may stop and convey the one or more articles onto the second conveyor 1505, as shown in FIG. 17. Thus, in accordance with some example embodiments, the sliding tray 1503 may effectively convey the one or more articles from the first conveyor 1501 to the second conveyor 1505 at a right angle, as illustrated in FIGS. 15-17.

Figure 18:
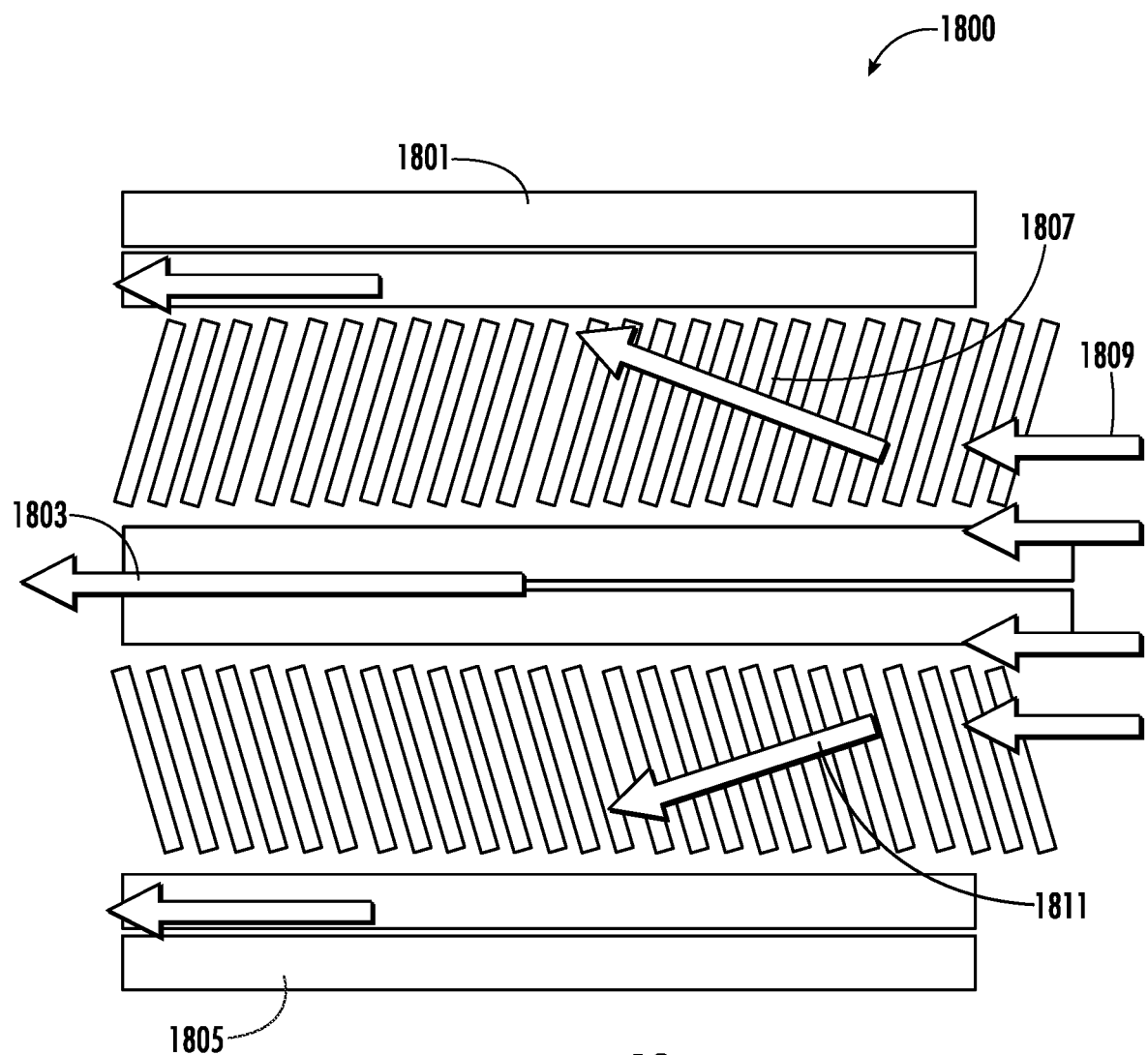
FIG. 18 illustrates an example schematic diagram of an example apparatus in accordance with various embodiments of the present disclosure.

According to some example embodiments, the separation modules 214 may include a decline table module. Referring now to FIG. 18, an example of decline table module 1800 is illustrated. In the example shown in FIG. 18, the decline table module 1800 may comprise one or more lanes of conveyors such as, but not limited to, a first conveyor lane 1801, a second conveyor lane 1803, and a third conveyor lane 1805. In some examples, the first conveyor lane 1801, the second conveyor lane 1803, and/or the third conveyor lane 1805 may be separated by one or more rollers, as shown in FIG. 18.

In the example shown in FIG. 18, the rollers between the first conveyor lane 1801 and the second conveyor lane 1803 may be positioned at an angle that may steer articles out of the second conveyor lane 1803 and towards the first conveyor lane 1801. In particular, the axis of the rollers may be in an obtuse angle arrangement with the travel direction of the articles on the second conveyor lane 1803. For example, a first arrow 1807 (which may be in a perpendicular arrangement with the axis of the rollers) may illustrate the travel direction of the one or more articles on the rollers. Similarly, a second arrow 1809 may illustrate the travel direction of the one or more articles on the second conveyor lane 1803. In this regard, as one or more articles fall from the second conveyor lane 1803, the rollers may continue their momentum and convey the articles to the first conveyor lane 1801. Similarly, the rollers between the third conveyor lane 1805 and the second conveyor lane 1803 may be positioned at an angle that may steer articles out of the second conveyor lane 1803 and towards the third conveyor lane 1805. In particular, the axis of the rollers may be in an obtuse angle arrangement with the travel direction of the articles on the second conveyor lane 1803. For example, a third arrow 1811 (which may be in a perpendicular arrangement with the axis of the rollers) may illustrate the travel direction of the one or more articles on the rollers. The second arrow 1809 may illustrate the travel direction of the one or more articles on the second conveyor lane 1803. Accordingly, as one or more articles fall from the second conveyor lane 1803, the rollers may continue the momentum and convey the articles to the third conveyor lane 1805.

Figure 19:
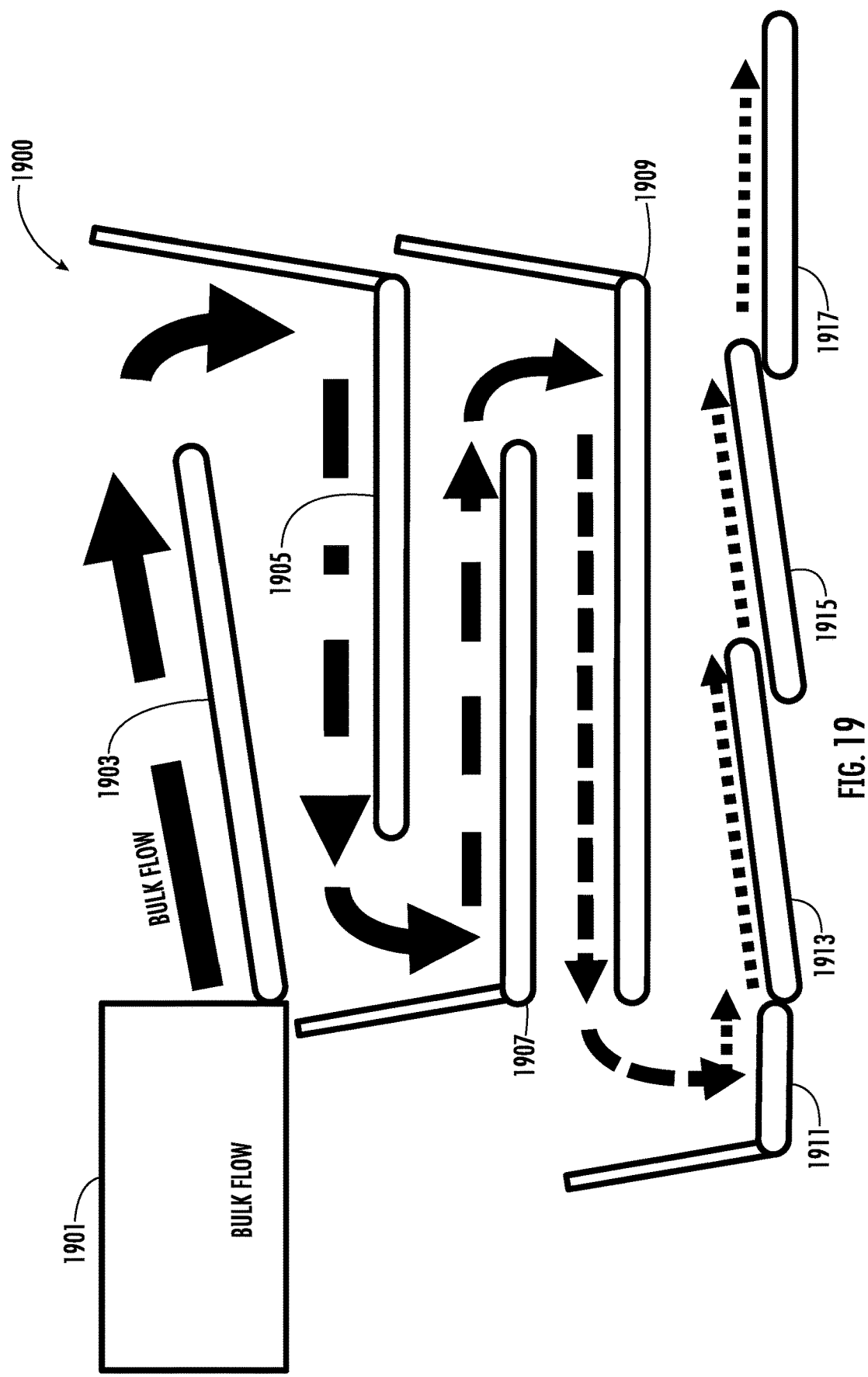
FIG. 19 illustrates an example schematic diagram of an example system in accordance with various embodiments of the present disclosure.
Figure 20:
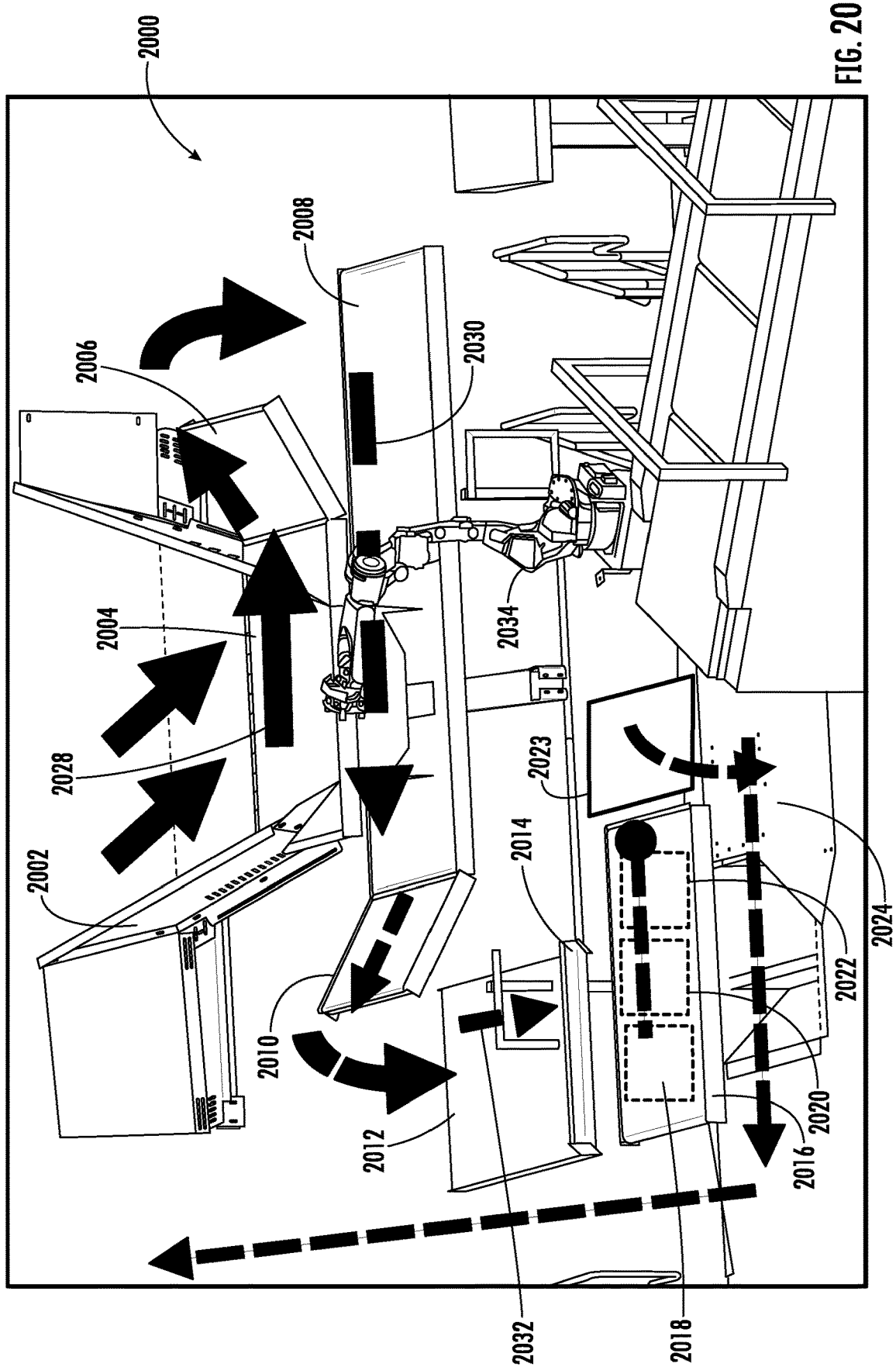
FIG. 20 illustrates an example view of an example system in accordance with various embodiments of the present disclosure.

FIG. 19 and FIG. 20 relates to example systems for singulation of articles, in accordance with some example embodiments described herein. In some examples, these systems may be present in a material handling environment e.g., but not limited to, a distribution center, a warehouse, an inventory, a shipping station, and/or the like.

FIG. 19 provides an example schematic diagram of an example article singulator system 1900, in accordance with some example embodiments described herein. In some examples, the example system 1900 may perform article singulation that may include separating one or more articles or creating a defined gap amongst one or more articles. In the example as shown in FIG. 19, one or more articles may be received at bulk flow 1901. In some example embodiments, the article singulator 1900 may include one or more conveyors, as described above in reference to FIGS. 1-18. In some examples, the example system 1900 may comprise one or more levels of article conveying devices that may singulate, separate, and/or flatten one or more articles in the bulk flow so that, for example, these articles may be handled by a robotic device.

For example, the example system 1900 may comprise a first-level article conveying device 1903 that may be configured to receive one or more articles from the bulk flow 1901. In some examples, the first-level article conveying device 1903 may be an incline conveyor. Further, as illustrated, the example system 1900 may comprise a second-level article conveying device 1905 that may be positioned under the first-level article conveying device 1903 and may be configured to receive one or more articles from the first-level article conveying device 1903. In some examples, the second-level article conveying device 1905 may be a horizontal conveyor.

Further, as illustrated, the example system 1900 may comprise a third-level article conveying device 1907, which may be positioned under the second-level article conveying device 1905 and may be configured to receive one or more articles from the second-level article conveying device 1905. In some examples, the third-level article conveying device 1907 may be a horizontal conveyor. Furthermore, as illustrated, in some examples, the example system 1900 may comprise a fourth-level article conveying device 1909, which may be positioned under the third-level article conveying device 1907 and may be configured to receive one or more articles from the third-level article conveying device 1907. In some examples, the fourth-level article conveying device 1909 may be a horizontal conveyor. Accordingly, in some example embodiments, the article singulator may include multiple conveyors that may be positioned at multiple levels (i.e. at different heights from a ground surface) in a layered fashion. In this regard, the articles may flow from each of these layers operating at varying conveying speed that may cause separation and/or singulation of the articles.

In some examples, the conveyor speed may increase as the one or more articles travel through the first-level article conveying device 1903, the second-level article conveying device 1905, the third-level article conveying device 1907, and the fourth-level article conveying device 1909. For example, the first-level article conveying device 1903 may have a conveyor speed of 8 fpm, the second-level article conveying device 1905 may have a conveyor speed of 12 fpm, the third-level article conveying device 1907 may have a conveyor speed of 15 fmp, and the fourth-level article conveying device 1909 may have a conveyor speed of 20 fmp. In some examples, other conveyor speeds may be used for these article conveying devices. In some example embodiments, the article singulator 1900 may include a processor device and/or a controller that may control conveyor speed at which each conveyor part of the article singulator 1900 may operate. Further, the processor device and/or the controller may also manipulate the speed of these individual conveyors so as to create a desired separation amongst the plurality of articles.

Referring back to FIG. 19, the example system 1900 may comprise one or more article conveying devices, such as article conveying devices 1911, 1913, 1915, and 1917. The article conveying device 1911 may be configured to receive one or more articles from the fourth-level article conveying device 1909 and may be an incline conveyor. The article conveying device 1913 may be an incline conveyor, which may be positioned next to the article conveying device 1911 and may convey the articles to the article conveying device 1915. The article conveying device 1915 may be an incline conveyor, which may be positioned next to the article conveying device 1913 and may convey the articles to the article conveying device 1917. The article conveying device 1917 may be a horizontal conveyor.

In some examples, the article conveying devices 1911, 1913, 1915, and 1917 may have varying conveyor speeds. For example, the conveyor speed of the article conveying device 1911 may be slower than that of the article conveying devices 1913 and 1915. The conveyor speed of the article conveying device 1917 may be faster than that of the article conveying devices 1913 and 1915.

In some examples, when the example system 1900 as shown in FIG. 19 is implemented, an example robotic device may no longer need to pick up and/or place articles. Instead, the example robotic device may only need to flip and/or reoriented these articles as needed. In some examples, the example system 1900 may further implement a reject sweeper and re-induct ramp that may be downstream of the travel direction of the articles, which may handle article(s) that are rejected by the robotic device.

FIG. 20 provides an example perspective view of an example article singulator system 2000. In some examples, the article singulator system 2000 may perform article singulation. As illustrated, in some examples, one or more articles may be received from an intake conveyor (e.g. decline chute 2002). In the example as shown in FIG. 20, the one or more articles may drop from the decline chute 2002 to the first-level article conveying device 2004. In some examples, the first-level article conveying device 2004 may receive the one or more articles from the decline chute 2002. In some examples, the first-level article conveying device 2004 may comprise a first conveyor that may be positioned on a first horizontal plane. In some examples, the first conveyor may be configured to convey at least one article at a first speed to a first direction, as shown in arrow 2028.

Further, in some examples, the first-level article conveying device 2004 may comprise a first incline conveyor 2006 that may be positioned next to the first conveyor. In some examples, the first incline conveyor 2006 may be configured to receive the at least one article from the first conveyor and convey the at least one article at a third speed. In some examples, the third speed of the first incline conveyor 2006 may be higher than the first speed of the first-level article conveying device 2004. In some examples, the first incline conveyor 2006 may peel out articles from the bulk flow based at least in part on the faster speed.

In some examples, the first incline conveyor 2006 may be configured to release the at least one article to at least one location on a second-level article conveying device, such as the second-level article conveying device 2008, as shown in FIG. 20. The second-level article conveying device 2008 may comprise a second conveyor that may be positioned on a second horizontal plane that may be lower than the first horizontal plane of the first-level article conveying device 2004, as shown in FIG. 20. In some examples, the second-level article conveying device 2008 may be configured to receive the at least one article from the first-level article conveying device 2004 and may convey the at least one article at a second speed to a second direction, as shown in arrow 2030.

In some examples, the second direction of the second-level article conveying device 2008 may be in a straight-angle arrangement from the first direction of the first-level article conveying device 2004. For example, the arrow 2028 (which indicates the first direction of the first-level article conveying device 2004) may point to the opposite direction as the arrow 2030 (which indicates the second direction of the second-level article conveying device 2008). In some examples, the second speed of the second-level article conveying device 2008 may be faster than the first speed of the first-level article conveying device 2004.

In some examples, the second conveyor of the second-level article conveying device 2008 may comprise a first conveyor belt and a second conveyor belt. In some examples, the second conveyor belt may be downstream of the first conveyor belt in the second direction. In some examples, a second belt speed of the second conveyor belt may be higher than a first belt speed of the first conveyor belt.

In some examples, the second-level article conveying device 2008 may comprise one or more separation modules for conveying and/or singulating the articles. For example, the second-level article conveying device 2008 may comprise one or more of speed metering module, right angle peel-off module, width limiter and recirculation module, right angle peel-off with guided drop-off module, dog tail module, lobed MDR module, incline conveyor module, retracting tail conveyor module, sliding conveyor tray module, and/or decline table module as described above, in reference to FIGS. 1-18.

In some examples, the second-level article conveying device 2008 may comprise a second incline conveyor 2010 that may be positioned next to the second conveyor. In some examples, the second incline conveyor 2010 may be configured to receive the at least one article from the second conveyor and convey the at least one article at a third speed. In some examples, the third speed may be higher than the second speed of the second conveyor. In some examples, the second incline conveyor 2010 may be configured to release the at least one article to at least one location on a third-level article conveying device, such as a third-level article conveying device 2012, as shown in FIG. 20.

Illustratively, the article singulator system 2000 may comprise a third-level article conveying device 2012. In some examples, the third-level article conveying device 2012 may comprise a third conveyor that may be positioned on a third horizontal plane. In some examples, the third horizontal plane may be lower than the second horizontal plane of the second-level article conveying device 2008. In some examples, the third conveyor may be configured to receive the at least one article from the second-level article conveying device 2008 and convey the at least one article at a third speed to a third direction, as shown in arrow 2032. In some examples, the third direction may be in a right-angle arrangement from the second direction. For example, the arrow 2032 (which indicates the third direction of the third-level article conveying device 2012) may form a right angle with the arrow 2030 (which indicates the second direction of the second-level article conveying device 2008).

According to some example embodiments, the third-level article conveying device 2012 may comprise one or more separation modules for conveying and/or singulating the articles. For example, the third-level article conveying device 2012 may comprise one or more of speed metering module, right angle peel-off module, width limiter and recirculation module, right angle peel-off with guided drop-off module, dog tail module, lobed MDR module, incline conveyor module, retracting tail conveyor module, sliding conveyor tray module, and/or decline table module as described above, in reference to FIGS. 1-18.

In some examples, the third-level article conveying device may further comprise a third incline conveyor 2014 that may be positioned next to the third conveyor. In some examples, the third incline conveyor 2014 may be configured to receive the at least one article from the third conveyor and convey the at least one article at a fourth speed. In some examples, the third incline conveyor 2014 may be configured to release the at least one article to at least one location on a fourth-level article conveying device, such as the fourth-level article conveying device 2016, as shown in FIG. 20. For example, the third incline conveyor 2014 may hold and/or drop articles at different positions along the fourth-level article conveying device 2016.

As illustrated, the example article singulator system 2000 may comprise a fourth-level article conveying device 2016. In some examples, the fourth-level article conveying device 2016 may comprise a fourth conveyor that may be positioned on a fourth horizontal plane. In some examples, the fourth horizontal plane may be lower than the third horizontal plane. In some examples, the fourth conveyor may be configured to receive the at least one article from the third-level article conveying device 2012 and convey the at least one article at a fourth speed to a fourth direction. In some examples, the fourth-level article conveying device 2016 may be configured to index one or more articles to a set location on the fourth conveyor once the one or more articles are dropped on the fourth conveyor.

According to some example embodiments, at least one conveyor of the article singulator system 2000 may include a plurality of zones through which one or more articles can be conveyed to achieve a desired article singulation and/or handling. For instance, as illustrated, the fourth conveyor may comprise a first zone 2018, a second zone 2020, and a third zone 2022. As shown in FIG. 20, the second zone 2020 may be downstream of the first zone 2018 in the fourth direction, and the third zone 2022 may be downstream of the second zone 2020 in the fourth direction.

According to some example embodiments, the article singulator system 2000 may comprise an imaging device (e.g. a camera) that may be positioned to capture at least one image of the one or more articles. In some example embodiments, the imaging device may capture at least one image of the one or more articles on the second zone 2020.

In some examples, the example article singulator system 2000 may comprise a robotic device 2034 (e.g. a robotic manipulator with a robotic arm) that may be positioned to move one or more articles. In an example embodiment, the robotic device 2034 may move the one or more articles when the articles are on the third zone 2022. For example, the robotic device 2034 may pick up and place some or all of acceptable articles on an induction section and may leave the rest of the articles on the fourth-level article conveying device 2016.

In some examples, the example system 2000 may comprise a computing device in electronic communication with the imaging device and the robotic device 2034. In some examples, the computing device may comprise at least one processor and at least one non-transitory memory comprising a computer program code. In some example embodiments, the at least one non-transitory memory and the computer program code may be configured to, with the at least one processor, cause the robotic device to move the at least one article based on the at least one image captured by the imaging device.

According to some example embodiments, one or more images captured by the imaging device may be analyzed by the computing device to identify one or more characteristics of the articles. This information associated with characteristics (e.g. geometric features) of the articles that may be utilized for handling the articles. For instance, in some example embodiments, image data pertaining to the one or more images captured by the imaging device (e.g. a depth camera and/or a color camera) may be utilized to identify various characteristics such as, but not limited to, depth information, information about a plurality of 3D points over various surfaces of shingled items, 3D points on different surfaces of the items that may be captured in a scene, information about background pixels and foreground pixels of a scene, and/or the like. Various image processing techniques such as, but not limited to, time of flight estimation, triangulation or phase shift estimation, corner detection, edge detection, feature detection techniques may be utilized by the computing device for identifying these characteristics. Further, upon identification of these characteristics one or more use cases (e.g. partially overlapped articles, fragile articles, vertically overlapped articles, horizontally stacked articles, etc.) may be determined according to which the articles may be handled (e.g. by a robotic device). In an example embodiment, the computing device may analyze the at least one image to determine whether a corresponding article is acceptable (e.g. broken/faulty based on wear and tear of a package). If the computing device determines that the article is acceptable, the computing device may, for example, cause the robotic device to move the corresponding article to an induction section. Alternatively, the robotic device may not pick that article.

As illustrated, according to some examples, the fourth conveyor may comprise a sliding surface 2023 configured to release the at least one article to a fifth-level article conveying device, such as the fifth-level article conveying device 2024, as shown in FIG. 20. In some examples, the sliding surface 2023 may comprise a trap door. When one or more articles are left on the fourth-level article conveying device 2016 (i.e. not picked up or moved by the robotic device), these articles may be conveyed onto the sliding surface 2023. In some examples, the sliding surface 2023 may allow the robotic device 2034 to maintain a low height, which may avoid tenting issue in the confined space. In some examples, once a predetermined amount of articles are placed on the sliding surface 2023 and/or a predetermined amount of time has passed since the first article arrives on the sliding surface 2023, the sliding surface 2023 may slide and allow the articles to drop onto the fifth-level article conveying device 2024. In some examples, after all articles are dropped, the sliding surface 2023 may return to closed position and may receive the next round of articles.

In some examples, the fifth-level article conveying device 2024 may recirculate the one or more articles to the example system 2000. For example, the fifth-level article conveying device 2024 may recirculate the one or more articles back to the decline chute 2002.

According to some example embodiments, these article singulator systems may comprise an intake conveyor, an out-take conveyor, and multiple intermediate conveyors that may be positioned in a manner so as to enable singulation of articles. In this regard, in an example operation, the intake conveyor may receive one or more articles (e.g. from a bulk inflow) and convey the articles via successive conveyors of multiple intermediate conveyors, and further to the out-take conveyor. In some example embodiments, each successive conveyor of the multiple intermediate conveyors may be positioned at level (i.e. height from ground surface) that may be lower than a preceding conveyor of the multiple intermediate conveyors. Further, in some example embodiments, each successive conveyor can convey the one or more articles in a different direction and at a different speed than a preceding conveyor such that the plurality of articles is singulated by the multiple intermediate conveyors. Furthermore, in some example embodiments, the multiple intermediate conveyors may include a switch conveyor (i.e. a conveyor that defines an outfeed path to outfeed singulated articles and a recirculation path to recirculate back non-singulated articles). In other words, the switch conveyor may comprise a first conveyor path and a second conveyor path such that, the first conveyor path interfaces with a portion of at least one of any preceding conveyors of the plurality of conveyors, thereby, defining a closed loop passage for conveying non-singulated articles back to any of the preceding conveyors. Further, the second conveyor path may interface with the out-take conveyor to receive the plurality of singulated articles onto the out-take conveyor. FIGS. 21-38 illustrates various examples of article singulator systems with one or more the above described aspects, in accordance with some example embodiments.

Figure 21:
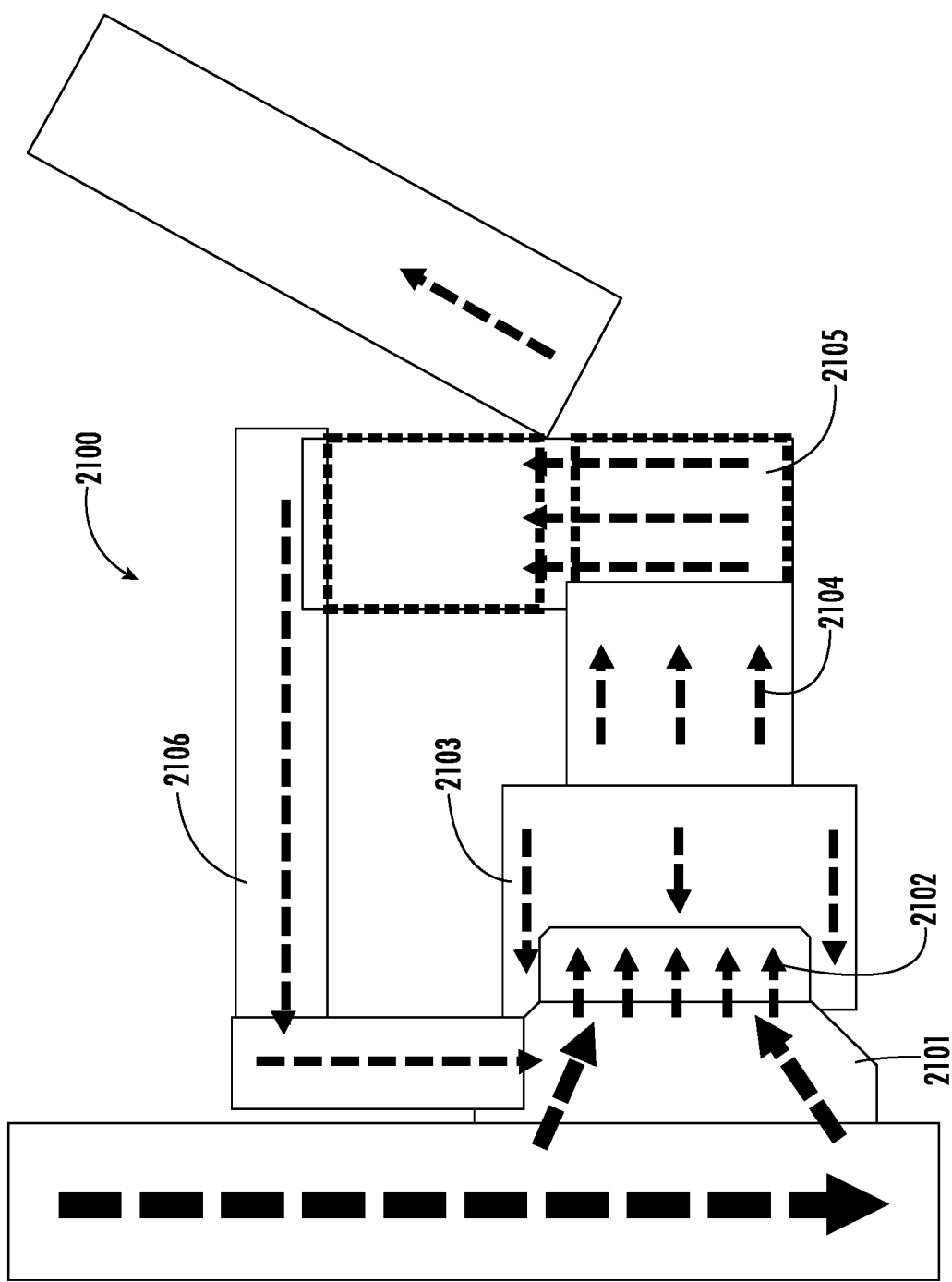
FIG. 21 illustrates an example schematic diagram of an example system in accordance with various embodiments of the present disclosure.

FIG. 21 provides an example schematic diagram of an example system 2100. In some examples, the example system 2100 may perform article singulation. As illustrated, in some example embodiments, the example system 2100 may comprise a first-level article conveying device 2101, a second-level article conveying device 2102, a third-level article conveying device 2103, a fourth-level article conveying device 2104, a fifth-level article conveying device 2105, and a sixth-level article conveying device 2106. In some examples, article conveying device at each level may include a conveyor that may be positioned at relatively a different height compared to a preceding or succeeding conveyor of the system 2100.

In some examples, the first-level article conveying device 2101 may be a static chute conveyor that may receive one or more articles from a bulk flow. In some example embodiments, the first level article conveying device 2101 may include an intake conveyor that may receive the one or more articles from an infeed. In some examples, the second-level article conveying device 2102 may be an incline conveyor. In some examples, the third-level article conveying device 2103 may be a transverse separation module. In some examples, the fourth-level article conveying device 2104 may be a retracting or metering conveyor. In some examples, the fifth-level article conveying device 2105 may be an indexing conveyor. In some examples, the sixth-level article conveying device 2106 may be a recirculation incline conveyor. Example details of these article conveying devices are described further herein in connection with at least FIG. 22, FIG. 23, FIG. 24, FIG. 25, and FIG. 26.

Figure 22:
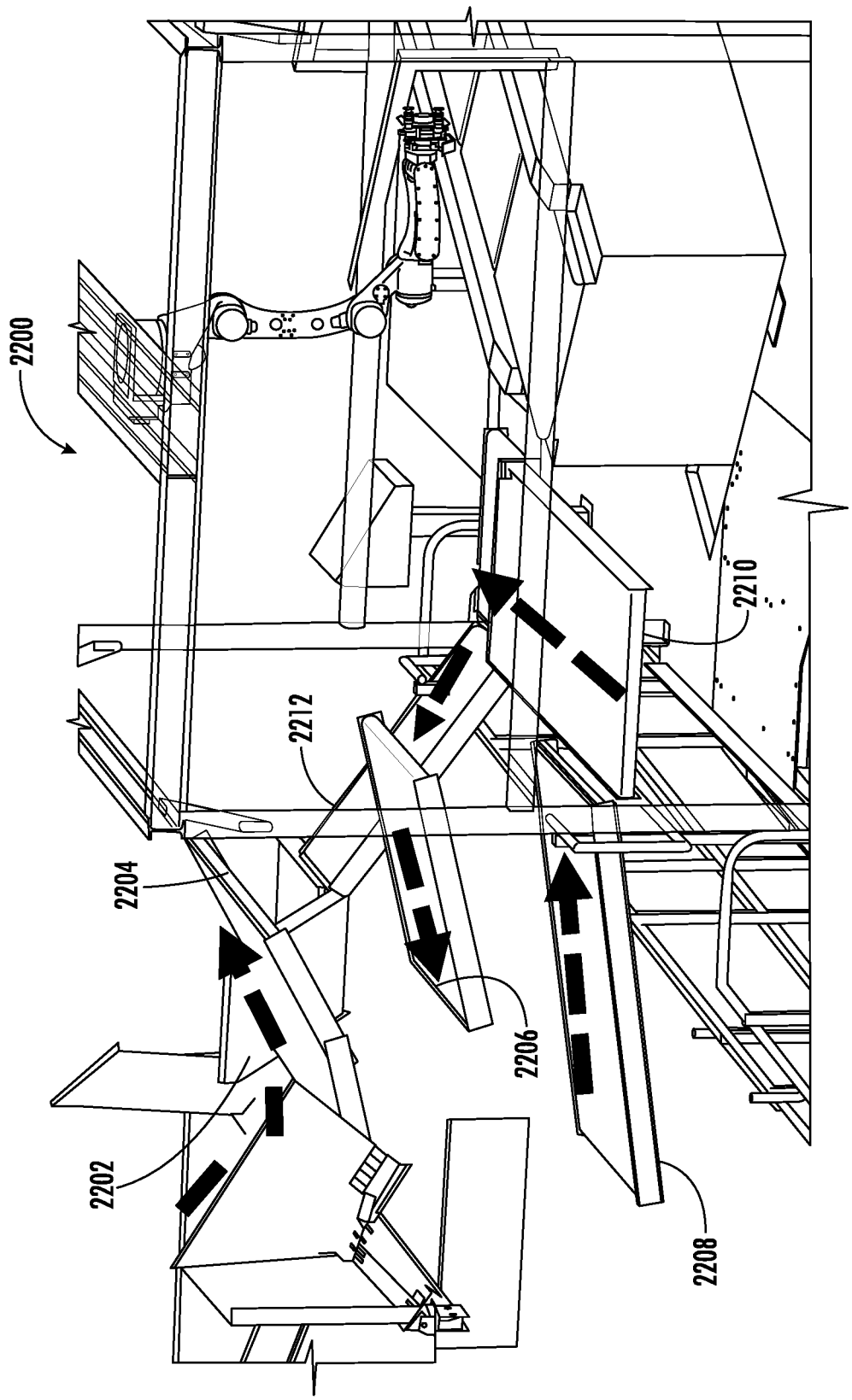
FIG. 22 illustrates an example view of an example system in accordance with various embodiments of the present disclosure.
Figure 23:
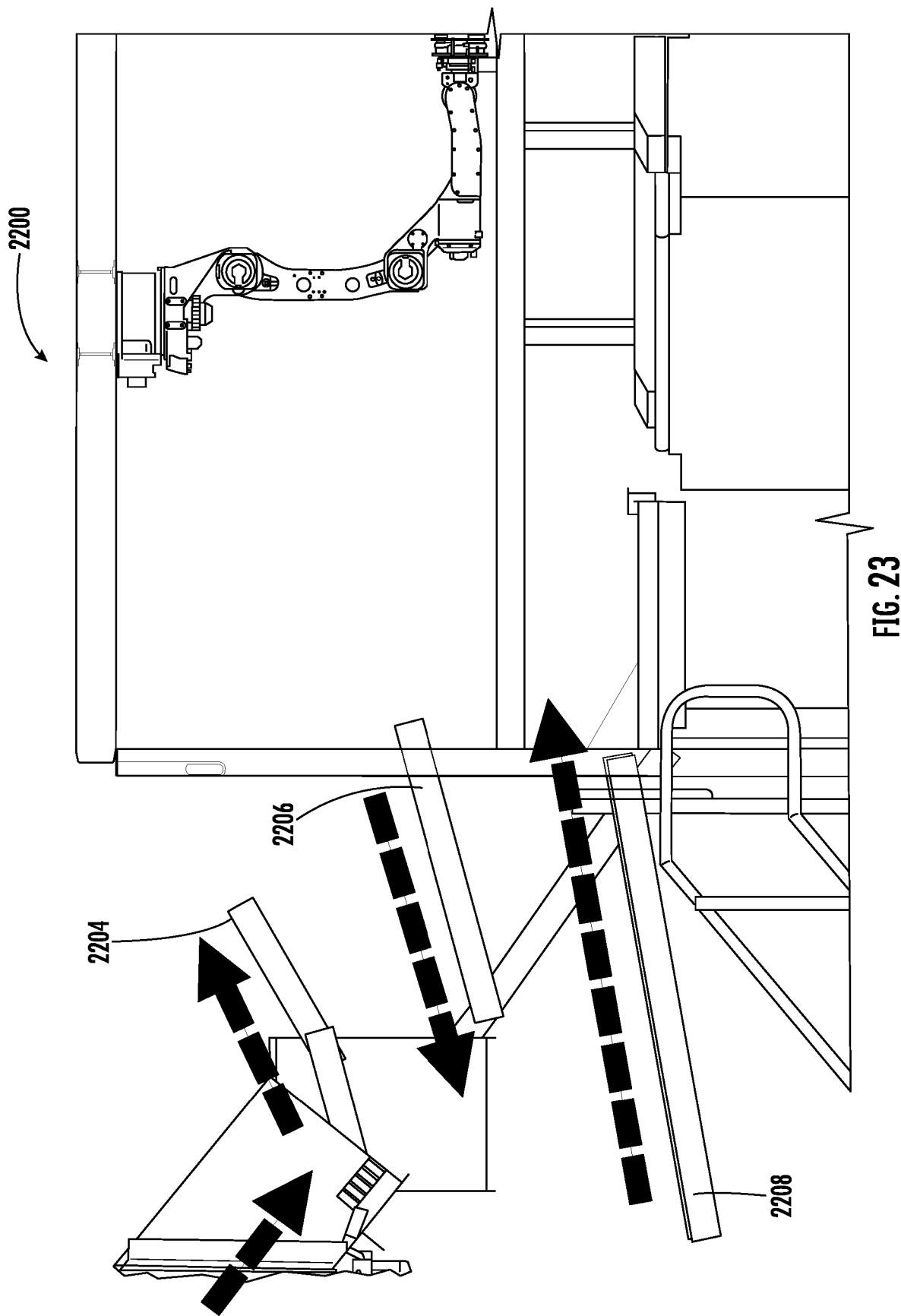
FIG. 23 illustrates an example view of an example system in accordance with various embodiments of the present disclosure.

Referring now to FIG. 22, FIG. 23, FIG. 24, FIG. 25, and FIG. 26, various views of an example system 2200 are illustrated. In some examples, the example system 2200 may perform article singulation. As shown in FIG. 22 and FIG. 23, the example system 2200 may comprise a first-level article conveying device 2202. In some examples, the first-level article conveying device 2202 may comprise a first chute that may be configured to receive at least one article. For example, the first chute may receive the at least one article from a bulk flow. In some example embodiments, the first-level article conveying device 2202 may comprise a first conveyor that may be configured to convey one or more articles in a first direction at a first speed.

Figure 24:
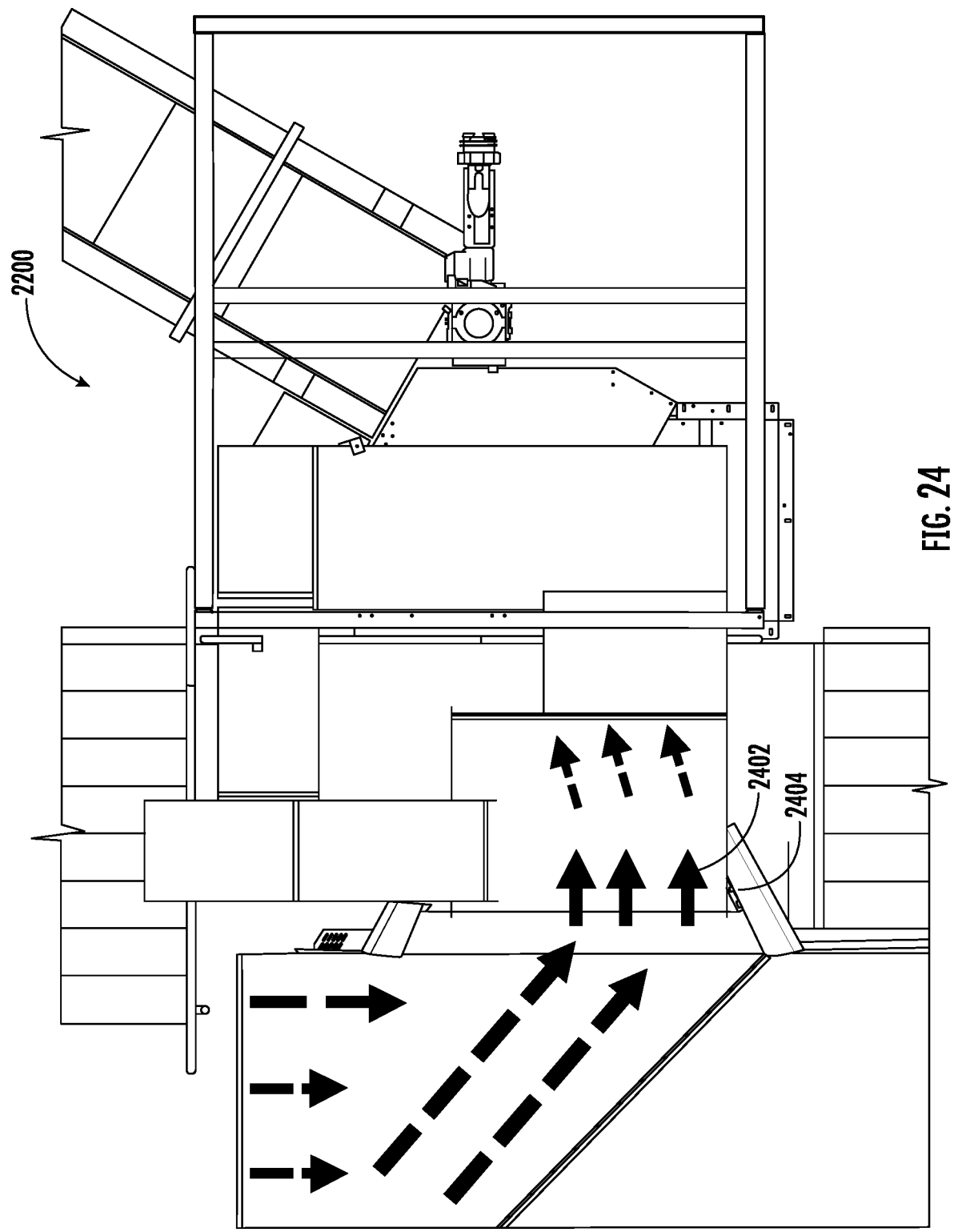
FIG. 24 illustrates an example view of an example system in accordance with various embodiments of the present disclosure.

In some examples, the example system 2200 may comprise a second-level article conveying device 2204 positioned next to the first-level article conveying device 2202. In some examples, the second-level article conveying device 2202 may comprise a second incline conveyor that may be configured to convey the at least one article at a second speed to a second direction. Referring now to FIG. 24, an example view of the example system 2200 illustrates an example second direction (as shown in arrow 2402).

Figure 25:
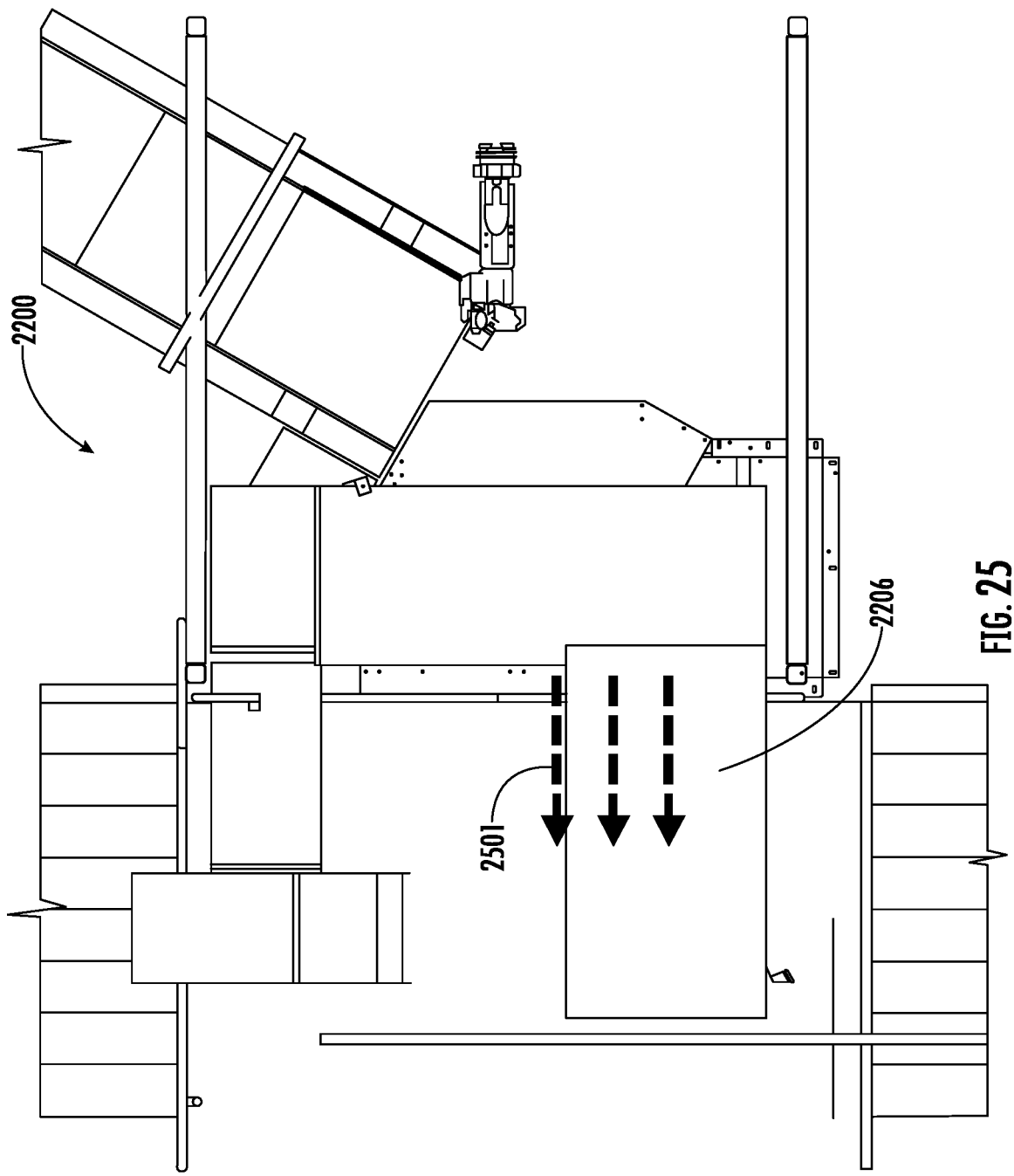
FIG. 25 illustrates an example view of an example system in accordance with various embodiments of the present disclosure.

Referring back to FIG. 22 and FIG. 23, in some examples, the example system 2200 may comprise a third-level article conveying device 2206 positioned under the second-level article conveying device 2204. In some examples, the third decline conveyor may be configured to receive the at least one article from the second-level article conveying device 2204 and convey the at least one article at a third speed to a third direction. Referring now to FIG. 25, an example view of the example system 2200 illustrates an example third direction (as shown in arrow 2501).

In some examples, the third-level article conveying device 2206 may comprise one or more of the separation modules 214 as described above in reference to FIGS. 1-18. As described above, the third-level article conveying device 2103 may be a transverse separation module. In some example embodiments, the third-level article conveying device 2103 may include one or more of right-angle peel-off module, right angle peel-off with guided drop-off module, retracting tail conveyor module, sliding conveyor tray module, and/or decline table module etc. as described earlier in reference to FIGS. 1-18.

In some examples, the third direction of the third-level article conveying device 2206 may be in a straight-angle arrangement from the second direction of the second-level article conveying device 2204. For example, the third direction as shown in arrow 2501 may be in an opposite direction from the second direction as shown in arrow 2402.

Figure 26:
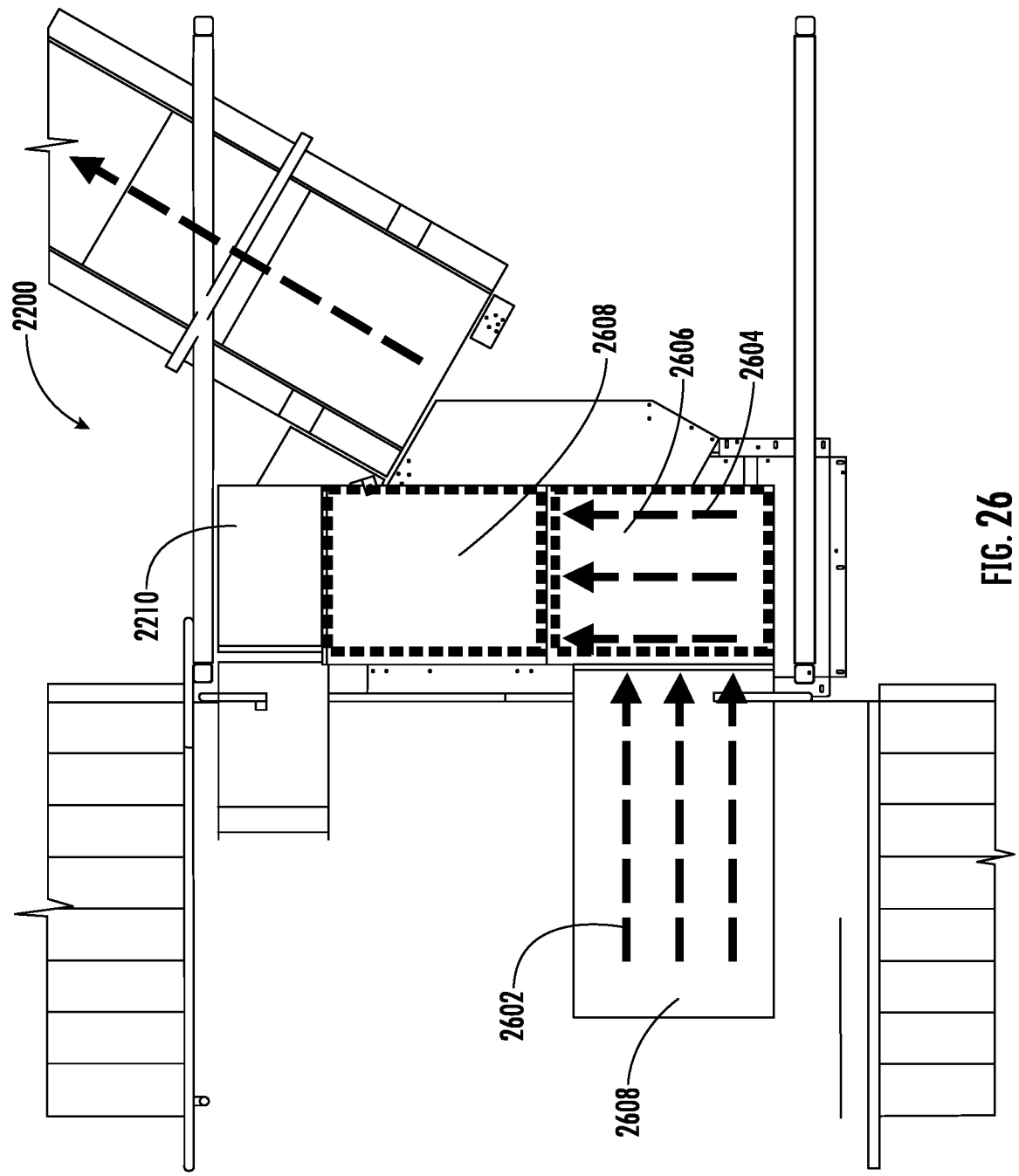
FIG. 26 illustrates an example view of an example system in accordance with various embodiments of the present disclosure.

Referring back to FIG. 22 and FIG. 23, in some examples, the example system 2200 may comprise a fourth-level article conveying device 2208. In some examples, the fourth-level article conveying device 2208 may comprise a fourth conveyor positioned under the third decline conveyor. In some examples, the fourth conveyor may be configured to receive the at least one article from the third-level article conveying device 2206 and convey the at least one article at a fourth speed to a fourth direction. Referring now to FIG. 26, an example view of the example system 2200 illustrates an example fourth direction (as shown in arrow 2602). In some examples, the fourth direction may be in a straight-angle arrangement from the third direction. For example, the fourth direction as shown in arrow 2602 may be in an opposite direction from the third direction as shown in arrow 2501.

In some examples, the fourth-level article conveying device 2208 may comprise one or more of the separation modules described above. As described above, the fourth-level article conveying device 2104 may be a retracting or metering conveyor. For example, the third-level article conveying device 2103 may include one or more of speed metering module, dog tail module, lobed MDR module, incline conveyor module, decline table module, as described earlier in reference to FIGS. 1-18.

Referring back to FIG. 22 and FIG. 23, the example system 2200 may comprise a fifth-level article conveying device 2210. In some examples, the fifth-level article conveying device 2210 may comprise a fifth conveyor positioned next to the fourth-level article conveying device 2208. In some examples, the fifth conveyor may be configured to receive the at least one article from the fourth-level article conveying device 2208 and may convey the at least one article at a fifth speed to a fifth direction. Referring now to FIG. 26, an example view of the example system 2200 illustrates an example fifth direction (as shown in arrow 2604). In some examples, the fifth direction may be in a right-angle arrangement from the fourth direction. For example, the fifth direction as shown in arrow 2604 may form a right angle with the fourth direction as shown in arrow 2602. In some examples, the fifth direction may be in an acute-angle arrangement from the fourth direction, details of which are described in connection with at least FIG. 27, FIG. 28, FIG. 29, and FIG. 30.

Referring back to FIG. 26, in some examples, the fifth conveyor may be configured to index the one or more articles to one or more particular locations on the fifth conveyor. In some examples, the fifth conveyor may comprise one or more of a first zone, a second zone (that is downstream of the first zone in the fifth direction), and a third zone (that is downstream of the second zone in the fifth direction). For example, FIG. 26 illustrates an example second zone 2606 and an example third zone 2608. In some examples, the example system 2200 may comprise an imaging device. In some examples, the imaging device may be positioned to capture at least one image of the at least one article when the at least one article is on the second zone, similar to those described above. In some examples, the example system 2200 may comprise a robotic device positioned to move the at least one article when the at least one article is on the third zone, similar to those described above.

In some examples, the example system 2200 may comprise a computing device in electronic communication with the imaging device and the robotic device. In some examples, the computing device may comprise at least one processor and at least one non-transitory memory comprising a computer program code. In some examples, the at least one non-transitory memory and the computer program code may be configured to, with the at least one processor, cause the robotic device to move the at least one article based on the at least one image, similar to those described above.

Referring back to FIG. 22, the example system 2200 may comprise a sixth-level article conveying device 2212 positioned next to the fifth-level article conveying device 2210 and the second-level article conveying device 2204. In some examples, the sixth-level article conveying device 2212 may recirculate one or more articles to the example system 2200. For example, the sixth-level article conveying device 2212 may comprise a sixth conveyor positioned next to the fifth-level article conveying device 2210, a seventh incline conveyor positioned next to the sixth conveyor, and an eighth conveyor positioned next to the second-level article conveying device 2204. After one or more articles are received by the sixth-level article conveying device 2212, the one or more articles may travel on the sixth conveyor, the seventh incline conveyor, and the eighth conveyor, and may be recirculated back to the second-level article conveying device 2204.

Figure 27:
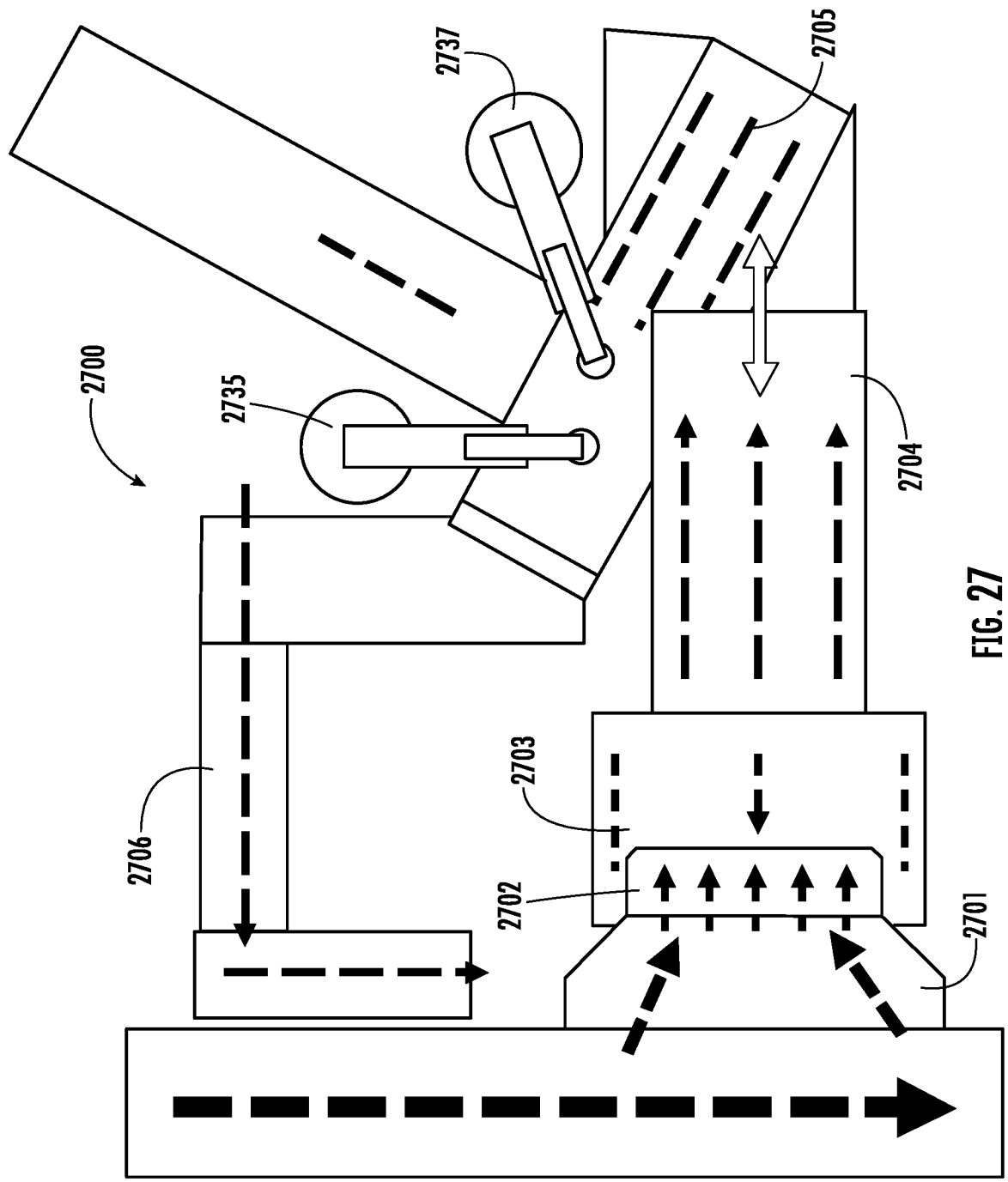
FIG. 27 illustrates an example schematic diagram of an example system in accordance with various embodiments of the present disclosure.
Figure 28:
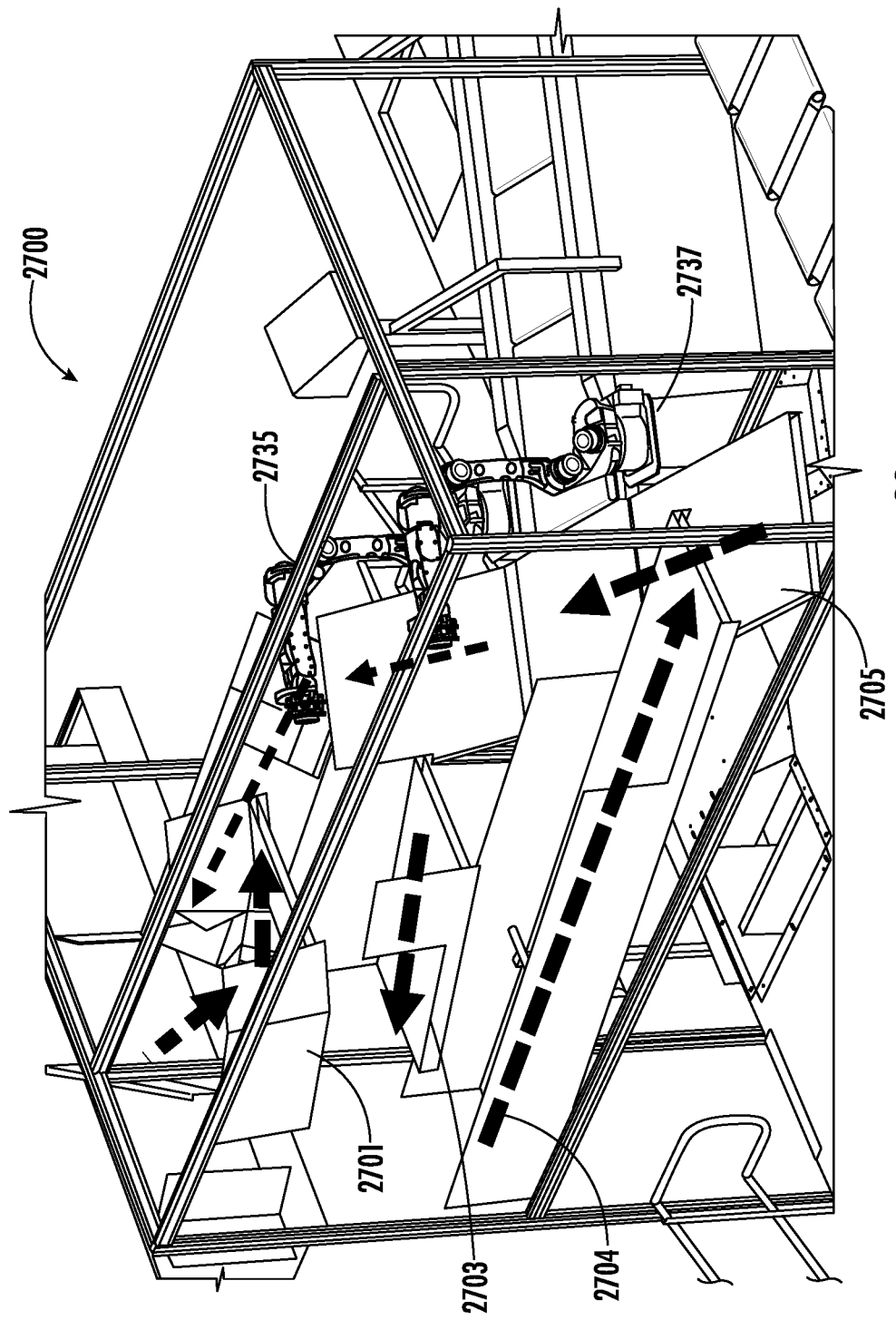
FIG. 28 illustrates an example view of an example system in accordance with various embodiments of the present disclosure.
Figure 29:
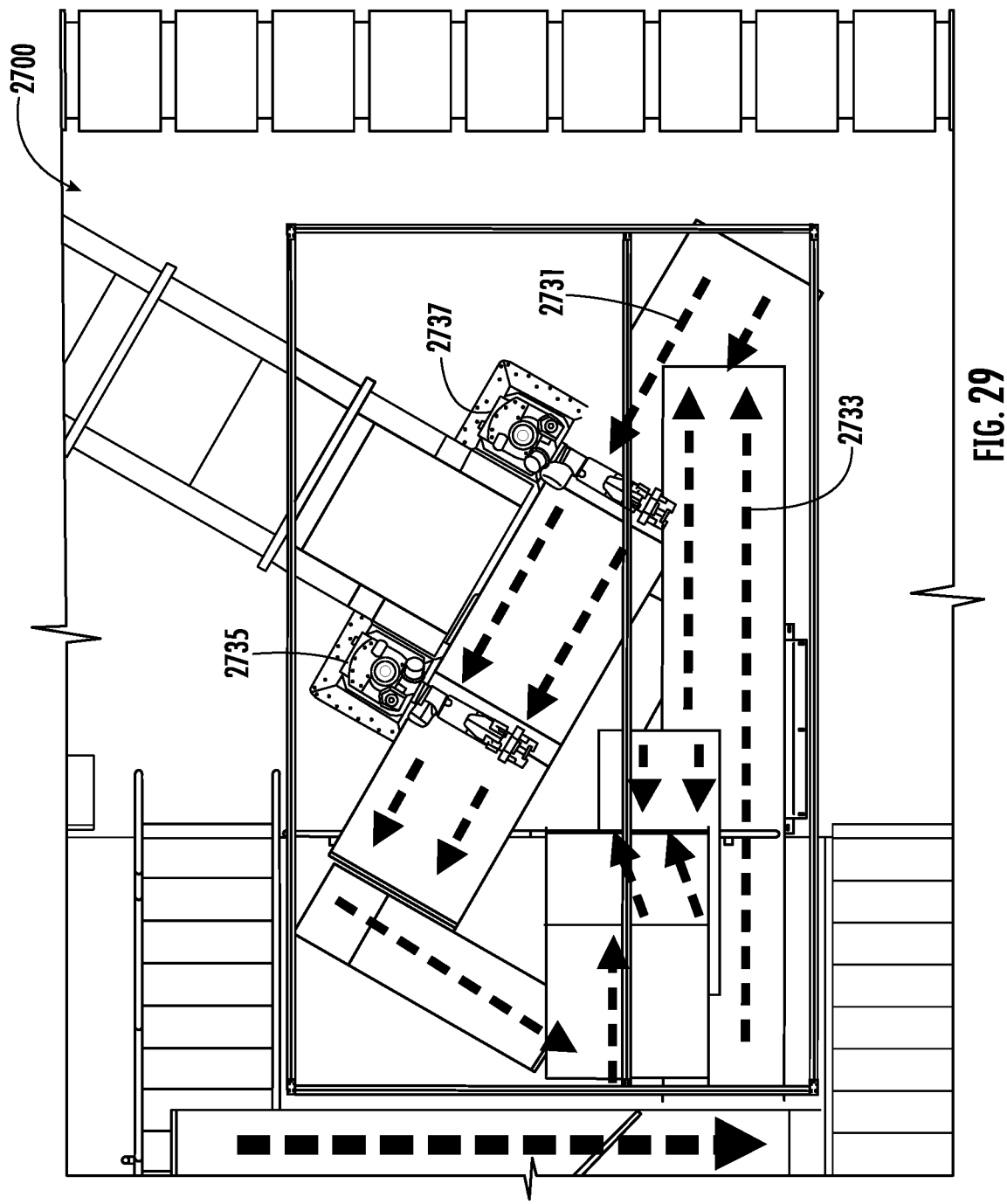
FIG. 29 illustrates an example view of an example system in accordance with various embodiments of the present disclosure.
Figure 30:
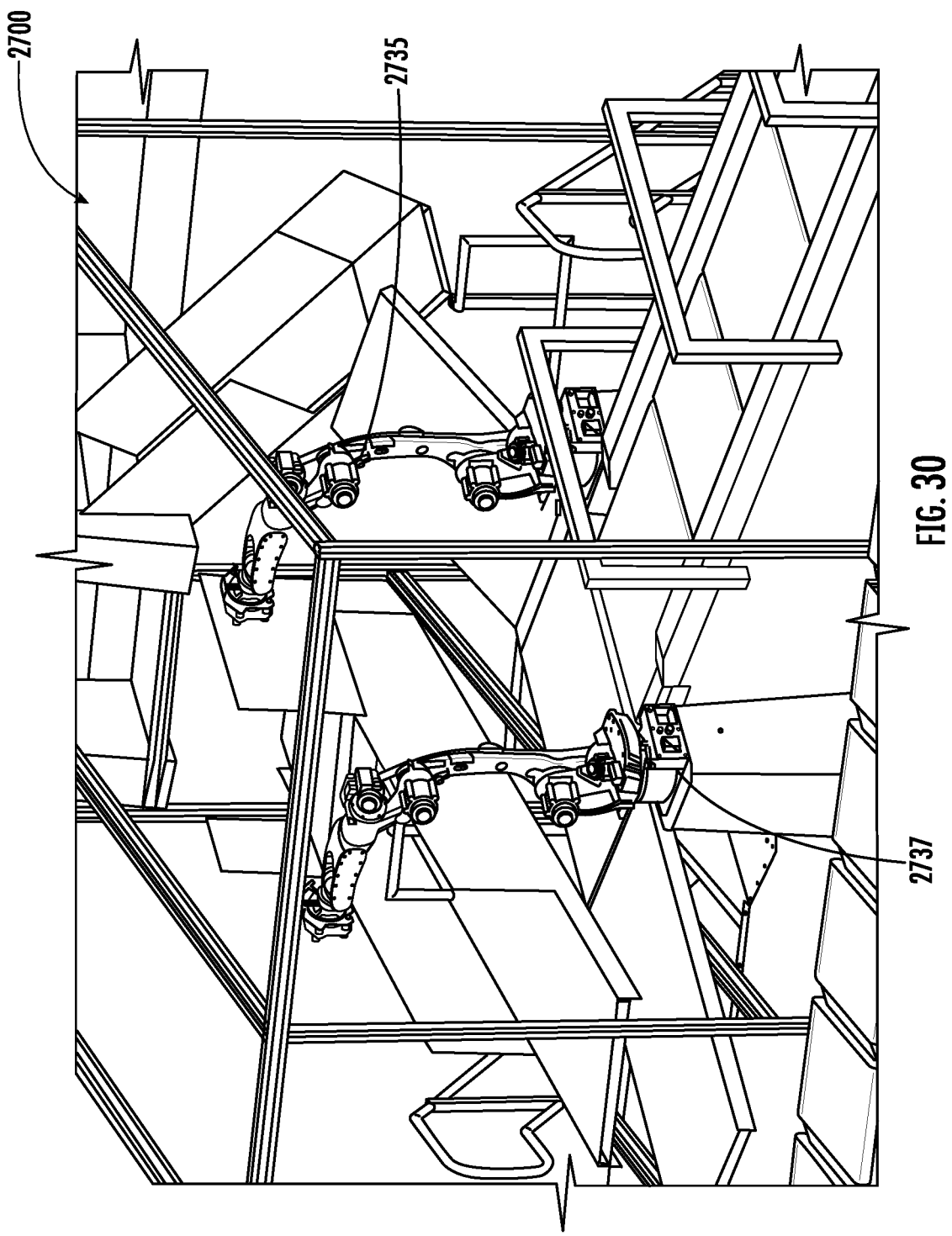
FIG. 30 illustrates an example view of an example system in accordance with various embodiments of the present disclosure.

Referring now to FIG. 27, FIG. 28, FIG. 29, and FIG. 30, more examples of article singulator systems in accordance with the present disclosure are illustrated. FIG. 27 provides an example schematic diagram of an example system 2700. In some examples, the example system 2700 may perform article singulation. As illustrated, the example system 2700 may comprise a first-level article conveying device 2701, a second-level article conveying device 2702, a third-level article conveying device 2703, a fourth-level article conveying device 2704, a fifth-level article conveying device 2705, and a sixth-level article conveying device 2706.

In some examples, the first-level article conveying device 2701 may be a static chute conveyor that may receive one or more articles from a bulk flow, similar to the first-level article conveying device 2101, as described above in connection with FIG. 21, FIG. 22, FIG. 23, FIG. 24, FIG. 25, and FIG. 26. In some examples, the second-level article conveying device 2702 may be an incline conveyor, similar to the second-level article conveying device 2102, as described above in connection with FIG. 21, FIG. 22, FIG. 23, FIG. 24, FIG. 25, and FIG. 26. In some examples, the third-level article conveying device 2703 may be a transverse separation module, similar to the third-level article conveying device 2103, as described above in connection with FIG. 21, FIG. 22, FIG. 23, FIG. 24, FIG. 25, and FIG. 26. In some examples, the fourth-level article conveying device 2704 may be a retracting or metering conveyor, similar to the fourth-level article conveying device 2104, as described above in connection with FIG. 21, FIG. 22, FIG. 23, FIG. 24, FIG. 25, and FIG. 26. In some examples, the fifth-level article conveying device 2705 may be an indexing conveyor, similar to the fifth-level article conveying device 2105, as described above in connection with FIG. 21, FIG. 22, FIG. 23, FIG. 24, FIG. 25, and FIG. 26. In some examples, the sixth-level article conveying device 2706 may be a recirculation incline conveyor, similar to the sixth-level article conveying device 2106 described above in connection with FIG. 21, FIG. 22, FIG. 23, FIG. 24, FIG. 25, and FIG. 26.

It may be noted that compared to the example system 2700 with the example system 2100 (and the example system 2200), the fifth direction of the fifth-level article conveying device 2705 may be in an acute-angle arrangement from the fourth direction of the fourth-level article conveying device 2704. For example, referring now to FIG. 29 and FIG. 30, example views of the example system 2700 are provided. The fifth direction as shown in arrow 2731 may form an acute angle with the fourth direction as shown in arrow 2733. In some example embodiments, one or more robotic devices (such as the robotic device 2735 and the robotic device 2737) may be positioned next to the fifth-level article conveying device 2705 to perform one or more operations (like, but not limited to, handling, manipulating, picking, and/or repositioning) on the one or more articles. Also, in some example implementations, the system 2700 may take less space as compared to the system 2100.

It is noted that the scope of the present disclosure is not limited to the above arrangements only. For instance, in some example embodiments, the fifth direction of the fifth-level article conveying device 2705 may be in an obtuse-angle arrangement from the fourth direction of the fourth-level article conveying device 2704.

Figure 31:
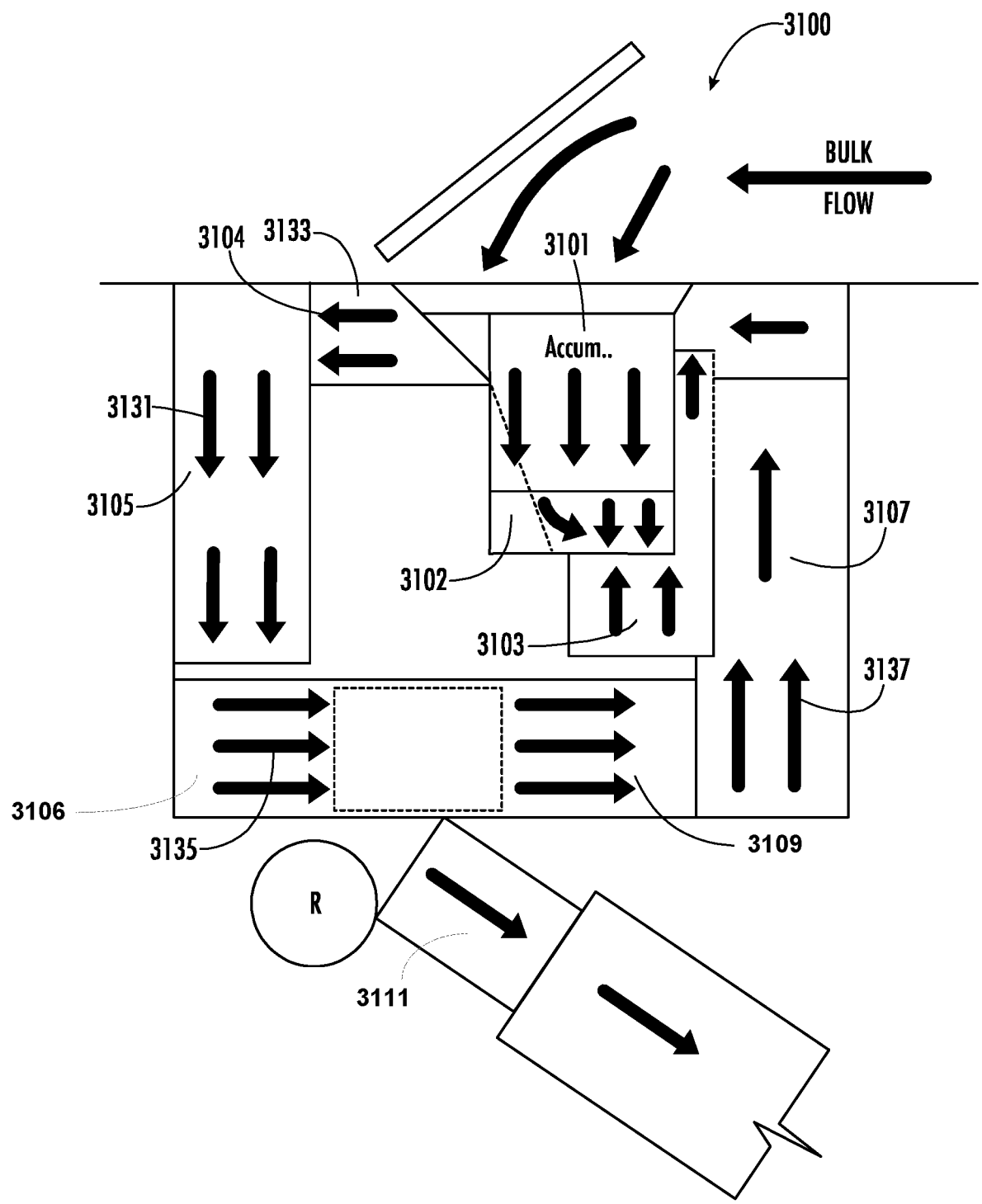
FIG. 31 illustrates an example schematic diagram of an example system in accordance with various embodiments of the present disclosure.

According to some example embodiments described herein, an article singulator may include at least one conveyor that may operate as a switch conveyor. In this regard, the switch conveyor may define two paths for conveying articles. As an example, the switch conveyor may define a first conveying path that may be utilized for conveying articles (e.g. singulated articles) to an outfeed. In this regard, at least some portion of the switch conveyor may interface with an out-take conveyor. Further, the switch conveyor may also define a second conveying path that may be utilized for conveying articles (e.g. non-singulated articles) back to a preceding conveyor of the article singulator. In other words, the switch conveyor may assist in recirculating back non-singulated articles onto the article singulator so that the non-singulated articles may be singulated in a next round of conveyance. FIG. 31 illustrates an example embodiments of such article singulator comprising at least one conveyor that operates like a switch conveyor.

Figure 32:
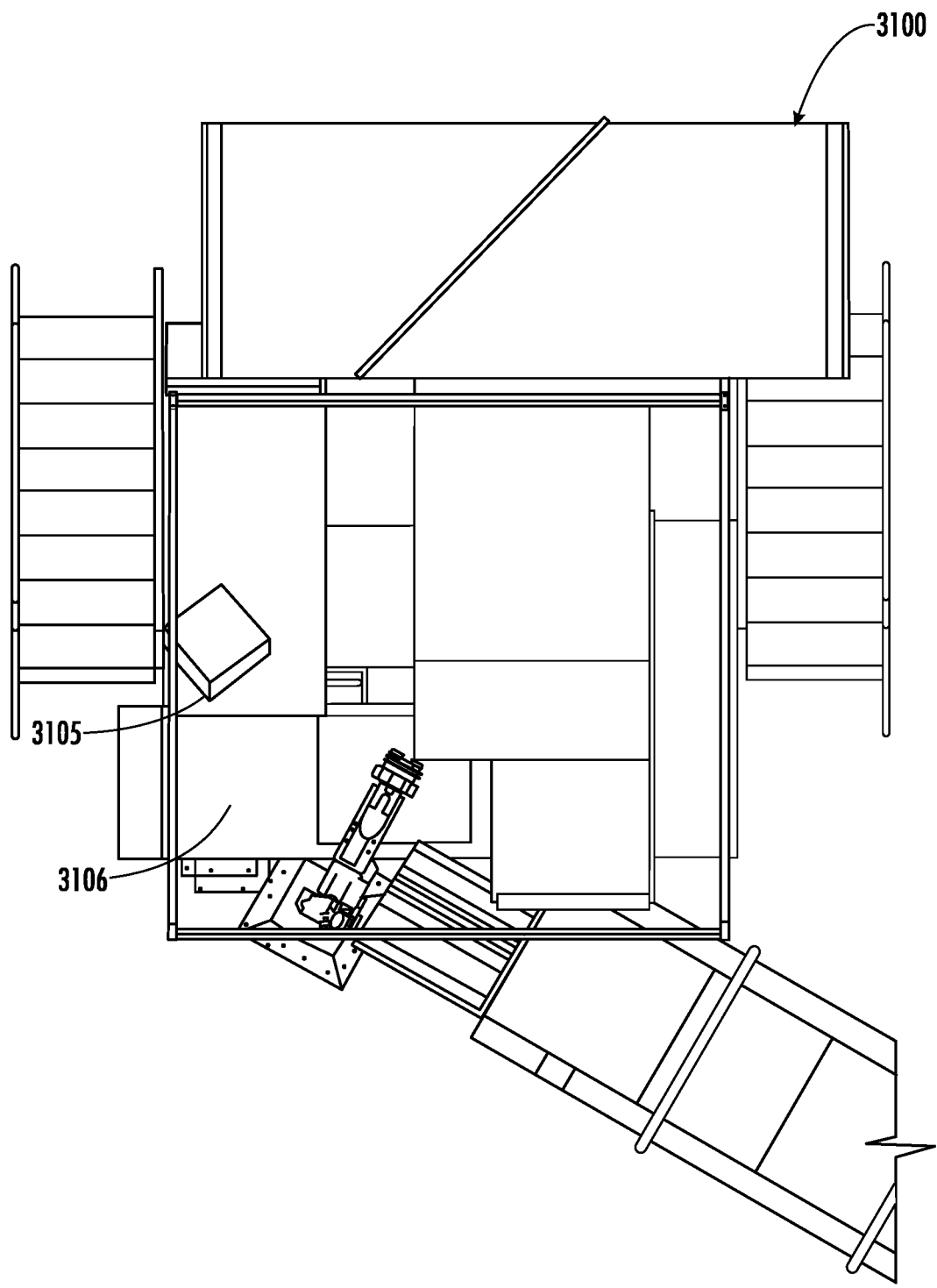
FIG. 32 illustrates an example view of an example system in accordance with various embodiments of the present disclosure.
Figure 33:
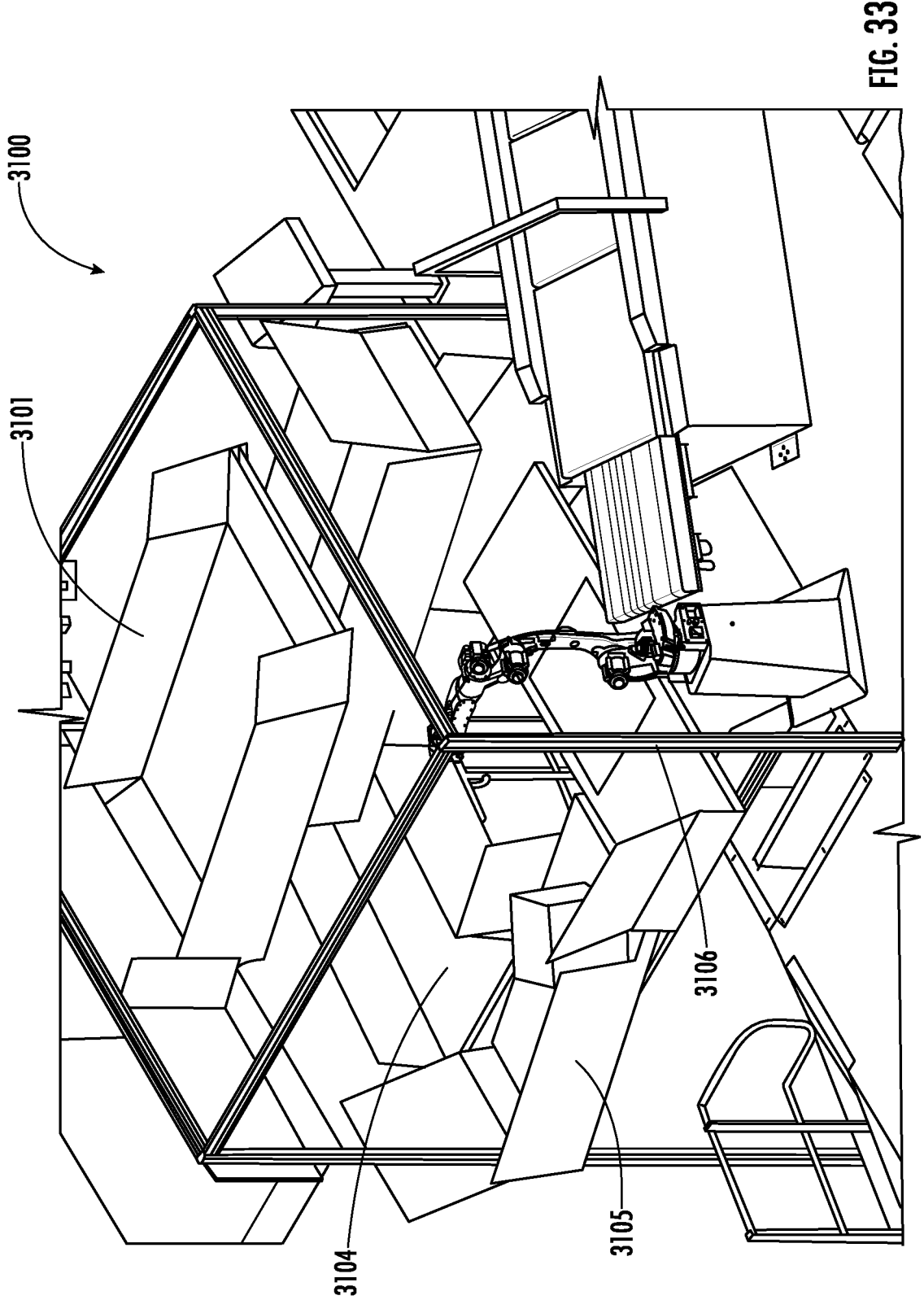
FIG. 33 illustrates an example view of an example system in accordance with various embodiments of the present disclosure.

Referring now to FIG. 31, FIG. 32, and FIG. 33, an example system 3100 in accordance with the present disclosure are illustrated. In some examples, the example system 3100 may perform article singulation. In some examples, the example system 3100 may comprise a first-level article conveying device 3101, a second-level article conveying device 3102, a third-level article conveying device 3103, a fourth-level article conveying device 3104, a fifth-level article conveying device 3105, a sixth-level article conveying device 3106, and a seventh-level article conveying device 3107. In some examples, the first-level article conveying device 3101 may be a static chute conveyor that may receive one or more articles from a bulk flow, similar to the first-level article conveying device 2101 described above in connection with FIG. 21, FIG. 22, FIG. 23, FIG. 24, FIG. 25, and FIG. 26. In some examples, the second-level article conveying device 3102 may be an incline conveyor, similar to the second-level article conveying device 2102, as described above in connection with FIG. 21, FIG. 22, FIG. 23, FIG. 24, FIG. 25, and FIG. 26. In some examples, the third-level article conveying device 2703 may be a transverse separation module, similar to the third-level article conveying device 2103 described above in connection with FIG. 21, FIG. 22, FIG. 23, FIG. 24, FIG. 25, and FIG. 26.

In some examples, the example system 3100 may comprise a fourth-level article conveying device 3104. Comparing the example system 3100 with the example system 2100, it is noted that the fourth direction of the fourth-level article conveying device 3104 of the example system 3100 may be at a right-angle arrangement from the third direction of the third-level article conveying device 3103. In contrast, the fourth direction of the fourth-level article conveying device 2104 of the example system 2100 may be at a straight-line arrangement from the third direction of the third-level article conveying device 2103, as described above.

Referring back to FIG. 31, FIG. 32, and FIG. 33, in some examples, the example system 3100 may comprise a fifth-level article conveying device 3105. In some examples, fifth-level article conveying device may comprise a fifth conveyor positioned next to the fourth-level article conveying device 3104. In some examples, the fifth conveyor may be configured to receive the at least one article from the fourth-level article conveying device 3104 and convey the at least one article at a fifth speed to a fifth direction.

In some examples, the fifth direction may be in a right-angle arrangement from the fourth direction. For example, the arrow 3131 (which indicates the fifth direction) may form a right angle with the arrow 3133 (which indicates the fourth direction).

In some examples, the example system 3100 may comprise a sixth-level article conveying device 3106. In some examples, the sixth-level article conveying device 3106 may comprise a sixth conveyor positioned next to the fifth-level article conveying device 3105. In some examples, the sixth conveyor may be configured to receive the at least one article from the fifth-level article conveying device 3105 and convey the at least one article at a sixth speed to a sixth direction. In some examples, the sixth direction may be in a right-angle arrangement from the fifth direction. For example, the arrow 3135 (which indicates the sixth direction) may form a right angle with the arrow 3131 (which indicates the fifth direction).

In some examples, the sixth conveyor may comprise a first zone, a second zone that is downstream of the first zone in the sixth direction, and a third zone that is downstream of the second zone in the sixth direction. In some examples, the example system 3100 may comprise an imaging device positioned to capture at least one image of the at least one article when the at least one article is on the second zone, similar to those described above in connection with system 2100, system 2200, and system 2700. In some examples, the example system 3100 may comprise a robotic device positioned to move the at least one article when the at least one article is on the third zone, similar to those described above in connection with system 2100, system 2200, and system 2700.

In some examples, the example system 3100 may comprise a computing device in electronic communication with the imaging device and the robotic device. In some examples, the computing device may comprise at least one processor and at least one non-transitory memory comprising a computer program code. In some examples, the at least one non-transitory memory and the computer program code may be configured to, with the at least one processor, cause the robotic device to move the at least one article based on the at least one image, similar to those described above in connection with system 2100, system 2200, and system 2700.

In some examples, the example system 3100 may comprise a seventh-level article conveying device 3107. In some examples, the seventh-level article conveying device 3107 may comprise a seventh conveyor positioned next to the sixth-level article conveying device 3106 and the fourth-level article conveying device 3104, and the seventh conveyor may be configured to receive the at least one article from the sixth-level article conveying device 3106 and convey the at least one article at a seventh speed to the fourth-level article conveying device 3104 in a seventh direction. In some examples, the seventh direction may be in a right-angle arrangement from the sixth direction. For example, the arrow 3137 (which indicates the seventh direction) may form a right angle with the arrow 3135 (which indicates the sixth direction).

In some example embodiments, any conveyor of the fourth-level article conveying device 3104, the fifth-level article conveying device 3105, the sixth-level article conveying device 3106, and the seventh-level article conveying device 3107 may operate as a switch conveyor. In other words, any of the fourth-level article conveying device 3104, the fifth-level article conveying device 3105, the sixth-level article conveying device 3106, and the seventh-level article conveying device 3107 may recirculate the one or more articles (i.e. non-singulated articles) back onto the article singulator. For instance, as illustrated, in an example embodiment, the sixth-level article conveying device 3106 may define a first conveyor path 3109 that can interface with a portion the seventh-level article conveying device 2107 (which further interfaces with the fourth-level article conveying device 3104) thereby, defining a closed loop passage for conveying non-singulated articles back onto the article singulator. Further, the sixth-level article conveying device 3106 may define a second conveyor path 3111 that can interface with the out-take conveyor to receive the plurality of singulated articles onto the out-take conveyor. In some example embodiments, the switch conveyor (e.g. the sixth-level article conveying device 3106) may include one or more mechanisms such as, the separation modules 214 as described earlier in reference to FIGS. 1-18 for separating singulated and non-singulated articles from the article flow on the article singulator.

Figure 34:
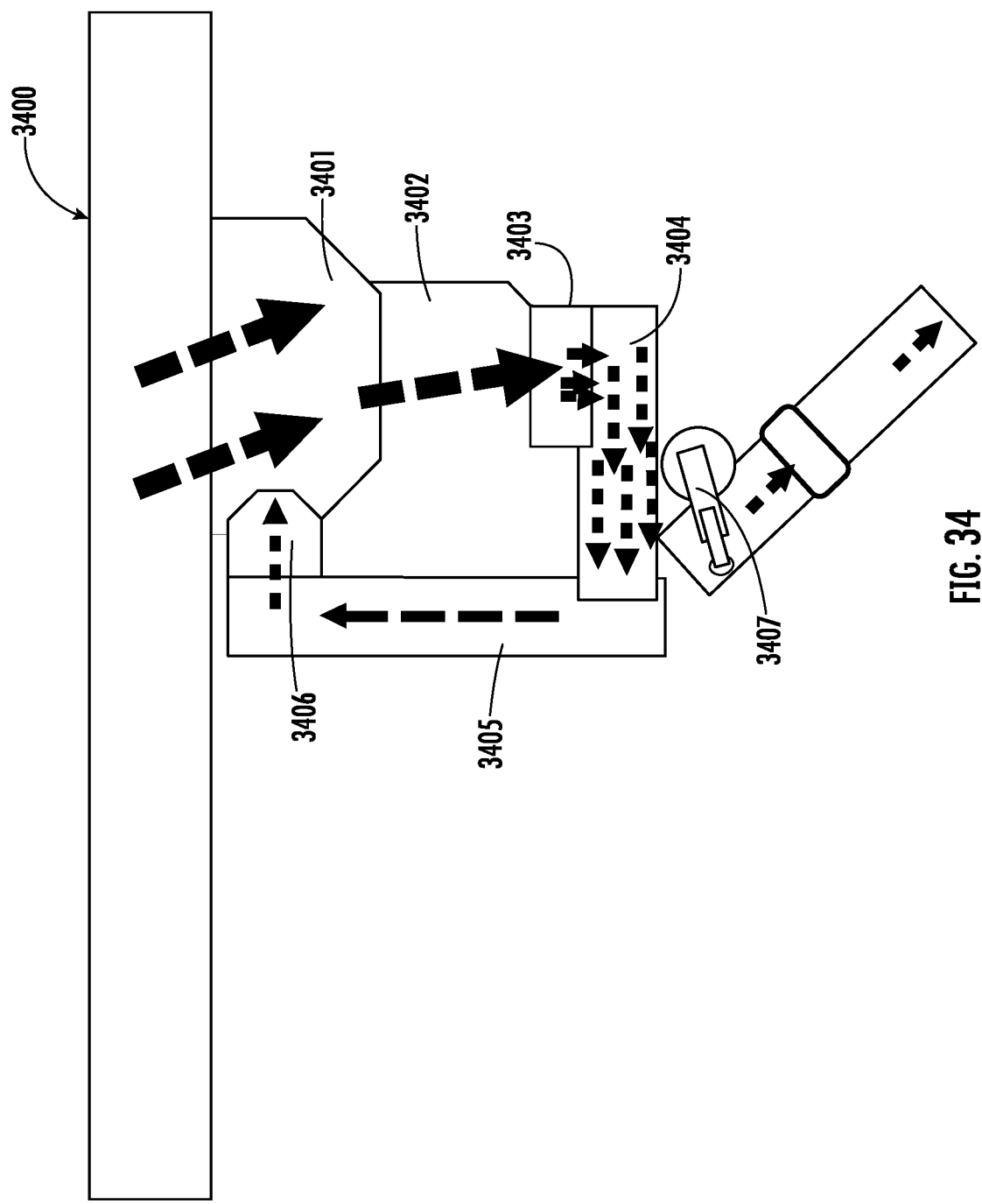
FIG. 34 illustrates an example schematic diagram of an example system in accordance with various embodiments of the present disclosure.
Figure 35:
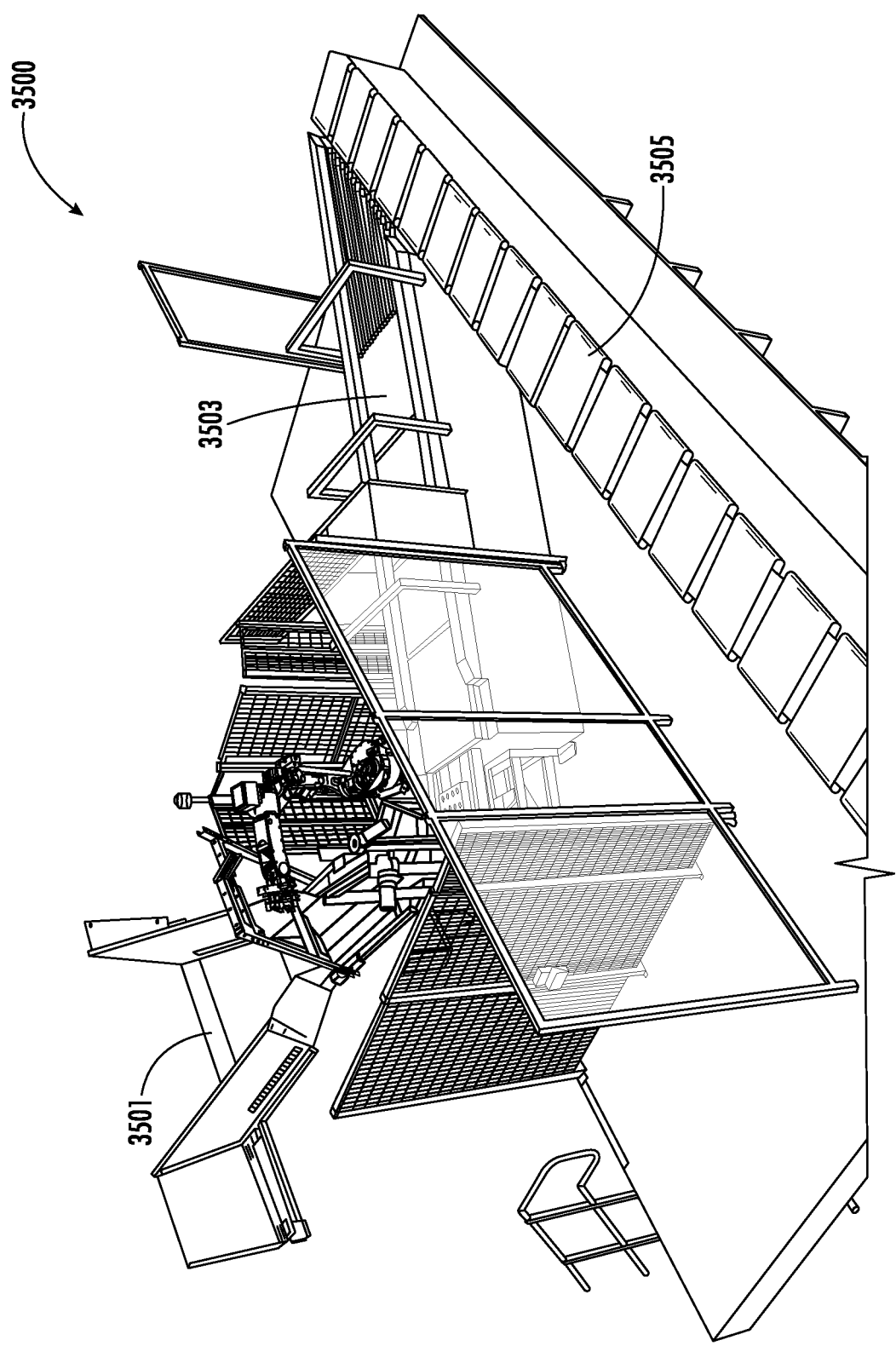
FIG. 35 illustrates an example view of an example system in accordance with various embodiments of the present disclosure.
Figure 36:
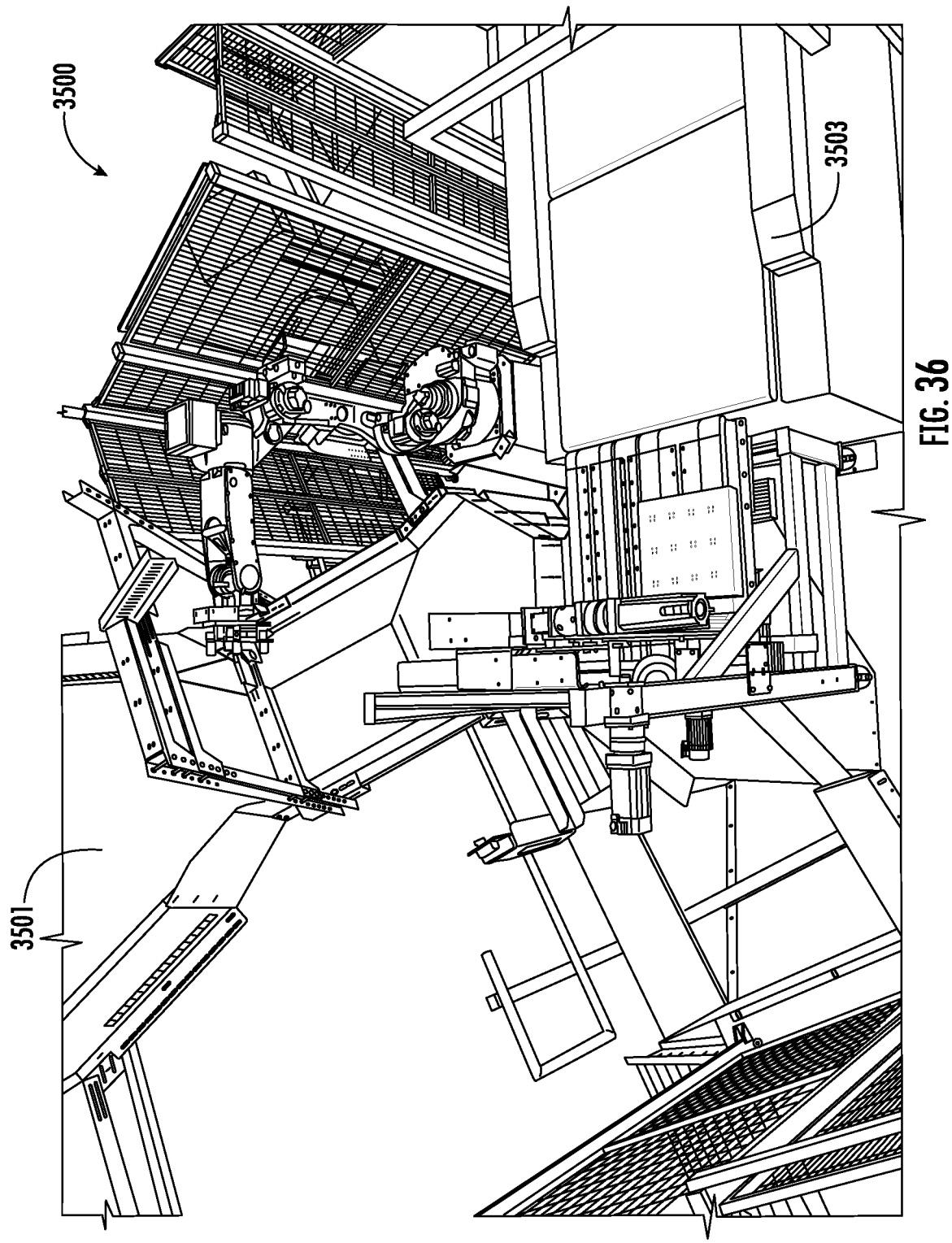
FIG. 36 illustrates an example view of an example system in accordance with various embodiments of the present disclosure.
Figure 37:
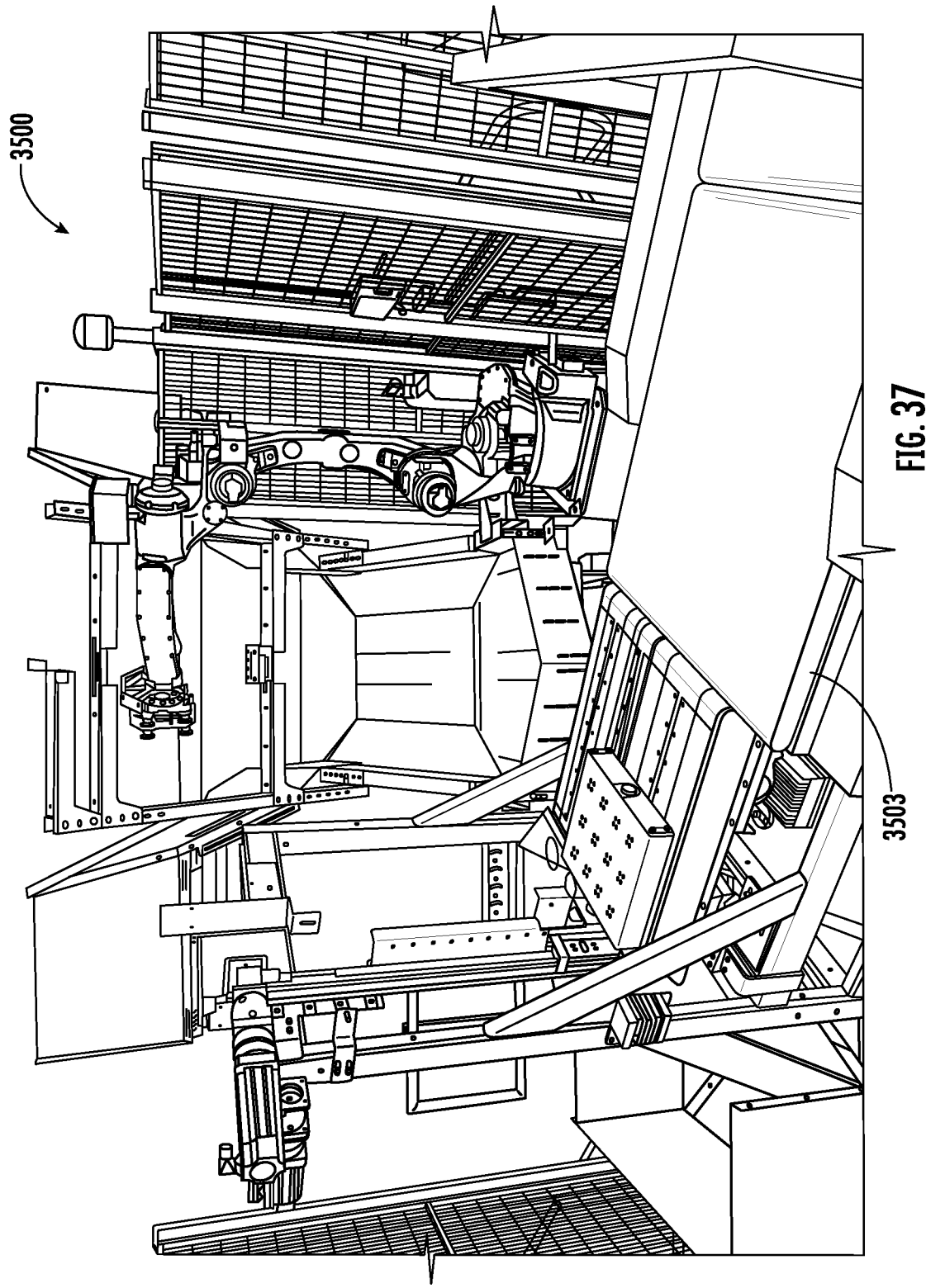
FIG. 37 illustrates an example view of an example system in accordance with various embodiments of the present disclosure.
Figure 38:
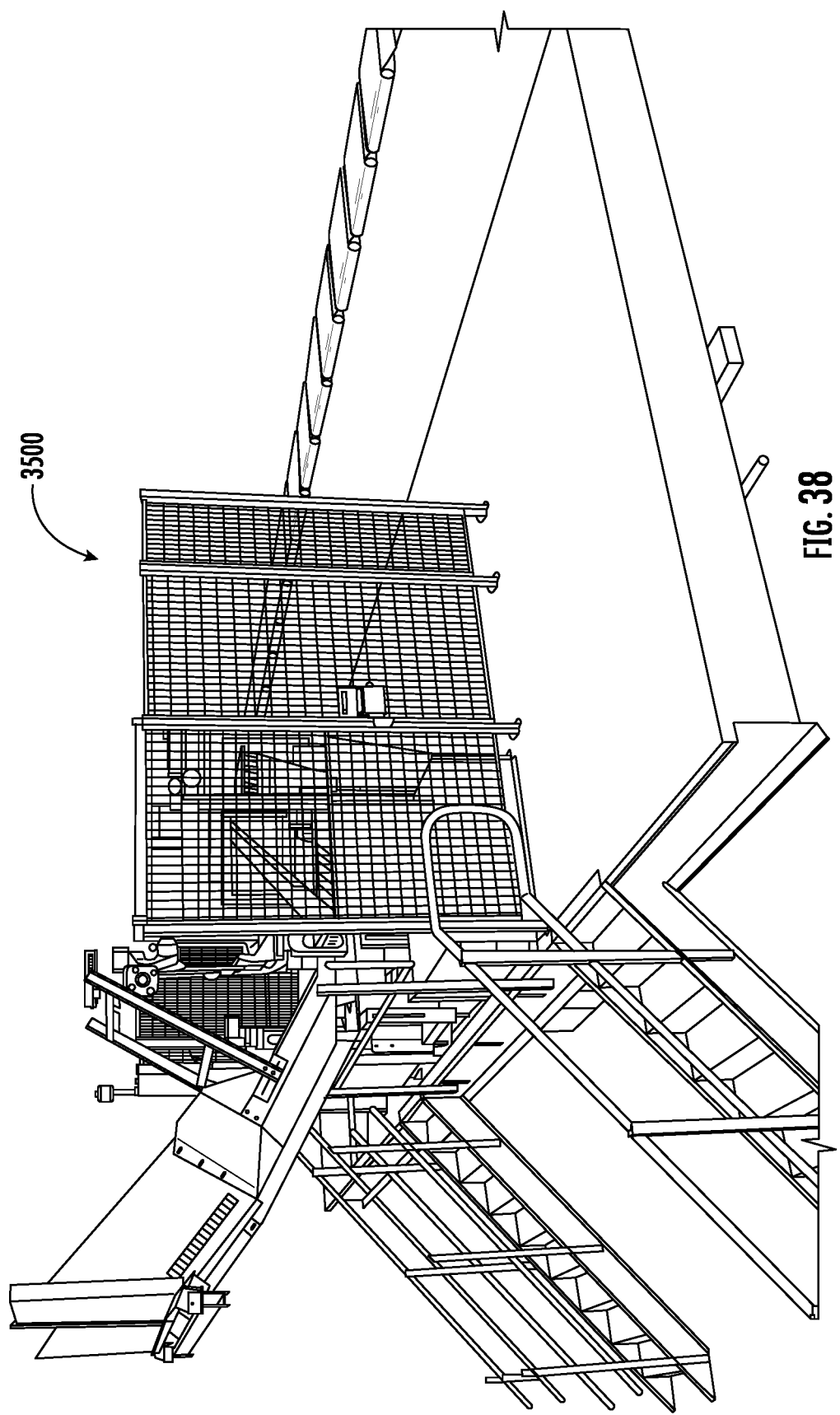
FIG. 38 illustrates an example view of an example system in accordance with various embodiments of the present disclosure.

Referring now to FIG. 34, an example system 3400 in accordance with examples of the present disclosure are provided. In particular, the example system 3400 may perform article singulation. In the example system 3400, one or more articles may be received at a first conveyor (such as the first conveyor 3401 as shown in FIG. 34). The example system 3400 may also comprise one or more additional conveyors (such as the second conveyor 3402, the third conveyor 3403, the fourth conveyor 3404, the fifth conveyor 3405, the sixth conveyor 3406). In some examples, these conveyors may be positioned next to one another to form a carousel arrangement. For example, the second conveyor 3402 may be positioned next to the first conveyor 3401 and may receive one or more articles from the first conveyor 3401. The third conveyor 3403 may be positioned next to the second conveyor 3402 and may receive one or more articles from the second conveyor 3402. The fourth conveyor 3404 may be positioned next to the third conveyor 3403 and may receive one or more articles from the third conveyor 3403. The fifth conveyor 3405 may be positioned next to the fourth conveyor 3404 and may receive one or more articles from the fourth conveyor 3404. The sixth conveyor 3406 may be positioned next to the fifth conveyor 3405 and the first conveyor 3401 and may receive one or more articles from the fifth conveyor 3405 and convey them to the first conveyor 3401.

In some examples, the first conveyor 3401, the second conveyor 3402, and the third conveyor 3403 may convey the one or more articles in the same direction. The fourth conveyor 3404 may convey the articles in a direction that is at a right-angle arrangement with the direction of the first conveyor 3401, the second conveyor 3402, and the third conveyor 3403. The fifth conveyor 3405 may convey the articles in a direction that is at a right-angle arrangement with the direction of the fourth conveyor 3404. The sixth conveyor 3406 may convey the articles in a direction that is at a right-angle arrangement with the direction of the fifth conveyor 3405.

In some examples, a robotic device (such as the robotic device 3407 as shown in FIG. 34) may be configured to move one or more articles in the example system 3400, similar to those described above.

While the example system 3400 described above may include a specific number of conveyors and/or a specific arrangement of these conveyors, it is noted that the scope of the present disclosure is not limited to these specific numbers or arrangements only. In some examples, less or more conveyors may be used and/or different arrangements of these conveyors may be implemented, without deviating from the scope of the present disclosure.

Referring now to FIG. 35, FIG. 36, FIG. 37, and FIG. 38, one or more views of an example system 3500 is provided. In particular, the example system 3500 may be configured to perform article singulation. As shown in FIG. 35, FIG. 36, FIG. 37, and FIG. 38, the example system 3500 may comprise a chute conveyor 3501, an induction section 3503, and/or a sorter section 3505. In some examples, one or more articles may be received from the chute conveyor 3501. The one or more articles may be placed on the induction section 3503 through, for example, implementing various examples of the present disclosure, including, but not limited to, example system 1900, example system 2000, example system 2100, example system 2700, example system 3100, and/or example system 3400 described above. In some examples, the induction section 3503 may be configured to merge and combine the one or more articles into a single line and/or establish proper space/gap between the one or more articles.

In some examples, the sorter section 3505 may comprise one or more cross-belts. After the one or more articles reach the sorter section 3505, these articles may be sorted to one or more different locations of the material handling system.

As described above, various examples of the present disclosure may provide accumulation between bulk flow and article picking by robotic device, may provide mechanism(s) to separate and meter the flow of articles out of the accumulation. For example, various examples of the present disclosure may present parcels in a stopped position for robotic picking and may provide method to recirculate unpicked items back to bulk flow or accumulation. In some examples, various examples of the present disclosure may supply a rate of articles that enables robot(s) to pick up to 1800 parcels per hour while stay within relative footprint boundaries. Further, examples of the present disclosure may provide ability to swap out separation modules for testing and optimization. As such, various examples of the present disclosure may provide technical advantage over other methods and/or systems.

Figure 39:
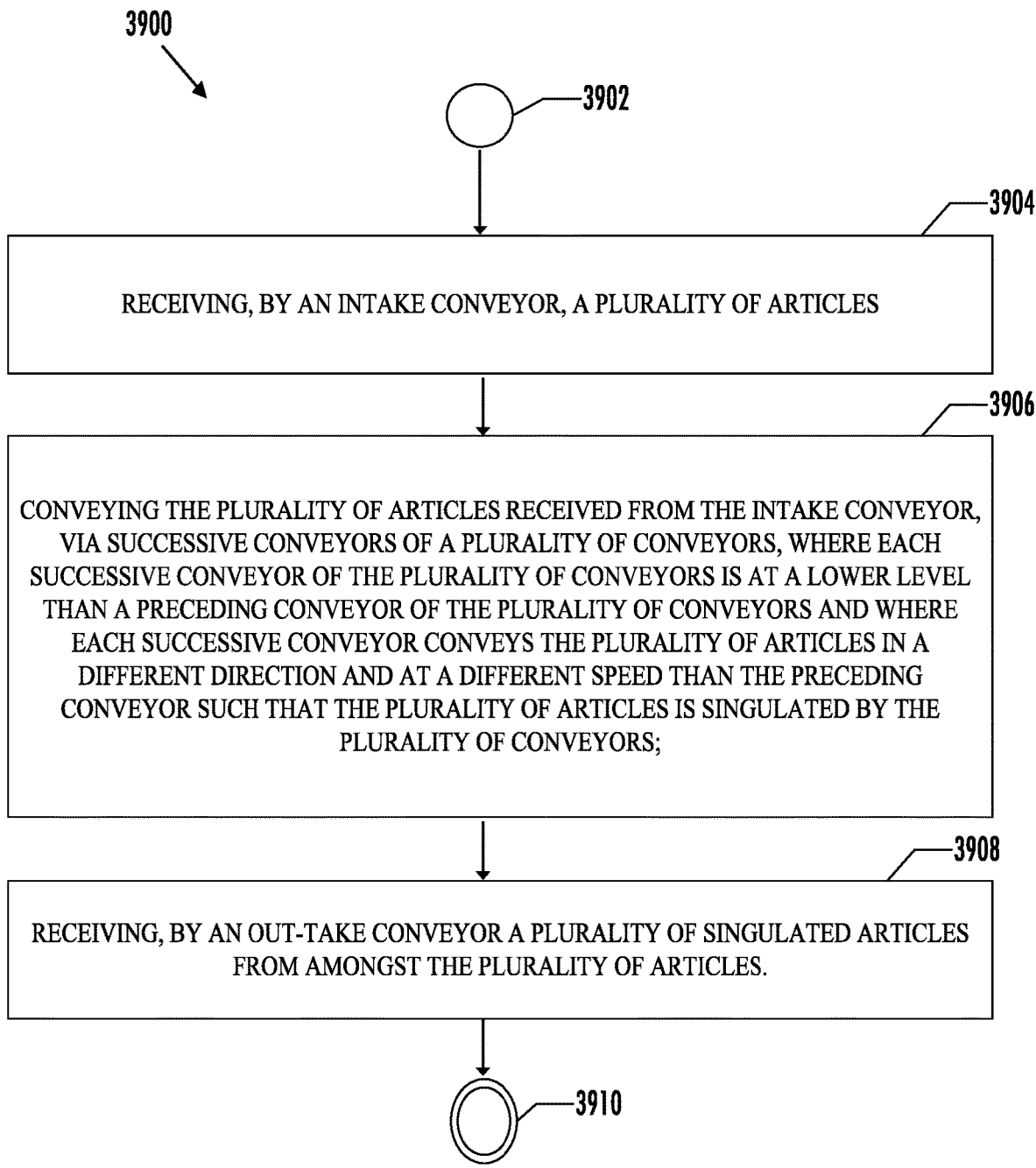
FIG. 39 illustrates an example flowchart depicting operations performed by an article singulator, in accordance with some example embodiments described herein.

FIG. 39 illustrates an example flowchart of the operations performed by an apparatus, such as an article singulator as described in reference to FIGS. 1-38, in accordance with example embodiments. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 39 when executed, convert a computer or processing circuitry into a particular machine configured to perform an example embodiment of the present invention. Accordingly, the operations of FIG. 39 define an algorithm for configuring a computer or processor, to perform an example embodiment. In some cases, a general purpose computer may be provided with an instance of the processor which performs the algorithm of FIG. 39 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 39 illustrates a flow diagram representing a method 3900 for singulating a plurality of articles by an article singulator, in accordance with an example embodiment.

The method 3900 starts at step 3902. At step 3904, the article singulator may include means such as, an intake conveyor to receive a plurality of articles.

In an example, the intake conveyor may receive the plurality of articles from a bulk flow. For instance, in an example, the intake conveyor may receive the plurality of articles (e.g. packages, containers, boxes, cartons, etc.) at an article induction station. In some examples, the intake conveyor may receive the plurality of articles from a decline chute. In some examples, the intake conveyor may receive a stack of articles that may be offloaded from a transport carrier onto a shipment station. In some example embodiments, the plurality of articles received by the intake conveyor may not be organized and can be in a non-singulated arrangement (e.g. piled one over another, stacked or heaped one over another etc.)

At step 3906, the article singulator may include means such as, a plurality of conveyors (e.g. intermediate conveyors) that may convey the plurality of articles received from the intake conveyor. In this regard, the plurality of articles may be conveyed via successive conveyors (i.e. conveyors positioned one after another in succession) of the plurality of conveyors. In some example embodiments, each successive conveyor of the plurality of conveyors may be at a lower level (i.e. at a relatively lower height) compared to a preceding conveyor of the plurality of conveyors. For instance, FIGS. 1-38 illustrates various example embodiments of article singulators where a successive conveyor of the article singulator is positioned at a lower level than a preceding conveyor.

In some example embodiments, each successive conveyor of the plurality of conveyors can be configured to convey the plurality of articles at a different speed and/or at a different direction than the preceding conveyor such that the plurality of articles is singulated based on conveyance on the plurality of conveyors. FIGS. 1-38 also illustrates various example embodiments where articles are conveyed at different speed and/or in different directions by various successive conveyor of the article singulator.

At step 3908, the article singulator may include means such as, the out-take conveyor to receive a plurality of singulated articles from amongst the plurality of articles. In some example embodiments, the out-take conveyor may receive some articles in a singulated arrangement (i.e. separated from each other or having some gap amongst each other) and remaining articles in a non-singulated arrangement (e.g. piled up or stacked up one over another).

In some example embodiments, the out-take conveyor may convey the singulated articles to an outfeed path and the non-singulated articles back onto the article singulator via a recirculation loop, as described in accordance with various example embodiments in reference to FIGS. 1-38. The method 3900 stops at step 3910.

Figure 40:
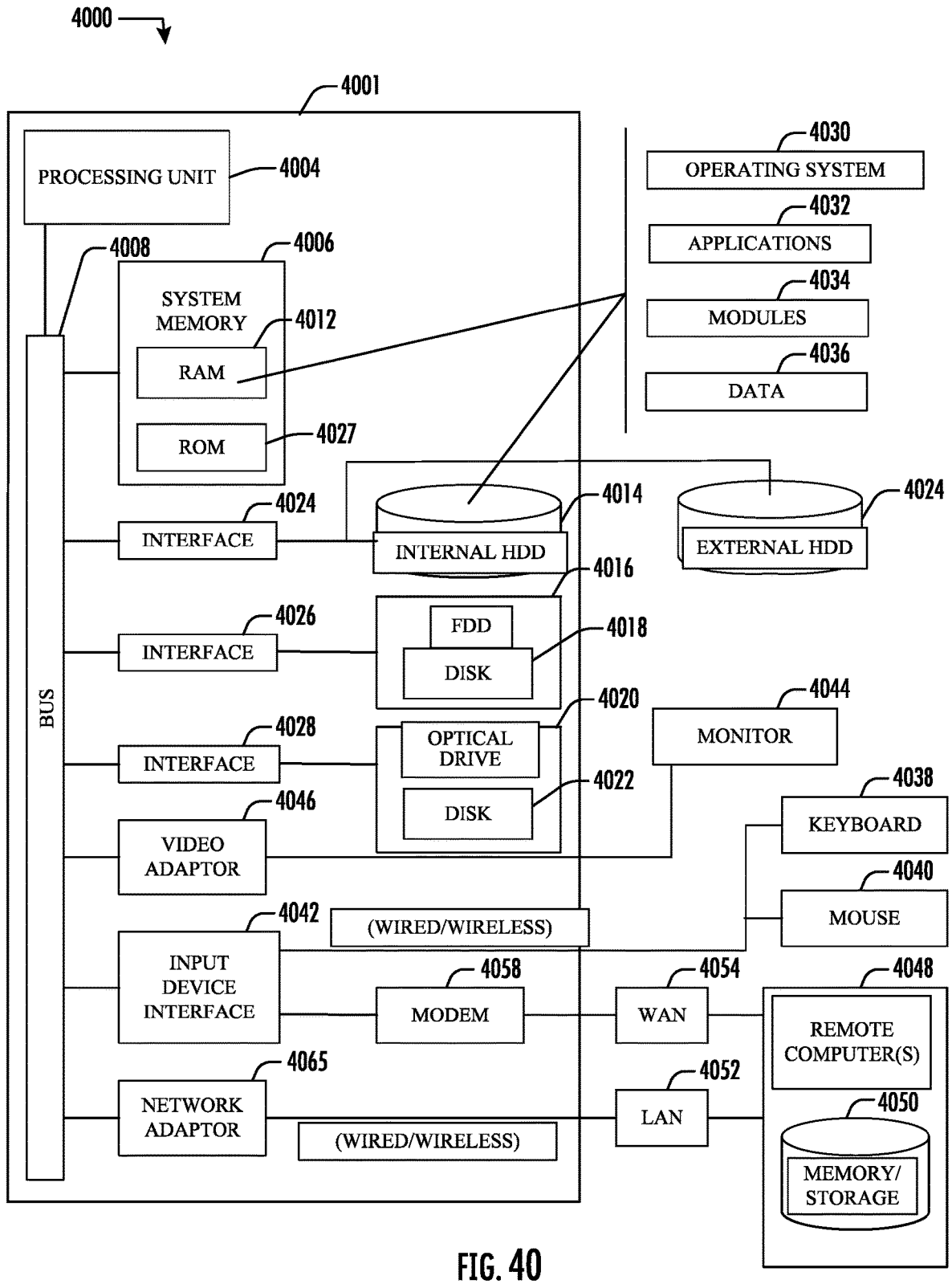
FIG. 40 illustrates an example of a computing device, in accordance with some example embodiments described herein.

FIG. 40 illustrates a schematic view of another example of a computing device 4001, in accordance with another example embodiment described herein. Referring now to FIG. 40, there is illustrated a block diagram of operable to execute the functions and operations performed in the described example embodiments. In some example embodiments, the computing device 4001 can provide networking and communication capabilities between a wired or wireless communication network and a server and/or communication device. In order to provide additional context for various aspects thereof, FIG. 40 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 40, implementing various aspects/operations described herein with regards to the article singulator can be performed by utilizing the computing device 4001 comprising a processing unit 4004, a system memory 4006 and a system bus 40040. The system bus 4008 can be configured to couple system components including, but not limited to, the system memory 4006 to the processing unit 4004. In some example embodiments, the processing unit 4004 can be any of various commercially available processors. To this end, in some examples, dual microprocessors and other multi-processor architectures can also be employed as the processing unit 4004.

According to some example embodiments, the system bus 4008 can be any of several types of bus structure that can further interconnect to a memory bus (with or without a memory controller), a peripheral bus, and a local bus using any of a variety of commercially available bus architectures. In some examples, the system memory 4006 can comprise, read-only memory (ROM) 4027 and random-access memory (RAM) 4012. According to some example embodiments, a basic input/output system (BIOS) is stored in a non-volatile memory 4027 such as ROM, EPROM, EEPROM, which BIOS contains the basic routines that help to transfer information between elements within the computing device 4001, such as during start-up. The RAM 4012 can also comprise a high-speed RAM such as static RAM for caching data.

According to some example embodiments, the computing device 4001 can further comprise an internal hard disk drive (HDD) 4014 (e.g., EIDE, SATA), which internal hard disk drive 4014 can also be configured for external use in a suitable chassis (not shown), a magnetic floppy disk drive (FDD) 4016, (e.g., to read from or write to a removable diskette 40140) and an optical disk drive 4020, (e.g., reading a CD-ROM disk or, to read from or write to other high capacity optical media such as the DVD). In some examples, the hard disk drive 4014, magnetic disk drive 4016 and optical disk drive 4020 can be connected to the system bus 4008 by a hard disk drive interface 4024, a magnetic disk drive interface 4026 and an optical drive interface 40240, respectively. According to some example embodiments, the interface 4024 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the computing device 4001 the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by an computing device 4001, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 4012, including an operating system 4030, one or more application programs 4032, other program modules 4034 and program data 4036. To this end, in some examples, all or portions of the operating system, applications, modules, and/or data can also be cached in the RAM 4012. It is to be appreciated that the various embodiments can be implemented with various commercially available operating systems or combinations of operating systems.

According to some example embodiments, a user can enter commands and information into the computing device 4001 through one or more wired/wireless input devices, e.g., a keyboard and a pointing device, such as a mouse 4040. Other input devices (not shown) may include a microphone, an IR remote control, a joystick, a game pad, a stylus pen, touch screen, or the like. In some examples, these and other input devices are often connected to the processing unit 4004 through an input device interface 4042 that is coupled to the system bus 4008, but can be connected by other interfaces, such as a parallel port, an IEEE 13404 serial port, a game port, a USB port, an IR interface, etc.

According to some example embodiments, a monitor 4044 or other type of display device can also be connected to the system bus 4008 through an interface, such as a video adapter 4046. In addition to the monitor 4044, the computing device 4001 can also comprise other peripheral output devices (not shown), such as speakers, printers, etc.

According to some example embodiments, the computing device 4001 can operate in a networked environment using logical connections by wired and/or wireless communications to one or more remote computers, such as a remote computer(s) 4048. In some examples, the remote computer(s) 4048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 4050 is illustrated. According to some example embodiments, the logical connections depicted include wired/wireless connectivity to a local area network (LAN) 4052 and/or larger networks, e.g., a wide area network (WAN) 4054. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 4001 can be connected to the LAN 4052 through a wired and/or wireless communication network interface or adapter 4056. The adapter 4056 may facilitate wired or wireless communication to the LAN 4052, which may also include a wireless access point disposed thereon for communicating with the wireless adapter 4056.

In alternate examples, when used in a WAN networking environment, the computing device 4001 can include a modem 4058, or can be connected to a communications server on the WAN 4054 or has other means for establishing communications over the WAN 4054, such as by way of the Internet. The modem 4058, which can be internal or external and a wired or wireless device, is connected to the system bus 4008 through the input device interface 4042. In a networked environment, program modules depicted relative to the computer, or portions thereof, can be stored in the remote memory/storage device 4050. It will be appreciated that the network connections shown are exemplary and other means of establishing a communications link between the computers can be used.

According to some example embodiments, the computing device 4001 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE4002.11 (a, b, g, n, etc.) to provide secure, reliable, fast wireless connectivity. Further, in accordance with some example embodiments described herein, a Wi-Fi network can be used to connect computers or the plurality of computing devices 102-10N to each other, to the Internet, and to wired networks (which use IEEE4002.3 or Ethernet). Wi-Fi networks operate in the unlicensed 2.4 and 5 GHz radio bands, at an 11 Mbps (4002.11b) or 54 Mbps (4002.11a) data rate, for example, or with products that contain both bands (dual band), so the networks can provide real-world performance similar to the basic "9BaseT" wired Ethernet networks used in many offices.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An article singulator, comprising:
   an intake conveyor to receive a plurality of articles;
   an out-take conveyor to convey a plurality of singulated articles from amongst the plurality of articles; and
   a plurality of conveyors to:
      receive the plurality of articles from the intake conveyor,
      convey the plurality of articles via successive conveyors of the plurality of conveyors, and
      provide the plurality of singulated articles to the out-take conveyor, wherein each successive conveyor of the plurality of conveyors is at a lower level than a preceding conveyor of the plurality of conveyors and wherein each successive conveyor conveys the plurality of articles in a different direction and at a different speed than the preceding conveyor such that the plurality of articles are singulated by the plurality of conveyors,
   wherein the plurality of conveyors comprises a switch conveyor comprising:
      a first conveyor path that interfaces with a portion of at least one of any preceding conveyors of the plurality of conveyors, thereby defining a closed loop passage for conveying non-singulated articles from amongst the plurality of articles back to any of the preceding conveyors; and
      a second conveyor path that interfaces with the out-take conveyor to receive the plurality of singulated articles onto the out-take conveyor.

2. The article singulator of claim 1, wherein the intake conveyor is configured to receive the plurality of articles from a decline chute.

3. The article singulator of claim 1 comprising at least one processor configured to manipulate at least one of: speed and direction of conveyance of, one or more of, the plurality of articles on the plurality of conveyors to singulate the plurality of articles.

4. The article singulator of claim 1, wherein at least one conveyor of the plurality of conveyors comprises a first zone, a second zone that is downstream of the first zone, and a third zone that is downstream of the second zone.

5. The article singulator of claim 4, further comprising an imaging device positioned to capture at least one image of an article from amongst the plurality of articles when the article is on the second zone.

6. The article singulator of claim 5, further comprising a robotic device positioned to move the article based on the at least one image when the article is on the third zone.

7. The article singulator of claim 1, wherein the plurality of conveyors comprises:
a first conveyor configured to convey the plurality of articles at a first speed to a first direction;
a second conveyor configured to receive the plurality of articles from the first conveyor and convey the plurality of articles at a second speed to a second direction;
a third conveyor configured to receive the plurality of articles from the second conveyor and convey the plurality of articles at a third speed to a third direction;
a fourth conveyor configured to receive the plurality of articles from the third conveyor and convey the plurality of articles at a fourth speed to a fourth direction;
a fifth conveyor configured to receive the plurality of articles from the fourth conveyor and convey the plurality of articles at a fifth speed to a fifth direction; and
a sixth conveyor configured to receive the plurality of articles from the fifth conveyor and convey the non-singulated articles from amongst the plurality of articles back to the third conveyor and the plurality of singulated articles to the out-take conveyor in a sixth direction.

8. The article singulator of claim 7, wherein at least one of:
the first conveyor is positioned on a first horizontal plane;
the second conveyor is positioned on a second horizontal plane that is lower than the first horizontal plane;
the third conveyor is positioned on a third horizontal plane that is lower than the second horizontal plane;
the fourth conveyor is positioned on a fourth horizontal plane that is either lower than the third horizontal plane or coplanar with the third horizontal plane;
the fifth conveyor is positioned next to the fourth conveyor; and
the sixth conveyor is positioned next to the fifth conveyor and the sixth conveyor comprises:
a first portion that interfaces with the third conveyor, thereby, defining a closed loop pathway for conveying the non-singulated articles back onto the third conveyor; and
a second portion that interfaces with the out-take conveyor to convey the plurality of singulated articles onto the out-take conveyor.

9. The article singulator of claim 7, wherein at least one of:
the second direction is in a straight-angle arrangement from the first direction;
the third direction is in a straight-angle arrangement from the second direction;
the fourth direction is in a straight-angle arrangement from the third direction;
the fourth direction is in a right-angle arrangement from the third direction;
the fifth direction is in a right-angle arrangement from the fourth direction; and
the sixth direction is in a right-angle arrangement from the fifth direction.

10. A method comprising:
receiving, by an intake conveyor, a plurality of articles;
conveying the plurality of articles received from the intake conveyor, via successive conveyors of a plurality of conveyors, wherein each successive conveyor of the plurality of conveyors is at a lower level than a preceding conveyor of the plurality of conveyors and wherein each successive conveyor conveys the plurality of articles in a different direction and at a different speed than the preceding conveyor such that the plurality of articles is singulated by the plurality of conveyors; and
receiving, by an out-take conveyor a plurality of singulated articles from amongst the plurality of articles
wherein the plurality of conveyors comprises a switch conveyor comprising:
a first conveyor path that interfaces with a portion of at least one of any preceding conveyors of the plurality of conveyors, thereby defining a closed loop passage for conveying non-singulated articles from amongst the plurality of articles back to any of the preceding conveyors; and
a second conveyor path that interfaces with the out-take conveyor to receive the plurality of singulated articles onto the out-take conveyor.

11. The method of claim 10 further comprising manipulating at least one of: a first speed and a direction of conveyance of, one or more of, the plurality of articles on the plurality of conveyors.

12. The method of claim 10 wherein at least one conveyor of the plurality of conveyors comprises a first zone, a second zone that is downstream of the first zone, and a third zone that is downstream of the second zone and wherein the method further comprises:
capturing at least one image of an article from amongst the plurality of articles when the article is on the second zone; and
moving the article by a robotic device when the article is on the third zone.

13. The method of claim 10 further comprising:
receiving the plurality of articles by a first-level article conveying device comprising a first conveyor configured to convey the plurality of articles at a first speed to a first direction;
receiving the plurality of articles from the first-level article conveying device by a second-level article conveying device comprising a second conveyor configured to convey the plurality of articles at a second speed to a second direction;
receiving the plurality of articles from the second-level article conveying device by a third-level article conveying device comprising a third conveyor configured to convey the plurality of articles at a third speed to a third direction;
receiving the plurality of articles from the third-level article conveying device by a fourth-level article conveying device comprising a fourth conveyor configured to convey the plurality of articles at a fourth speed to a fourth direction;

receiving the plurality of articles from the fourth-level article conveying device by a fifth-level article conveying device comprising a fifth conveyor configured to convey the plurality of articles at a fifth speed to a fifth direction; and receiving, from the fifth-level article conveying device, the plurality of articles by a sixth-level article conveying device comprising a sixth conveyor configured to convey the plurality of singulated articles onto the out-take conveyor in a sixth direction and the non-singulated articles of the plurality of articles back to any one of the first conveyor, the second conveyor, the third conveyor, the fourth conveyor, and the fifth conveyor.

14. The method of claim 13 wherein the sixth-level article conveying device is positioned next to the fifth-level article conveying device and wherein:

a first portion of the sixth conveyor interfaces with the third conveyor, thereby, defining a closed loop for conveying the non-singulated articles back onto the third conveyor; and a second portion of the sixth conveyor interfaces with a downstream conveyor to receive the plurality of singulated articles.

15. The method of claim 13, wherein at least one of:

the second direction is in a straight-angle arrangement from the first direction;

the third direction is in a straight-angle arrangement from the second direction;

the fourth direction is in a straight-angle arrangement from the third direction;

the fourth direction is in a right-angle arrangement from the third direction;

the fifth direction is in a right-angle arrangement from the fourth direction; and the sixth direction is in a right-angle arrangement from the fifth direction.

16. A non-transitory computer readable medium that stores thereon computer-executable instructions that in response to execution by a processor, perform operations comprising:

receive, by an intake conveyor, a plurality of articles;

convey the plurality of articles received from the intake conveyor, via successive conveyors of a plurality of conveyors, wherein each successive conveyor of the plurality of conveyors is at a lower level than a preceding conveyor of the plurality of conveyors and wherein each successive conveyor conveys the plurality of articles in a different direction and at a different speed than the preceding conveyor such that the plurality of articles are singulated by the plurality of conveyors; and receive, by an out-take conveyor a plurality of singulated articles from amongst the plurality of articles wherein the plurality of conveyors comprises a switch conveyor comprising:

a first conveyor path that interfaces with a portion of at least one of any preceding conveyors of the plurality of conveyors, thereby defining a closed loop passage for conveying non-singulated articles from amongst the plurality of articles back to any of the preceding conveyors; and a second conveyor path that interfaces with the out-take conveyor to receive the plurality of singulated articles onto the out-take conveyor.

17. The non-transitory computer readable medium of claim 16 that stores thereon computer-executable instructions that in response to execution by the processor, perform operations further comprising:

manipulating at least one of: a first speed and a direction of conveyance of, one or more of, the plurality of articles on the plurality of conveyors.

18. The non-transitory computer readable medium of claim 16 that stores thereon computer-executable instructions that in response to execution by the processor, perform operations further comprising:

capturing at least one image of an article from amongst the plurality of articles on the out-take conveyor; and handling the article by a robotic device based on processing of the captured at least one image.

* * * * *